(12) United States Patent
Labrou et al.

(10) Patent No.: US 7,801,826 B2
(45) Date of Patent: *Sep. 21, 2010

(54) FRAMEWORK AND SYSTEM FOR PURCHASING OF GOODS AND SERVICES

(75) Inventors: Yannis Labrou, Baltimore, MD (US); Lusheng Ji, Silver Spring, MD (US); Jonathan Russell Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 864 days.

This patent is subject to a terminal disclaimer.

(21) Appl. No.: 10/628,583

(22) Filed: Jul. 29, 2003

(65) Prior Publication Data

US 2004/0098350 A1    May 20, 2004

Related U.S. Application Data

(60) Provisional application No. 60/401,807, filed on Aug. 8, 2002.

(51) Int. Cl.
*G06Q 99/00* (2006.01)

(52) U.S. Cl. .............................. 705/67; 705/65; 705/50; 705/78; 713/150

(58) Field of Classification Search ............. 705/50–80; 713/150
See application file for complete search history.

(56) References Cited

U.S. PATENT DOCUMENTS

| | | | |
|---|---|---|---|
| 4,182,261 A | 1/1980 | Smith, III et al. | |
| 4,253,086 A | 2/1981 | Szwarcbier | |
| 4,458,109 A | 7/1984 | Mueller-Schloer | |
| 4,582,985 A | 4/1986 | Lofberg | |
| 4,636,622 A | 1/1987 | Clark | |

(Continued)

FOREIGN PATENT DOCUMENTS

CA    2291430 A1    7/2000

(Continued)

OTHER PUBLICATIONS

Mobile, 1992, Academic Press Dictionary of Science and Technology, http://xreferplus.com/entry.jsp?xrefid=3130947&secid=.-&hh=1.*

(Continued)

*Primary Examiner*—Jalatee Worjloh
(74) *Attorney, Agent, or Firm*—Staas & Halsey LLP

(57) ABSTRACT

A system for conducting an agreement between two parties relying on a trusted a third party includes a first party generating a first view of the agreement and transmitting the first view of the agreement to the third party, a second party independently generating a second view of the agreement and transmitting the second view of the agreement to the third party, a wireless network connecting the first party and the second party, and a wired or wireless network connecting the second party to the third party. The trusted third party, receives the first view of the agreement and the second view of the agreement, verifies conditions including that the identities of the parties that transmitted the agreements and that the independent views of the agreement are consistent with each other, and takes action to execute the agreement if the conditions are satisfied.

24 Claims, 63 Drawing Sheets

U.S. PATENT DOCUMENTS

| | | | |
|---|---|---|---|
| 4,882,195 A | 11/1989 | Butland | |
| 5,095,194 A | 3/1992 | Barbanell | |
| 5,194,289 A | 3/1993 | Butland | |
| 5,239,166 A | 8/1993 | Graves | |
| 5,256,863 A | 10/1993 | Ferguson et al. | |
| 5,363,453 A | 11/1994 | Gagne et al. | |
| 5,465,328 A * | 11/1995 | Dievendorff et al. | 714/15 |
| 5,485,312 A | 1/1996 | Horner et al. | |
| 5,521,980 A | 5/1996 | Brands | |
| 5,598,474 A | 1/1997 | Johnson | |
| 5,631,961 A | 5/1997 | Mills et al. | |
| 5,644,118 A | 7/1997 | Hayashida | |
| 5,666,420 A | 9/1997 | Micali | |
| 5,732,148 A | 3/1998 | Keagy et al. | |
| 5,790,677 A | 8/1998 | Fox et al. | |
| 5,794,207 A * | 8/1998 | Walker et al. | 705/1 |
| 5,869,822 A | 2/1999 | Meadows, II et al. | |
| 5,913,203 A | 6/1999 | Wong et al. | |
| 5,917,168 A | 6/1999 | Nakamura et al. | |
| 5,949,043 A | 9/1999 | Hayashida | |
| 5,956,404 A * | 9/1999 | Schneier et al. | 713/180 |
| 6,003,762 A | 12/1999 | Hayashida | |
| 6,003,767 A | 12/1999 | Hayashida | |
| 6,006,328 A | 12/1999 | Drake | |
| 6,010,068 A | 1/2000 | Bozzo | |
| 6,032,258 A | 2/2000 | Godoroja et al. | |
| 6,044,388 A | 3/2000 | DeBellis et al. | |
| 6,067,621 A | 5/2000 | Yu et al. | |
| 6,069,969 A | 5/2000 | Keagy et al. | |
| 6,081,793 A | 6/2000 | Challener et al. | |
| 6,098,053 A * | 8/2000 | Slater | 705/44 |
| 6,115,601 A | 9/2000 | Ferreira | |
| 6,137,884 A | 10/2000 | Micali | |
| 6,163,771 A * | 12/2000 | Walker et al. | 705/18 |
| 6,175,922 B1 | 1/2001 | Wang | |
| 6,175,923 B1 | 1/2001 | Bailey | |
| 6,182,892 B1 | 2/2001 | Angelo et al. | |
| 6,199,099 B1 | 3/2001 | Gershman et al. | |
| 6,212,290 B1 | 4/2001 | Gagne et al. | |
| 6,226,752 B1 | 5/2001 | Gupta et al. | |
| 6,257,487 B1 | 7/2001 | Hayashida | |
| 6,263,436 B1 | 7/2001 | Franklin et al. | |
| 6,270,011 B1 | 8/2001 | Gottfried | |
| 6,334,575 B1 | 1/2002 | Su-Hui | |
| 6,356,752 B1 | 3/2002 | Griffith | |
| 6,366,893 B2 | 4/2002 | Hannula et al. | |
| 6,367,010 B1 | 4/2002 | Venkatram et al. | |
| 6,377,692 B1 | 4/2002 | Takahashi et al. | |
| 6,378,073 B1 | 4/2002 | Davis | |
| 6,378,775 B2 | 4/2002 | Hayashida | |
| 6,405,314 B1 | 6/2002 | Bailey | |
| 6,435,406 B1 | 8/2002 | Pentel | |
| 6,470,448 B1 * | 10/2002 | Kuroda et al. | 713/176 |
| 6,512,919 B2 | 1/2003 | Ogasawara | |
| 6,529,885 B1 | 3/2003 | Johnson | |
| 6,556,875 B1 | 4/2003 | Nagasaka et al. | |
| 6,587,684 B1 | 7/2003 | Hsu et al. | |
| 6,598,032 B1 * | 7/2003 | Challener et al. | 705/72 |
| 6,687,375 B1 | 2/2004 | Matyas et al. | |
| 6,715,679 B1 | 4/2004 | Infosino | |
| 6,766,453 B1 | 7/2004 | Nessett et al. | |
| 6,775,777 B2 | 8/2004 | Bailey | |
| 6,817,521 B1 | 11/2004 | Matada | |
| 6,874,029 B2 | 3/2005 | Hutcheson et al. | |
| 6,915,951 B2 | 7/2005 | Hayashida | |
| 6,926,200 B1 | 8/2005 | Hayashida | |
| 6,931,431 B2 | 8/2005 | Cachin et al. | |
| 6,957,334 B1 | 10/2005 | Goldstein et al. | |
| 6,985,583 B1 | 1/2006 | Brainard et al. | |
| 7,003,499 B2 | 2/2006 | Arditti et al. | |
| 7,025,256 B1 | 4/2006 | Drummond et al. | |
| 7,089,208 B1 | 8/2006 | Levchin et al. | |
| 7,099,471 B2 | 8/2006 | Neff | |
| 7,167,844 B1 * | 1/2007 | Leong et al. | 705/80 |
| 7,181,047 B2 | 2/2007 | Nagel | |
| 7,200,749 B2 * | 4/2007 | Wheeler et al. | 713/170 |
| 7,239,346 B1 | 7/2007 | Priddy | |
| 7,379,916 B1 | 5/2008 | Mizrah | |
| 7,427,033 B1 | 9/2008 | Roskind | |
| 7,578,436 B1 | 8/2009 | Kiliccote | |
| 2001/0004231 A1 | 6/2001 | Bailey | |
| 2001/0005840 A1 | 6/2001 | Verkama | |
| 2001/0010723 A1 | 8/2001 | Pinkas | |
| 2001/0034670 A1 * | 10/2001 | Blair | 705/27 |
| 2001/0037254 A1 * | 11/2001 | Glikman | 705/26 |
| 2001/0037264 A1 * | 11/2001 | Husemann et al. | 705/26 |
| 2001/0045458 A1 | 11/2001 | Polansky | |
| 2001/0053239 A1 | 12/2001 | Takhar | |
| 2002/0017561 A1 | 2/2002 | Tomoike | |
| 2002/0018585 A1 | 2/2002 | Kim | |
| 2002/0052841 A1 | 5/2002 | Guthrie et al. | |
| 2002/0057803 A1 | 5/2002 | Loos et al. | |
| 2002/0073024 A1 | 6/2002 | Gilchrist | |
| 2002/0077885 A1 | 6/2002 | Karro et al. | |
| 2002/0077974 A1 | 6/2002 | Ortiz | |
| 2002/0077993 A1 | 6/2002 | Immonen et al. | |
| 2002/0082925 A1 | 6/2002 | Herwig | |
| 2002/0087534 A1 | 7/2002 | Blackman et al. | |
| 2002/0087869 A1 | 7/2002 | Kim | |
| 2002/0095296 A1 | 7/2002 | Hind et al. | |
| 2002/0095570 A1 | 7/2002 | Eldridge et al. | |
| 2002/0097867 A1 | 7/2002 | Bartram | |
| 2002/0107007 A1 | 8/2002 | Gerson | |
| 2002/0107791 A1 | 8/2002 | Nobrega | |
| 2002/0107939 A1 | 8/2002 | Ford et al. | |
| 2002/0141575 A1 | 10/2002 | Hird | |
| 2002/0163421 A1 | 11/2002 | Wang et al. | |
| 2002/0174336 A1 | 11/2002 | Sakakibara et al. | |
| 2002/0176579 A1 * | 11/2002 | Deshpande et al. | 380/270 |
| 2002/0196944 A1 | 12/2002 | Davis et al. | |
| 2003/0046541 A1 | 3/2003 | Gerdes et al. | |
| 2003/0061486 A1 | 3/2003 | Shibuya et al. | |
| 2003/0123667 A1 | 7/2003 | Weber et al. | |
| 2003/0174049 A1 | 9/2003 | Beigel et al. | |
| 2003/0190046 A1 | 10/2003 | Kamerman et al. | |
| 2003/0204726 A1 | 10/2003 | Kefford et al. | |
| 2003/0226030 A1 * | 12/2003 | Hurst et al. | 713/200 |
| 2004/0030894 A1 | 2/2004 | Labrou et al. | |
| 2004/0104268 A1 | 6/2004 | Bailey | |
| 2004/0123098 A1 | 6/2004 | Chen et al. | |
| 2004/0123159 A1 | 6/2004 | Kerstens et al. | |
| 2004/0151323 A1 | 8/2004 | Olkin et al. | |
| 2004/0153649 A1 | 8/2004 | Rhoads et al. | |
| 2004/0158492 A1 | 8/2004 | Lopez et al. | |
| 2004/0234117 A1 | 11/2004 | Tibor | |
| 2005/0067485 A1 | 3/2005 | Caron | |
| 2005/0122209 A1 | 6/2005 | Black | |
| 2005/0194452 A1 | 9/2005 | Nordentoft et al. | |
| 2006/0004862 A1 | 1/2006 | Fisher et al. | |
| 2006/0229988 A1 | 10/2006 | Oshima et al. | |
| 2006/0266823 A1 | 11/2006 | Passen et al. | |

FOREIGN PATENT DOCUMENTS

| | | |
|---|---|---|
| DE | 103 10 527 A1 | 9/2004 |
| EP | 0950968 | 2/1999 |
| EP | 0 982 674 A2 | 3/2000 |
| EP | 2000-207483 | 7/2000 |
| EP | 2000-269957 | 9/2000 |
| EP | 1 120 761 A2 | 8/2001 |
| EP | 1 178 444 A1 | 2/2002 |
| EP | 1 231 578 A2 | 8/2002 |
| EP | 1 237 132 A2 | 9/2002 |
| EP | 1 237 133 A2 | 9/2002 |

| | | |
|---|---|---|
| EP | 1 237 134 A2 | 9/2002 |
| EP | 2002-259621 | 9/2002 |
| EP | 2 386 236 | 9/2003 |
| EP | 1 388 797 A2 | 2/2004 |
| GB | 2 386 236 | 9/2003 |
| JP | 2000-36000 | 2/2000 |
| JP | 2000-207483 | 7/2000 |
| JP | 2000-269957 | 9/2000 |
| JP | 2001-147984 | 5/2001 |
| JP | 2001-331755 | 11/2001 |
| JP | 2002-215027 | 7/2002 |
| JP | 2002-259621 | 9/2002 |
| KR | 2000-0068758 | 11/2000 |
| WO | WO 97-41932 | 11/1997 |
| WO | WO 97-45814 | 12/1997 |
| WO | WO 98/25371 | 6/1998 |
| WO | WO 98/37524 | 8/1998 |
| WO | WO 00/46959 | 8/2000 |
| WO | WO 01/01361 | 1/2001 |
| WO | WO 01-35570 | 5/2001 |
| WO | WO 01/80133 | 10/2001 |
| WO | WO 01/98854 | 12/2001 |
| WO | WO 02/07117 | 1/2002 |
| WO | WO 02/11082 | 2/2002 |
| WO | WO 02/13151 | 2/2002 |
| WO | WO 02/27421 | 4/2002 |
| WO | WO 02/27439 | 4/2002 |
| WO | WO 02/29708 | 4/2002 |
| WO | WO 02/29739 | 4/2002 |
| WO | WO02/41271 | 5/2002 |
| WO | WO 02/43020 | 5/2002 |
| WO | WO 02/054655 | 7/2002 |
| WO | WO 02-059849 | 8/2002 |
| WO | WO 02/067534 | 8/2002 |

OTHER PUBLICATIONS

Purchase, 1996, Merriam-Webster's Dictionary of Law, http://dictionary.reference.com/browse/purchase, p. 4.*
Menezes et al., "Handbook of Applied Cryptography", 1997 CRC Press LLC, Section 1.5—Symmertic-Key encryption.*
Asthana, Abhaya, et al., An Indoor Wireless System for Personalized Shopping Assistance (1994) [online]. IEEE Workshop on Mobile Computing Systems and Applications (1 page Abstract) [retrieved on Aug. 2, 2002]. Retrieved from the Internet: <URL: http://www.nerac.com>.
PCT International Search Report dated Oct. 4, 2005 for International Application No. PCT/US05/04049 related to the above-identified present pending US patent application (2 pages).
European Search Report Communication issued by the European Patent Office on Nov. 15, 2007 in the related European Patent Application No. 03254926.3-1244 (3 pages).
Korean Office Action issued by the Korean Intellectual Property Office on Nov. 8, 2007 in related Korean Patent Application No. 10-2006-7019071 based upon PCT/US2005/004049 (4 pages) (English translation consisting of 4 pages).
Deborah Bach, "CIBC Makes Long-Term Case for Wireless" [online], American Banker, vol. 167, No. 65, Apr. 5, 2002 (2 pages) [retrieved on Aug. 2, 2002]. Retrieved from the Internet: <URL: http://www.nerac.com>.
"WAWA Installs Wireless Card Processing" [online], CardLine, 2001 (1 page) [retrieved on Aug. 2, 2002]. Retrieved from the Internet: <URL: http://www.nerac.com>.
Jennifer A. Kingson, "First Data Sets Strategy for Wireless" [online], American Banker, vol. 167, No. 17, Jan. 25, 2002 (3 pages) [retrieved on Aug. 2, 2002]. Retrieved from the Internet: <URL: http://www.nerac.com>.
"Thirsty? Soon you may be able to charge and chug" [online], USA Today, Dec. 21, 2001, p. 7B (1 page) [retrieved on Aug. 2, 2002]. Retrieved from the Internet: <URL: http://www.nerac.com>.
M. Giometti, et al., "Creating Winning M-Commerce Models in the Financial Services" [online], FutureBanker, vol. 5, No. 10, Dec.
2001, p. 37 (2 pages) [retrieved on Aug. 2, 2002]. Retrieved from the Internet: <URL: http://www.nerac.com>.
"Hongkong Post Launches Mobile e-Certs" [online], Online Reporter, Oct. 22, 2001 (2 page) [retrieved on Aug. 2, 2002]. Retrieved from the Internet: <URL: http://www.nerac.com>.
"Wallet and WIM pilot" [online], Mobile Europe, Oct. 2001, p. 16 (1 page) [retrieved on Aug. 2, 2002]. Retrieved from the Internet: <URL: http://www.nerac.com>.
"Regional News: Asia/Pacific: DoCoMo, Sony Use E-Purse, PDAs in Mobile Commerce Trial" [online]. Card Technology, vol. 2, No. 10, Oct. 2001 (1 page) [retrieved on Aug. 2, 2002]. Retrieved from the Internet: <URL: http://www.nerac.com>.
"Wildcard Sure Mobile Pizza Pilot Will Deliver" [online]. CardLine, Oct. 2001 (1 page) [retrieved on Aug. 2, 2002]. Retrieved from the Internet: <URL: http://www.nerac.com>.
Varshney, Upkar, et al., "Mobile commerce: Framework, applications and networking support" [online]. Mobile Networks Appl., vol. 7, No. 3, Jun. 2002, pp. 185-198 (1 page) [retrieved on Aug. 2, 2002]. Retrieved from the Internet: <URL: http://www.nerac.com>.
Friis-Hansen, et al., "Secure electronic transactions—The mobile phone evolution continues" [online]. Ericsson Rev. (Engl. Ed); vol. 78, No. 4, 2001, pp. 162-167 (1 page) [retrieved on Aug. 2, 2002]. Retrieved from the Internet: <URL: http://www.nerac.com>.
Bettstetter, Christian, et al., "(Auto) mobile communication in a heterogeneous and converged world" [online]. IEEE Pers Commun., vol. 8, No. 6, Dec. 2001, pp. 41-47 (1 page) [retrieved on Aug. 2, 2002]. Retrieved from the Internet: <URL: http://www.nerac.com>.
Gupta, S., "Securing the wireless internet" [online]. IEEE Commun. Mag., vol. 39, No. 12, Dec. 2001, pp. 68-75 (1 page) [retrieved on Aug. 2, 2002]. Retrieved from the Internet: <URL: http://www.nerac.com>.
Aalders, K., "Travel card: Airport self-check in using a wireless PDA" [online]. IEEE Conf. Intell Transport Syst Proc ITSC, 2001, pp. 1224-1228 (1 page) [retrieved on Aug. 2, 2002]. Retrieved from the Internet: <URL: http://www.nerac.com>.
Brananaghan, R.J., "Human factors issues in the design of handheld wireless devices" [online]. Proc SPIE Int Soc Opt Eng, vol. 4428, 2001, pp. 37-41 (1 page) [retrieved on Aug. 2, 2002]. Retrieved from the Internet: <URL: http://www.nerac.com>.
Cohn, Michael, Like money in your hand: Wireless technology lets financial firms quickly deliver transactions and trades. (Financial Services) [online]. Internet World, vol. 8, No. 5, May 1, 2002, pp. 54(3) (4 pages). [retrieved on Aug. 2, 2002]. Retrieved from the Internet: <URL: http://www.nerac.com>.
Ray Cammack Shows. (M&S News). (to use wireless credit card terminals) (Brief Article) [online]. Amusement Business, vol. 114, No. 17, Apr. 29, 2002, pp. 4(1) (1 page) [retrieved on Aug. 2, 2002]. Retrieved from the Internet: <URL: http://www.nerac.com>.
Kabaher, April, MasterCard snags citi exec for new wireless role. (Brief Article) [online]. Financial Net News, vol. 7, No. 14, Apr. 8, 2002, pp. 1(2) (1 page) [retrieved on Aug. 2, 2002]. Retrieved from the Internet: <URL: http://www.nerac.com>.
"Pepsi North America tests wireless vending in Memphis" [online]. Automatic Merchandiser, vol. 44, No. 2, Feb. 1, 2002, pp. 9(1) (1 page) [retrieved on Aug. 2, 2002]. Retrieved from the Internet: <URL: http://www.nerac.com>.
Radding, Alan, "Crossing the Wireless Security Gap." [online]. Computerworld, Jan. 1, 2001 (3 pages) [retrieved on Aug. 2, 2002]. Retrieved from the Internet: <URL: http://www.nerac.com>.
Commerciant inks wireless deal. (EDS will provide transaction processing services for Commerciant's wireless terminals) (Brief Article) [online]. Houston Business Journal, vol. 32, No. 23, Oct. 19, 2001 (1 page) [retrieved on Aug. 2, 2002]. Retrieved from the Internet: <URL: http://www.nerac.com>.
"Wireless in Boston (Fleet HomeLink offers services through personal digital assistants) (Brief Article)" [online]. Bank Marketing, vol. 33, No. 7, Sep. 1, 2001 (1 page) [retrieved on Aug. 2, 2002]. Retrieved from the Internet: <URL: http://www.nerac.com>.
Murphy, Patricia A., Wireless payment technology spreads from gas pump to store. (VeriFone system) [online]. Stores, vol. 83, No. 5, May 1, 2001, pp. 74(2) (1 page) [retrieved on Aug. 2, 2002]. Retrieved from the Internet: <URL: http://www.nerac.com>.

Hoffman, Karen Epper, New Options in Wireless Payments. (Company Business and Marketing) [online]. Internet World, vol. 7, No. 7, Apr. 1, 2001, pp. 37 (4 pages) [retrieved on Aug. 2, 2002]. Retrieved from the Internet: <URL: http://www.nerac.com>.

Khachtchanski, V.I., et al, "Universal SIM toolkit-based client for mobile authorization system" [online]. Third International Conference on Information Integration and Web-based Applications and Services, 2001, pp. 337-344 (1 page) [retrieved on Aug. 2, 2002]. Retrieved from the Internet: <URL: http://www.nerac.com>.

"CIBC kicks off wireless banking service" [online]. Bank Systems + Technology, vol. 39, No. 5, May 2002, p. 12 (1 page) [retrieved on Aug. 2, 2002]. Retrieved from the Internet: <URL: http://www.nerac.com>.

Asthana, Abhaya, et al., An Indoor Wireless System for Personalized Shopping Assistance (1994) [online]. IEEE Workshop on Mobile Computing Systems and Applications (1 page) [retrieved on Aug. 2, 2002]. Retrieved from the Internet: <URL: http://www.nerac.com>.

Electronic payment systems, involving mobile phones (list of e-products, 15 listings), [online] Electronic Payment System Observatory (the ePSO website aims to monitor the progress of retail payment innovation throughout Europe, ePSO inventory of E-Payment services—List of e-products) (26 pages). European Central Bank, Frankfurt, Germany, 2002 [retrieved Sep. 11, 2002]. Retrieved from the Internet: <http://epso.intrasoft.lu>.

Yannis Labrou, et al., "Wireless Wallet", Proceedings of the First Annual International Conference on Mobile and Ubiquitous Systems: Networking and Services (MobiQuitous '04); ISBN: 0-7695-2208-4, IEEE, Aug. 22, 2004.

Mobile, Academic Press Dictionary of Science and Technology, xreferplus (1992); <URL: http://xreferplus.com/entry.jsp?xrefid=3130947&secid=.&hh=1>, 1 page.

Purchase, 1996, Merriam-Webster's Dictionary of Law, <URL: http://dictionary.reference.com/browse/purchase>, p. 4.

U.S. Appl. No. 60/401,807, filed Aug. 8, 2002, Yannis Labrou, et al., Fujitsu Limited Kawasaki, Japan.

U.S. Appl. No. 10/458,205, filed Jun. 11, 2003, Yannis Labrou, et al., Fujitsu Limited Kawasaki, Japan.

U.S. Appl. No. 10/628,584, filed Jul. 29, 2003, Yannis Labrou, et al., Fujitsu Limited Kawasaki, Japan.

U.S. Appl. No. 10/628,569, filed Jul. 29, 2003, Yannis Labrou, et al., Fujitsu Limited Kawasaki, Japan.

U.S. Appl. No. 10/628,583, filed Jul. 29, 2003, Yannis Labrou, et al., Fujitsu Limited Kawasaki, Japan.

U.S. Appl. No. 60/544,300, filed Feb. 17, 2004, Yannis Labrou, et al., Fujitsu Limited Kawasaki, Japan.

U.S. Appl. No. 60/669,375, filed Apr. 8, 2005, Yannis Labrou, et al., Fujitsu Limited Kawasaki, Japan.

U.S. Appl. No. 11/045,484, filed Jan. 31, 2005, Yannis Labrou, et al., Fujitsu Limited Kawasaki, Japan.

U.S. Appl. No. 60/703,862, filed Aug. 1, 2005, Yannis Labrou, et al., Fujitsu Limited Kawasaki, Japan.

U.S. Appl. No. 11/041,223, filed Jan. 25, 2005, Yannis Labrou, et al., Fujitsu Limited Kawasaki, Japan.

U.S. Appl. No. 11/488,178, filed Jul. 18, 2006, Yannis Labrou, et al., Fujitsu Limited Kawasaki, Japan.

U.S. Appl. No. 60/541,903, filed Feb. 6, 2004, Yannis Labrou, et al., Fujitsu Limited Kawasaki, Japan.

U.S. Appl. No. 60/549,148, filed Mar. 3, 2004, Yannis Labrou, et al., Fujitsu Limited Kawasaki, Japan.

U.S. Appl. No. 60/575,835, filed Jun. 2, 2004, Yannis Labrou, et al., Fujitsu Limited Kawasaki, Japan.

Summons to Attend Oral Proceedings; Annex to the Summons Preliminary Opinion of the Examining Division issued on Mar. 12, 2008 by the European Patent Office in the related European Patent Application No. 03254927.1-1238 (10 pages).

Herschberg, Mark A., "Secure Electronic Voting Over the World Wide Web," Massachusetts Institute of Technology, May 27, 1997 (pp. 1-67).

Jan et al., "The Design of Protocol for e-Voting on the Internet." IEEE, Oct. 2001 (pp. 180-189).

Jan, Jinn-ke et al. "A secure anonymous voting protocol with a complete supervision." Computer Systems Science & Engineering, vol. 17, Nos. (4/5): Jul./Sep. 2002 (pp. 213-221).

Juang, Wen-Sheng et al. "A Verifiable Multi-Authorities Secret Election Allowing Abstaining from Voting." International Computer Symposium, Tainan, Taiwan, 1998 (pp. 1-21).

Menezes, Paul et al. "Handbook of Applied Cryptography" 5th Edition (Aug. 2001), Copyright 1996 CRC Press, Chapter 9.78 (pp. 321-383).

Steves, Douglas "Overview on Secure Transaction Protocols," [online], [retrieved on Jun. 19, 2009] Retrieved from the Internet <URL: http://www.usenix.org/publications/library/proceedins/ec96/full_papers/steves/html/node5.html#SECTION00021000000000000>, May 4, 1997 (3 pages).

Alfred J. Menezes, et al., "Handbook of Applied Cryptography", 1997 CRC Press LLC, Section 1.5 Symmetric-Key encryption, (9 pages).

U.S. Appl. No. 11/388,202, filed Mar. 24, 2006, Yannis Labrou, et al.

U.S. Office Action mailed Apr. 2, 2009 in co-pending U.S. Appl. No. 10/628,569 (19 pages).

U.S. Office Action mailed Jun. 26, 2008 in co-pending U.S. Appl. No. 10/628,569 (15 pages).

U.S. Office Action mailed Oct. 19, 2007 in co-pending U.S. Appl. No. 10/628,569 (10 pages).

U.S. Office Action mailed May 5, 2007 in co-pending U.S. Appl. No. 10/628,569 (10 pages).

U.S. Office Action mailed Sep. 27, 2006 in co-pending U.S. Appl. No. 10/628,584 (now U.S. Patent No. 7,349,871) (16 pages).

U.S. Office Action mailed Apr. 19, 2007 in co-pending U.S. Appl. No. 10/628,584 (now U.S. Patent No. 7, 349,871) (21 pages).

U.S. Office Action mailed Apr. 2, 2009 in co-pending related U.S. Appl. No. 11/041,223 (19 pages).

U.S. Office Action mailed Oct. 17, 2008 in co-pending related U.S. Appl. No. 11/041,223 (20 pages).

U.S. Office Action mailed Mar. 5, 2008 in co-pending related U.S. Appl. No. 11/041,223 (13 pages).

U.S. Office Action mailed Jul. 16, 2008 in co-pending related U.S. Appl. No. 11/388,202 (6 pages).

U.S. Office Action mailed Oct. 1, 2008 in co-pending related U.S. Appl. No. 11/388,202 (14 pages).

U.S. Office Action mailed Jan. 5, 2007 in co-pending related U.S. Appl. No. 10/458,205 (now U.S. Patent No. 7,353,382) (11 pages).

U.S. Office Action mailed May 22, 2007 in co-pending U.S. Appl. No. 10/458,205 (now U.S. Patent No. 7,353,382) (12 pages).

U.S. Office Action mailed Apr. 13, 2009 in co-pending related U.S. Appl. No. 11/045,484 (27 pages).

U.S. Office Action mailed Nov. 21, 2008 in co-pending related U.S. Appl. No. 11/045,484 (24 pages).

U.S. Office Action mailed Jun. 25, 2008 in co-pending related U.S. Appl. No. 11/045,484 (22 pages).

European communication Pursuant to Article 94(3) EPC dated May 19, 2009 in European Application No. 03 254 926.3-2413, related to the above-identified present pending US patent application (7 pages).

U.S. Notice of Allowance mailed Mar. 22, 2010 in co-pending U.S. Appl. No. 11/488,178.

U.S. Office Action mailed Mar. 31, 2010 in co-pending U.S. Appl. No. 11/041,223.

U.S. Office Action mailed Oct. 21, 2009 in co-pending related U.S. Appl. No. 11/488,178.

U.S. Office Action mailed Nov. 24, 2009 in co-pending related U.S. Appl. No. 11/045,484.

Chinese Office Action mailed on Nov. 13, 2009 in related Chinese Patent Application No. 200610109167.7(5 pages); English Translation (7 pages).

Japanese Office Action mailed on Oct. 20, 2009 in related Japanese Patent Application No. 2006-554126 (4 pages); English Translation (8 pages).

European Office Action mailed on Nov. 19, 2009 in related European Patent Application No. 06251957.4-1244.

Japanese Office Action Mailed Jul. 14, 2009 issued in corresponding Japanese Application No. 2006-554126. (6 pages) (translation 5 pages).

PCT International Search Report dated Oct. 4, 2005 for International Application No. PCT/US05/04049 related to the above-identified present pending US patent application (2 pages).

Form PCT/ISA/237—Written Opinion of the International Searching Authority dated Oct. 4, 2005 in International Application No. PCT/US05/04049 related to the above-identified present pending US patent application (3 pages).

International Preliminary Report on Patentability (Chapter I of the Patent Cooperation Treaty) dated Aug. 22, 2006 in International Application No. PCT/US05/04049 related to the above-identified present pending US patent application (5 pages).

European Communication Pursuant to Article 96(2) EPC dated Jul. 26, 2005 in European Application No. 03 254 927.1—1238, related to the above-identified present pending US patent application (6 pages).

European Search Report Communication issued by the European Patent Office on Aug. 30, 2004 in European Application No. 03254927.1-1238 related to the above-identified present pending US patent application (3 pages).

European Search Report Communication issued by the European Patent Office on Jan. 8, 2007 in Application No. 06253923.4—1238 related to the above-identified present pending US patent application (13 pages).

Nerac (Patents, Intellectual Property, Research), [online]. Nerac, Inc. Tolland CT, USA, 4 pages [retrieved Dec. 18, 2006]. Retrieved from the Internet: <URL: http://www.nerac.com>.

MeT Mobile electronic Transactions (MeT limited is a company founded to establish a framework for secure mobile transactions) [online]. Mobile electronic Transactions Limited, 2003, 3 pages [retrieved Jan. 5, 2005]. Retrieved from the Internet: <URL: http://www.mobiletransaction.org>.

Two-Factor Token Matrix [online]. Diversinet Corp., 2 pages [retrieved on Mar. 24, 2006]. Retrieved from the Internet: <URL: http://www.diversinet.com/>.

Diversinet Delivers Consumer-Ready Soft Token Strong Authentication Solution [online]. Diversinet Corp., Feb. 7, 2006, 2 pages [retrieved on Dec. 27, 2006]. Retrieved from the Internet: <URL: http://www.diversinet.com/html/press/2006/consumer.html>.

Labrou, Yannis, Re: Mobile payments with a downloadable application from PayWi (referencing "PayWi Powers Personal Payments in Your Palm," PRNewswire, Portland Oregon, Feb. 6, 2006) [online]. Feb. 21, 2006 (4 pages) [retrieved Mar. 24, 2006]. Retrieved from the Internet: <URL: http://upff.blogspot.com/2006/02/mobile-payments-with-downloadable.html>.

Labrou, Yannis. UPTF blog (a blog for Wireless Wallet) [online] 22 pages [retrieved Dec. 27, 2006] Retrieved from the Internet: <URL: http://uptf.blogspot.com>.

Electronic Payment System Observatory (the ePSO website aims to monitor the progress of retail payment innovation throughout Europe, ePSO inventory of E-Payment services - List of e-products) [online]. European Central Bank, Frankfurt, Germany (3 pages) [retrieved Dec. 18, 2006]. Retrieved from the Internet: <URL: http://epso.intrasoft.lu>.

"Via Licensing Begins Process to Form Wireless Networking Patent Licensing Pool" [online]. Via Licensing Corporation, Oct. 23, 2003, 3 pages [retrieved Nov. 17, 2003]. Retrieved from the Internet: <URL: http://www.vialicensing.com/news/details.cfm?VIANEWS_ID=308>.

Labrou, Yannis, 'Re: Motorola's M-Wallet: Mobile payments with a J2ME application' (referencing "Motorola M-Wallet Solution" brochure Motorola, Inc. 2006) In UPTF blog for Wireless Wallet [online], Feb. 21, 2006, 5 pages [retrieved Mar. 24, 2006]. Retrieved from the Internet: <URL: http://uptf.blogspot.com/2006/02/mobile-payment-with-downloadable.html>.

IEEE Standards Association (IEEE Std 802.11 and amendments) (802.11 patent information) [online]. IEEE-SA, 19 pages [retrieved Dec. 27, 2006]. Retrieved from the Internet: <URL: http://standards.ieee.org/db/patents/pat802_11.html>.

European Search Report Communication issued by the European Patent Office on Apr. 23, 2007 in Application No. 06251957.4 - 1244 related to the above-identified present pending US patent application (9 pages).

Iyer, Sundar, *UNIX and Internet Security*, Department of Computer Science and Engineering, Indian Institute of Technology, Bombay, Mar. 1997 (38 pages).

U.S. Office Action mailed Jun. 23, 2010 in related co-pending U.S. Appl. No. 10/628,178.

Second Chinese Office action mailed Jun. 10, 2010 in related Chinese Patent Application No. 200610109167.7, (4 pages); English Translation (8 pages).

Chinese Office Action mailed Jun. 21, 2010 in related Chinese Patent Application No. 20050005149.8. (4pages); English Translation (6 pages).

U.S. Notice of Allowance mailed Jun. 21, 2010 in related co-pending U.S. Appl. No. 11/045,484.

U.S. Office Action mailed Oct. 14, 2009 in co-pending related U.S. Appl. No. 11/041,223 (22 pages).

* cited by examiner

Purchase Order Acquisition – Purchase Order Request

Purchase Order Acquisition – Purchase Order Request from STS

Single step
REQuest and AUTHorization (includes payment)

Token Creation and AUTHorization

Token Creation and AUTHorization

Token Creation

Figure 20. Single step REQuest, AUTHorization and Token Creation

Single step REQuest, AUTHorization and Token Creation

Figure 22 — Service Token Verification and Consumption

Single step REQuest, AUTHorization and Token Creation
(for token certificate verification by STS)

Token Creation
(for token certificate verification by STS)

Single step REQuest, AUTHorization and Token Creation
(for token certificate verification by STS)

Service Token Consumption (Verification by Merchant only)

| A | B | C | D | E | F | G |
|---|---|---|---|---|---|---|

420

A: Message type (REQuest or AUTHorization; REQuest in this case)

B: Success Code for response to this message

C: Failure Code for response to this message

D: DID of message sending device

E: DID of other transacting party's device

F: Transaction amount or some other agreed transaction description

G: Friendly name of account to be used to pay D's user, amount E
F is optional and might be specified in AUTHorization message

Figure 34

| A | B | C | D | E | F |
|---|---|---|---|---|---|

422

A: Message type (REQuest or AUTHorization; REQuest in this case)

B: Success Code for response to this message

C: Failure Code for response to this message

D: DID of message sending device

E: DID of other transacting party's device

F: Transaction amount or some other agreed transaction description

Figure 35

| A | B | C |

424

A: The Success or Failure code indicated by Payer depending on whether the REQuest was successful or not B: A randomly generated number to be used to refer to the transaction for the remainder of the change C: Payer's account listing

Figure 36

| A | B |
|---|---|

426

A: The Success or Failure code indicated by Payer depending on whether the REQuest was successful or not B: A randomly generated number to be used to refer to the transaction for the remainder of the exchange

Figure 37

| A | B | C | D | E |
|---|---|---|---|---|

428

A: Message type (REQuest or AUTHorization; AUTHorization in this case)
B: Success Code for response to this message
C: Failure Code for response to this message
D: A reference to the transaction been authorized; a previously STS-generated reference is used
E: Optional to reference payer's account if not previously specified

Figure 38

| A | B | C | D | E |

430

A: Message type (REQuest or AUTHorization; AUTHorization in this case)
B: Success Code for response to this message
C: Failure Code for response to this message
D: A reference to the transaction been authorized; a previously STS-generated reference is used
E: Optional to reference payee's account if not previously specified

A: The Success or Failure code indicated by Payer depending on whether the Authorization was successful or not B: An optional additional description, for example a service token value (receipt)

| A | B |
|---|---|

434

A: The Success or Failure code indicated by Payee depending on whether the Authorization was successful or not B: An optional additional description, for example a service token value (receipt)

FRAMEWORK AND SYSTEM FOR PURCHASING OF GOODS AND SERVICES

CROSS-REFERENCE TO RELATED APPLICATIONS

This application is related to, and claims the benefit of priority to, Provisional Application U.S. Ser. No. 60/401,807, entitled METHODS AND APPARATUSES FOR SECURE MULTI-PARTY FINANCIAL TRANSACTIONS (A UNIVERSAL PERVASIVE TRANSACTION FRAMEWORK), by Yannis Labrou, Lusheng Ji, and Jonathan Agre, filed Aug. 8, 2002 in the U.S. Patent and Trademark Office, the contents of which are incorporated herein by reference.

This application is related to U.S. Ser. No. 10/458,205, entitled SECURITY FRAMEWORK AND PROTOCOL FOR UNIVERSAL PERVASIVE TRANSACTIONS, by Yannis Labrou, Lusheng Ji, and Jonathan Agre, filed Jun. 11, 2003 in the U.S. Patent and Trademark Office, the contents of which are incorporated herein by reference.

This application is related to U.S. patent application Ser. No. 10/628,584, entitled "METHODS FOR PURCHASING OF GOODS AND SERVICES" by Yannis Labrou, Lusheng Ji, and Jonathan Agre, filed Jul. 29, 2003 in the U.S. Patent and Trademark Office, the contents of which are incorporated herein by reference.

This application is related to U.S. patent application Ser. No. 10/628,569, entitled "APPARATUSES FOR PURCHASING OF GOODS AND SERVICES" by Yannis Labrou, Lusheng Ji, and Jonathan Agre, filed Jul. 29, 2003 in the U.S. Patent and Trademark Office, the contents of which are incorporated herein by reference.

BACKGROUND OF THE INVENTION

1. Field of the Invention

The present invention relates generally to the fields of financial transactions, security and methods for purchasing goods and services, and a framework thereof. More particularly, the present invention relates to a computer-implemented system, methods and processes, and a framework enabling consumers to purchase goods and services, primarily at the locations where the goods and services are offered, more securely, faster and more efficiently than current methods.

2. Description of the Related Art

To date, E-commerce (electronic commerce) for consumers (or business-to-consumer, B2C, transactions) is essentially a personal computer-mediated process. The typical consumer that wants to purchase a good or service though an e-commerce transaction ("buying on the web") has to go through the following steps:

Buy or own a personal computer (PC);
Be physically present at the computer;
Have network access;
Turn on the computer;
Log on to the computer and/or to the network;
Open a web browser;
Identify, find and visit the particular website that offers the good or service of interest;
Find the correct item or service on that website and then add it to a "shopping cart";
Provide the identity information, which might include signing up or creating an account for doing transactions in the particular website;
Enter payment and shipping information (typically a credit card);
Receive a proof of purchase for her records; and
Wait for the goods to be physically shipped.

Assuming the existence of a PC and a network connection, the remainder of the process typically requires 15-20 minutes for an experienced user. The current means and methods for consumer e-commerce transactions are expensive in terms of both money and time, complex, require proximity to a computer terminal, and are only available to a small percentage of consumers with the appropriate levels of experience and technological comfort.

Further, consumer e-commerce is basically a mail order system that replicates the "bricks and mortar" presence of a business in the virtual world and does not take advantage of merchants' "bricks and mortar" infrastructure and investment. The current system is particularly vulnerable to fraud since the vast majority of purchases on the web are CNP (Card Not Present) transactions meaning that there is no identity confirmation for these transactions, resulting in fraud costs that are primarily incurred by the merchants.

Participating in e-commerce requires a computer-literate end-user and substantial hardware. PC penetration is still very low, especially beyond the "first world" and it is unlikely that a computer-literate user and the "a PC at every household in the world" vision will happen in the next few years. A PC is a general purpose device that can be used for many different tasks, including the task of conducting e-commerce transactions. On the software side, a web browser, the universal client for electronic commerce, is not special purpose software but a client for accessing all kinds of web-based services.

Although mobile phones and PDA's can be also used for e-commerce, both follow the same paradigm, essentially bringing the browsing experience to a different device. But the essential elements of the paradigm remain, namely e-commerce is one of the multitudes of functions that can be accessed through a web browser (a universal user interface to the web) and a certain degree of computer literacy is still required, along with a considerable personal financial investment for such a client device.

In addition, various other devices including cell phones and personal digital assistants (PDAs) provide e-commerce capabilities.

Cell phones are intended for voice communication and despite the enormous success of data messaging (e.g., SMS messaging) attempts to broaden their usage by promoting them as web-browsing clients have failed. Additionally, the slow deployment and adoption of 2.5G and 3G equipment and services creates an uncertainty about the future of diversifying the usage of a mobile phone. Still, the penetration rate of mobile phones is very high.

PDA's on the other hand, have a low penetration rate and are relatively complex for use by the average person; they remain pretty much the domain of technically savvy users who carry a variety of similar gadgets. Also, their primary function is that of a personal organizer. Even though they have evolved to become very small factor personal computers, the limitations of keyboard and screen size make them inadequate at that. Special protocols such as WAP have been developed to overcome some of these types of limitations, but it has not been widely adopted, and this is not the appropriate delivery mechanism for many consumer services.

Another device of interest is the BLACKBERRY RIM and devices similar to it. The evolution of BLACKBERRY is from a pager/e-mail client device towards a full blown PDA. BLACKBERRIES are much like PDA's with anywhere wireless connectivity, as opposed to connectivity to location-specific service spots.

Smartcards are being deployed as a replacement for traditional credit cards. The deployment includes new smartcard readers that will replace the traditional credit card transaction terminals. Each bank that issues a credit card will issue it's own smartcard, so there is going to be a one to one replacement for existing credit cards. New smartcards will provide all the functions of existing credit cards but will also be used as identity cards so that for example one could log into a corporate network through a machine that is equipped with a smartcard reader. Also, smartcards are intended to be used as digital wallets so a user could "load" digital money (Mondex (mondex.com)) into the smartcard.

Smartcards have complex mechanisms that are used to improve security and protect the operations concerning digital money. But, it is unclear how smartcards are more secure than current credit cards. Of course they will be more resistant to counterfeiting but if stolen they can be used by another person; since most of the time a PIN is not required for using the card (e.g., for shopping at a store) and, if a PIN is required, knowledge of the PIN would suffice to use the card. Because a user carries many cards and it would be impractical to remember the PIN for each of them, a PIN is not required when using the card for purchases. A smartcard can store other data, so for example one could use a more advanced identification method in conjunction with a smartcard reader attached to a terminal, e.g., insertion of the smartcard to a terminal invokes a biometric-based authentication application that runs on the terminal (not on the device).

Related art includes devices for financial transactions (e.g., credit cards, smartcards, etc.), wireless devices that can be used for financial transactions (e.g., mobile phones, PDA's etc.), methods for the transactions, security frameworks and protocols, purchasing methods and workflows and Point of Sale systems.

The following discusses related art involving wireless devices and purchasing.

Wireless POS (Point of Sale) Extensions

These are systems that effectively extend the cash register (POS). A store employee operates a small terminal that can transmit wirelessly to a base station at a store; the wireless terminal is a credit card reader, so that a consumer can check out (pay) at any location in a store, where the store employee happens to be. These systems have been criticized for being vulnerable to the security problems of the WEP protocol, which is used to provide a secure network connection between the wireless terminal and the base station terminal or POS.

Wireless Payment Processing

The systems essentially replace the merchant's regular phone line with a wireless link for the purpose of connecting to the financial institution that implements the transaction processing. Systems of this category are regular POS terminals that accepts credit cards (for swiping), like any other POS, but instead of using a regular land-line to connect to the processor of the merchant for authorizing the transaction, the use a wireless mobile phone connection for that purpose. Although this category by itself is not of such great interest, it is often combined with systems and innovations of some of the other discussed types, in order to provide a new kind of POS which is more portable and adaptable.

B2C (Business to Consumer) Transactions Using a Mobile Device

These are solutions that differ from desktop-based web browsing and shopping (B2C commerce) only in that the hardware client used is a mobile device. A PDA or a mobile phone that has wireless web access is used as a personal computer (similarly to any wired, or wireless, networked desktop or laptop with web access. Such solutions do not substantially differ from conducting e-commerce through a web-browser that accesses the general internet. What is important to note about these systems, is that when they are used for shopping the whole consumer experience and the associated steps and workflows do not differ from desktop-based shopping, Moreover, at the technical level, these systems use the same technologies used for desktop and laptops (for the purposes or shopping), or they rely on the stack of WAP-related protocols. The consumer has to enter payment information as she would in order to pay for something at any other e-commerce site on the web. Systems of this type are differentiated from systems that use mobile phones (described next) but require different workflows and infrastructure, even though the latter often use the WAP-related stack of protocols, because they attempt to speed-up and facilitate the submission of payment information by the user.

Mobile Phone-Based Shopping

A variety of systems use mobile phones for conducting purchases at physical POS (merchants) and virtual POS (on the web). These systems use the mobile carrier's network to carry the transaction.

Single Chip Mobile Phone

The customer uses a WAP-enabled mobile phone to make purchases from a participating merchant. The user experience is similar to browsing. Technically, the solution relies on the WAP (Wireless Application Protocol) stack of protocols, including WTLS (Wireless Transport Layer Security), which is similar to SSL (Secure Socket Layer) in intent. Such solutions employ a server-side wallet, which is typically provided by a participating banking institution. When accessing the merchant's virtual store, the user connects to the hosted virtual store (even though she might by physically in the physical store) and interacts with the virtual store in order to accomplish the purchase. This disconnect between physical and virtual store, requires some additional steps in the transaction workflow for making payment or for identifying the store to the user's device for the purposes of browsing (on the device) to the right place (URL and webpage). One of the goals of this approach is to involve all three major principals in the implemented system. The mobile phone manufacturer provides the WAP-enabled phone, the mobile carrier provided the value-add service to the user of using the mobile phone for purchases (also providing the hosted infrastructure and the server-side wallet) and the banking institution is the physical owner and processor of the server-side wallet related transactions. It is important to note that even if the merchant's server (the implementation of the merchant's virtual store) is located at (and perhaps operated by) the merchant's physical location, the transaction is carried by the mobile network.

Dual-Chip Mobile Phone

This category describes systems similar to the previous one but these mobile phones include a second chip (alongside the SIM card), the WIM (Wireless Identity Module) which can read a plug-in WIM chip. The WIM module (with the inserted WIM chip) is essentially a wallet embedded on the client device (the mobile phone) and provides a single banking account associated with the mobile phone. This approach does not require a server-side wallet, but the remainder of the user transaction and interactions are the same as with single chip mobile phone systems. Dual-chip mobile phones are associated with the technological choice of separating SIM and WIM chip cards and the resulting business model of bank/carrier collaboration, i.e., keeping separate the payment function (via the WIM card controlled by the bank) and the network function (via the SIM card controlled by the network operator).

Dual-Slot Mobile Phone

Such a system requires a phone that is equipped with a chip and slot for reading a smartcard (or even magnetic strip) based bankcard. The user inserts the card on the phone to authorize transactions using the PIN of the specific card. Such systems use protocols and technologies of mobile phones. The user of course needs to carry the actual credit cards. These systems do not require a server-side wallet in the typical sense. The server-side wallet serves as a temporary repository of the transaction data, prior to execution, but no permanent store of user's account data (or registration of accounts) is required.

Mobile Phone as Consumer Identifier

In these systems, the mobile phone may not be essential to the transaction. When used for virtual POS transactions (B2C purchasing on the internet) the mobile phone is "reduced" to the mobile's number which is in turn used to uniquely identify the consumer at the participating merchant's site. The remaining part of the transaction might continue without involving the mobile phone, or a callback to the user's mobile phone might be required, followed by the user entering some form of confirmation, such as PIN.

Mobile phone for Physical POS

The mobile phone is used partially as a consumer identifier but is essential to the execution of the transaction at a physical POS. Although implementations differ in their workflows, the mobile phone's owner will receive a transaction (some times sent as a SMS) for a physical POS transaction initiated by the merchant, which the consumer will have to authorize by entering a PIN that authorizes processing of the payment at a server-side wallet account. Confirmations (in the form of SMS messages) are sent to both mobile phone and merchant. In these systems, the initialization of the transaction is not automated but it requires the physical exchange of some account identification (e.g., phone number or some other unique ID) between merchant and consumer and keying this ID into the POS or mobile phone, along with other transaction-related information. This category can also be thought of as a sub-class of single chip mobile phone systems.

Mobile-Phone Shopping With Direct Merchant-Mobile Phone Interaction

Systems discussed above rely on the mobile phone to carry the transaction between customer and merchant, coupled with a physical interaction (at physical POS) between merchant and consumer that exchanges an identifier (and/or associated data) that initialize the transaction. Both the merchant and the consumer use the mobile network to submit (separately) the transaction data to the carrier-operated back-end system that confirms the transaction but there is no direct electronic interaction between POS and consumer. Systems of this category on the other hand, utilize a short-range radio transport, usually wireless, so that the mobile phone can also direct connect to the merchant when the user is at the merchant's location. Such systems usually use a mobile phone equipped with Bluetooth. The transaction itself is still carried by the mobile phone network, but the Bluetooth link is used to transmit the merchant's identification code to the mobile phone, or for the mobile phone to transmit the payment receipt to the merchant.

There is another type of system that uses Bluetooth to directly interact with the POS. This is the work of the Mobile Electronic Transactions (mobiletransaction.org) consortium, whose primary members are mobile phone manufacturers. These are dual chip mobile phones with a SIM and a WIM. The WIM can be implemented in software instead of being a separate chip (e.g. a smartcard). The WIM is the (tamper-proof) certificate store and the module that is responsible for the security/transaction-related functions of the mobile phone. Bluetooth is used for a direct link with the physical POS. The phone can also be used over the GSM network for transactions on any web-accessible site. Bluetooth is used for discovery (of the POS) and for the wireless link. The WAP stack of protocols is used (WAP, WTLS, etc.) for the interaction between client (mobile) and server. Beyond that point all the workflows, security and transactions rely on using certificates. A certificate (assuming the existence of a Public Key Infrastructure, or PKI) is associated with a particular/specific banking account owned by the user; a user can have multiple certificates, each associated with a different account. Every time that the user accepts a payment, essentially she uses the certificate as a digital signature for signing the "payment contract" sent by the merchant from the physical POS that she connect to in the store. The Merchant sends that message to the acquirer, who will decrypt (with the help of the certificate authority) and then approve the payment (if all is well) and notify the merchant. The user can receive wirelessly new certificates for new accounts and at the end the user is responsible for managing the (on-the-mobile) database of certificates and the associated certification authorities. In turn the user has to understand and manage these certificates, a PKI has to be in place (including revocation of certificates for defunct accounts) and the user might need separate passwords or PIN's to unlock the certificates and or sign payment contracts with them.

The present invention overcomes the above-mentioned, and other, problems associated with the related art.

SUMMARY OF THE INVENTION

The present invention is directed to a system for conducting an agreement between two parties relying on a trusted a third party includes a first party generating a first view of the agreement and transmitting the first view of the agreement to the third party, a second party independently generating a second view of the agreement and transmitting the second view of the agreement to the third party, a wireless network connecting the first party and the second party, and a wired or wireless network connecting the second party to the third party. The trusted third party, receives the first view of the agreement and the second view of the agreement, verifies conditions including that the identities of the parties that transmitted the agreements and that the independent views of the agreement are consistent with each other, and takes action to execute the agreement if the conditions are satisfied.

Devices and methods for wireless purchasing of goods and services by consumers are disclosed.

The overall system (hereafter referred to as Universal Pervasive Transaction Framework, or UPTF) includes: (a) a variety of consumer devices 102, called Universal Pervasive Transaction Devices 102 (UPTD 102) that are enabled by, and can be deployed within, the UPTF framework, for initiating requests for financial transactions relating to the purchasing of goods and services by consumers (b) a merchant device 104 for making goods and services available to consumers that own and operate the consumer devices 102 at the merchant's location, (c) a security framework and associated protocols for initiating transaction requests from the consumer 102 and merchant devices 104 and deciding the validity of the requests, (d) a system architecture for processing the partial transaction requests and initiating transaction execution with financial institutions, and (e) methods for purchasing various kinds of goods and services with the devices 102, using the transactions, security framework and protocols.

Examples of goods and services include physical goods, such as grocery items, clothing, books, gasoline, etc., and services such as purchasing admission to a theater, paying for a toll, paying a fine, etc.

Benefits of the present invention over existing methods include: (a) a more secure payment method over existing and currently deployed methods, such as credit cards and smartcards, thus reducing credit card fraud and minimizing merchant's risk of fraudulent transaction, (b) a faster transaction cycle thanks to minimizing the customer's interaction with physical entities of existing Point of Sale systems (POS), i.e., cashier operators and swiping devices, and transaction parallelization, (c) enhanced customer convenience thanks to the ability to use any of multiple payment methods (bank cards, credit cards, etc.) while carrying a single device 112, memorizing a single PIN, and eliminating the signature process, and (d) increased ability to process multiple customer transactions concurrently for merchants.

Business models and methods for creating revenue from the deployment of such a system of the present invention are also presented, advocating a fee-per-transaction revenue stream. Additional potential revenue streams include the manufacturing and distribution of the handheld device 112, licensing of the technology and design of the handheld device 112, manufacturing and distribution of the merchant-owned device 102, licensing of the technology and design of the merchant device 104, and providing integration services for Point of Sale systems.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 34 to 41 provide additional detail of a content of the transaction message part of FIG. 33.

DETAILED DESCRIPTION OF THE PREFERRED EMBODIMENTS

The present invention is directed to a framework and a system for purchasing of goods and services. There are many aspects of the framework and system for purchasing of goods and services described herein.

The present invention presents a new concept for performing purchasing transactions in pervasive service environments, such as ordering and paying, in physical stores (physical Points Of Sale) by a consumer that uses a mobile device. The invention includes an overall framework, system architecture, a consumer operating a universal Pervasive Transaction Device 102 (UPTD 102), a merchant operating a merchant device 102, a third party operating a device that verifies purchasing transactions, and business models for the operator of such a system.

System Architecture

The system architecture of the UPTF of the present invention is shown in FIGS. 1-6, reference to which is made after an overview of the present invention.

The present invention includes Universal Pervasive Transaction Devices 102 (UPTD 102s, or UPTD 102 clients), Service Spots, a Secure Transaction Server, and an online payment service (OPS).

The Service Spots include one or more Access Points (AP) that provide wireless connectivity to UPTD 102 clients, one or more Merchant Server (MS) or Merchant Transaction Server (MTS 104), and other networking servers, such as a DHCP server, 802.1x authentication server, etc.

The Merchant Server is the merchant representative and includes UPTF Purchasing application software that handles the transaction workflow and security protocols, Merchant Retail Application software, which implements the application logic of the merchant's retail applications, and the presentation server, such as a world wide web (WWW) server, which serves the merchant content to the UPTD 102 and allows the consumer (through the UPTD 102) to interact with the Merchant Retail Application for the purposes of selecting what to order and/or purchase.

The Secure Transaction Server (STS 106) is responsible for deciding which transaction requests are legitimate and passes them to the payment service of a financial institution (preferably an Online Payment Service, or OPS, but which could also be a bank, a credit card processor, etc.) for further processing.

The Online Payment Service, which is an online account service that is run by a financial institution which is an organization that can process financial transaction requests. The following explanation is provide assuming that the financial institution is an online payment account organization such as PAYPAL, but the financial institution could be a bank, financial clearinghouse, or any institution that intermediates access to the banking system.

The final function of the STS 106 included in the UPTF of the present invention is to ensure that a transaction request is securely passed to the financial institution for fulfillment.

The architecture of the UPTF of the present invention is now explained with reference to FIGS. 1-6.

Figure 1:
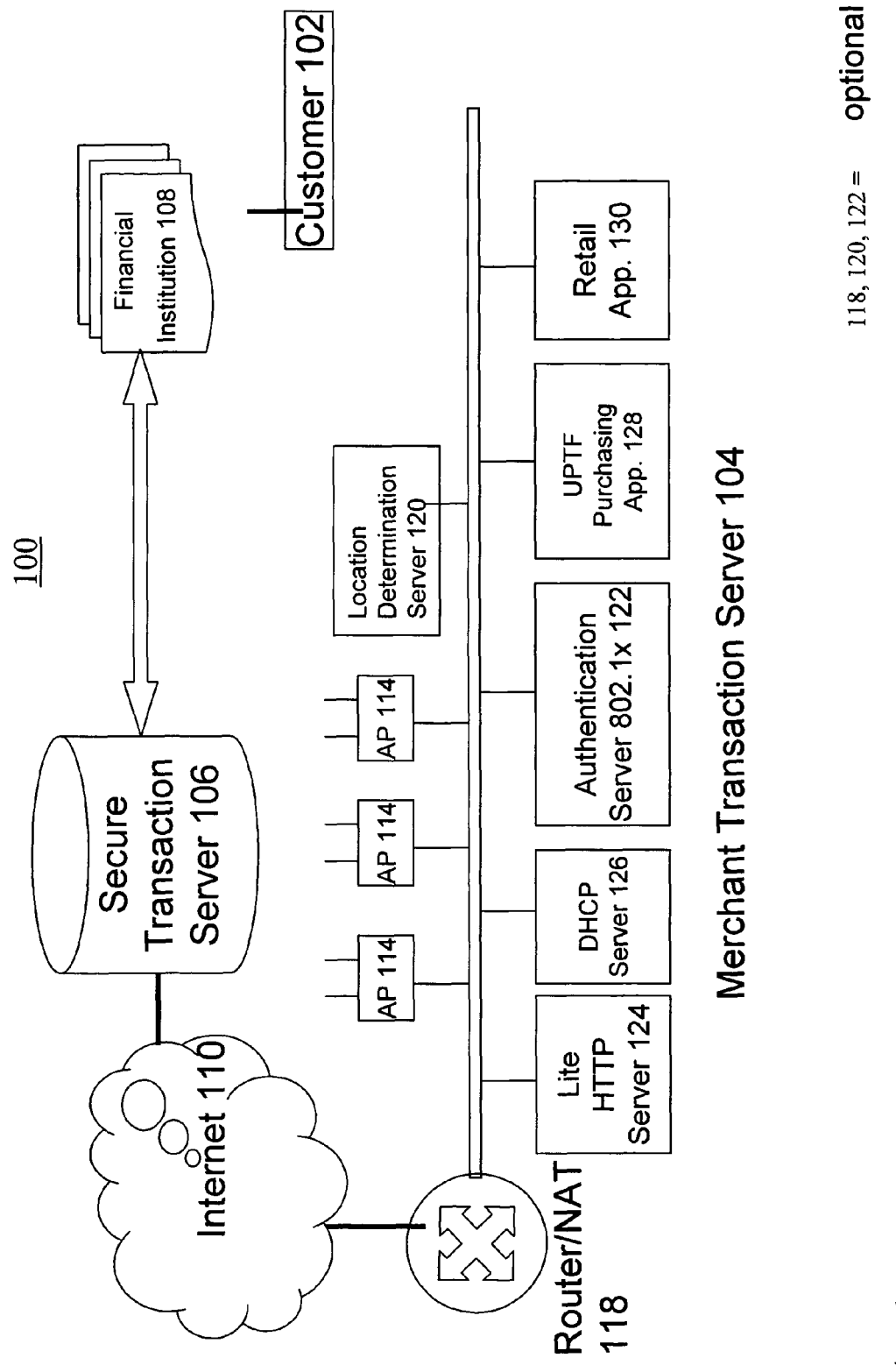
FIG. 1 shows the major components of a UPTF system of the present invention.

FIG. 1 shows the architecture of a UPTF computer system 100 of the present invention. One consumer device 102 (UPTD, or universal pervasive transaction device, 102), one merchant transaction server (MTS (merchant transaction server) 104, or simply merchant server, MS) 104, a Secure Transaction server 106 and one financial institution 108 are shown in FIG. 1. The mentioned MTS 104 components represent software functionality that is delivered by corresponding software modules. The software modules included in the MTS 104 can be located in different physical locations and computer systems.

As shown in FIG. 1, the UPTD 102 communicates directly with the MTS 104. The MTS 104 is coupled to the STS 106 through a network such as the Internet 110. The STS 106 then communicates with the financial institution 108 over a computer network.

Referring again to FIG. 1, the MTS 104 includes access points 114, coupled to a network 116 in communication with Router/NAT 118. The MTS 104 also optionally includes a location determination server 120 and optionally includes an authentication server 802.1x 122.

Also included in the MTS 104 are Lite HTTP Server 124, DHCP Server 126, UPTF Purchasing Application 128, and Retail Application 130.

In the MTS 104, Router/NAT 118, location determination server 120, and authentication server 802.1x 122 are optional components of the MTS 104.

Figure 2:
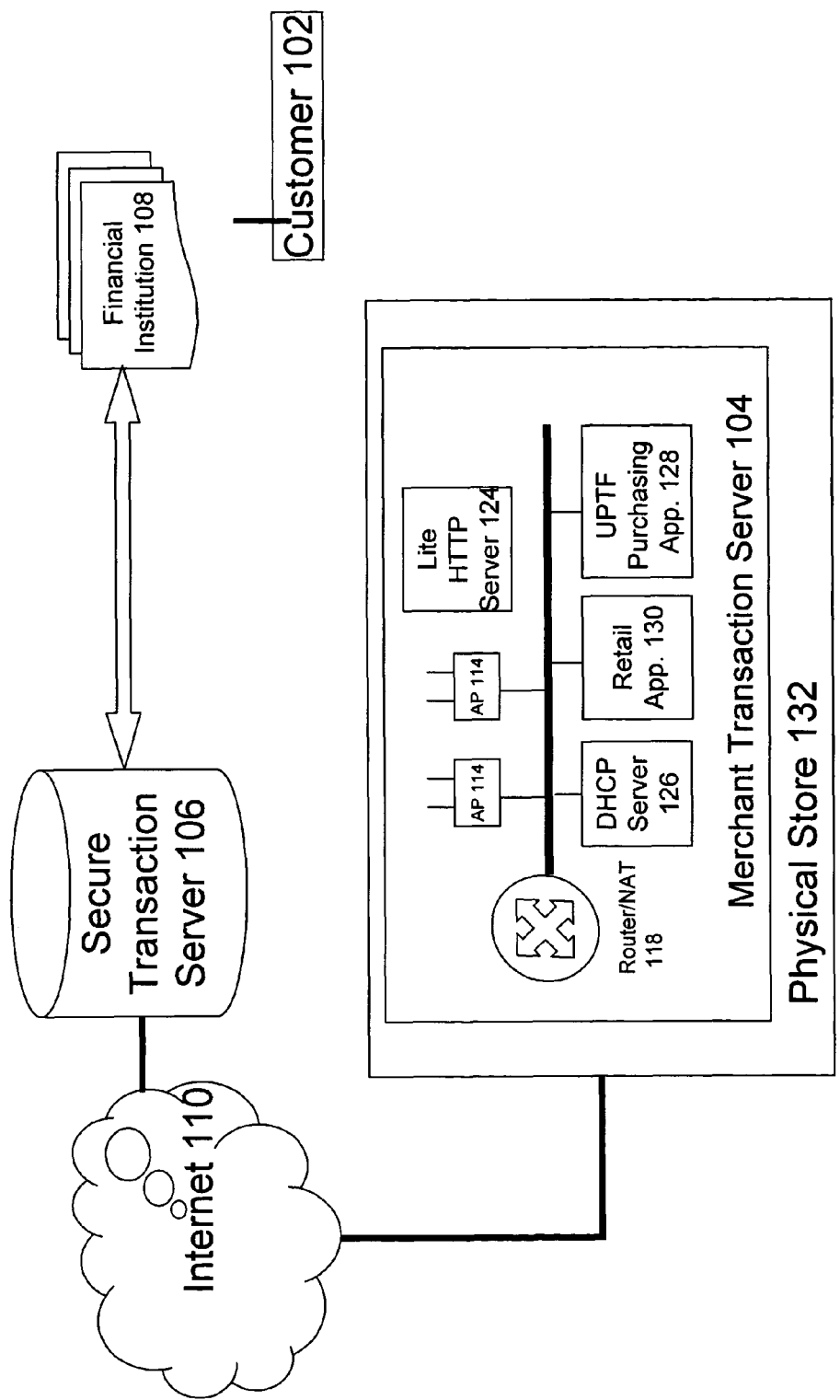
FIG. 2 shows a Merchant Transaction Server with all of its components in the same computing device 102 which is located in the physical store.

FIG. 2 shows a Merchant Transaction Server 104 with all of its components in the same computing device 104 (optional components are omitted for brevity); the computing device 104 is located in the physical store 132.

Figure 3:
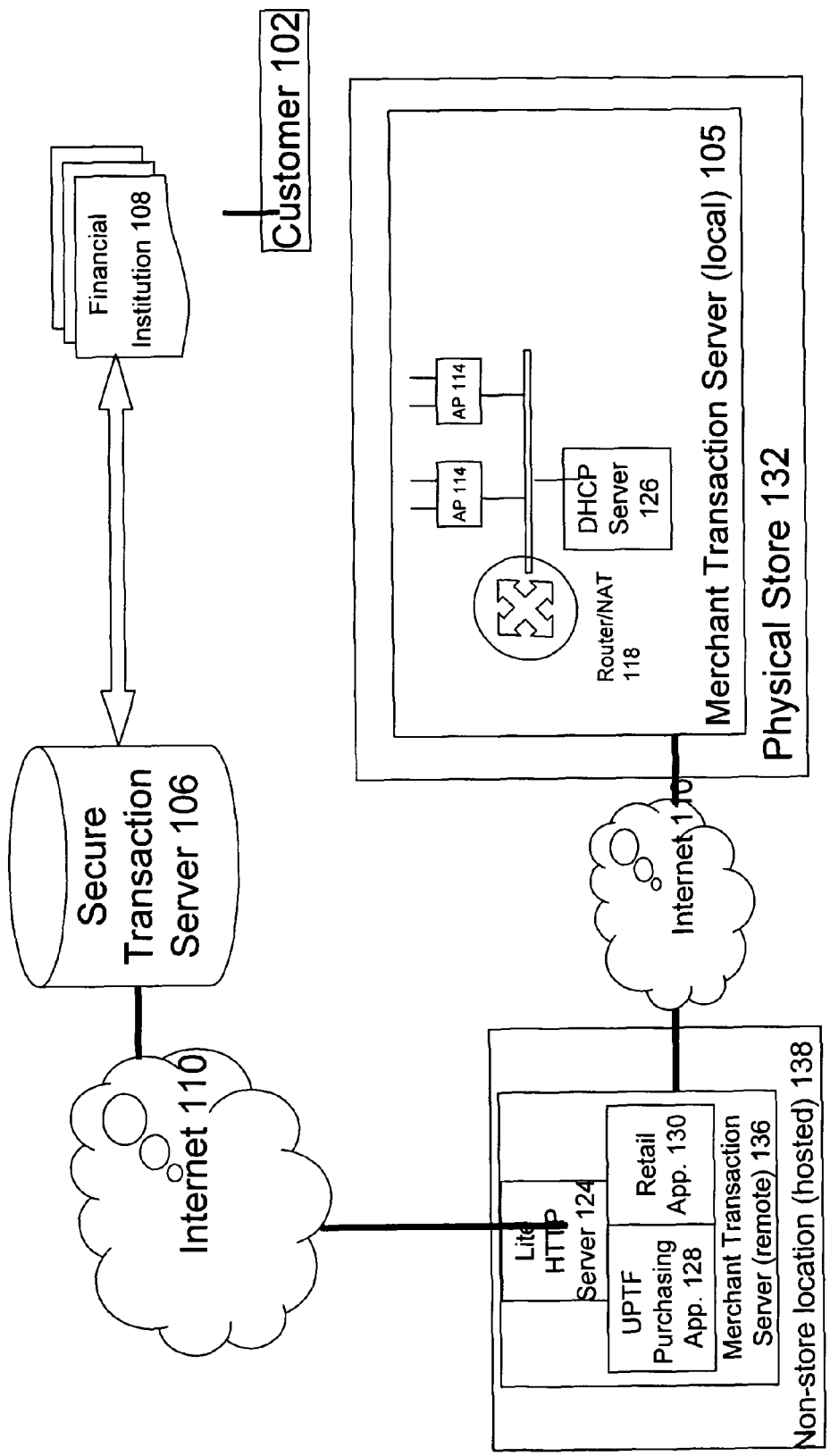
FIG. 3 shows a MTS 104 with only the Access Points and the DHCP server in the same computing device 102, in the store's physical location and the remaining MTS 104 components located in another computing device 104, located in another physical location which is accessible by the MTS 104 (local) over the internet.

FIG. 3 shows a MTS 104 with only the Access Points and the DHCP server in the same computing device 104 (a local Merchant Transaction Server 105), in the store's physical store 132 location and the remaining MTS 104 components located in another computing device 104 (a remote Merchant Transaction Server 136), located in another physical location 138 which is accessible by the MTS 104 (local) 105 over the internet 110.

Figure 4:
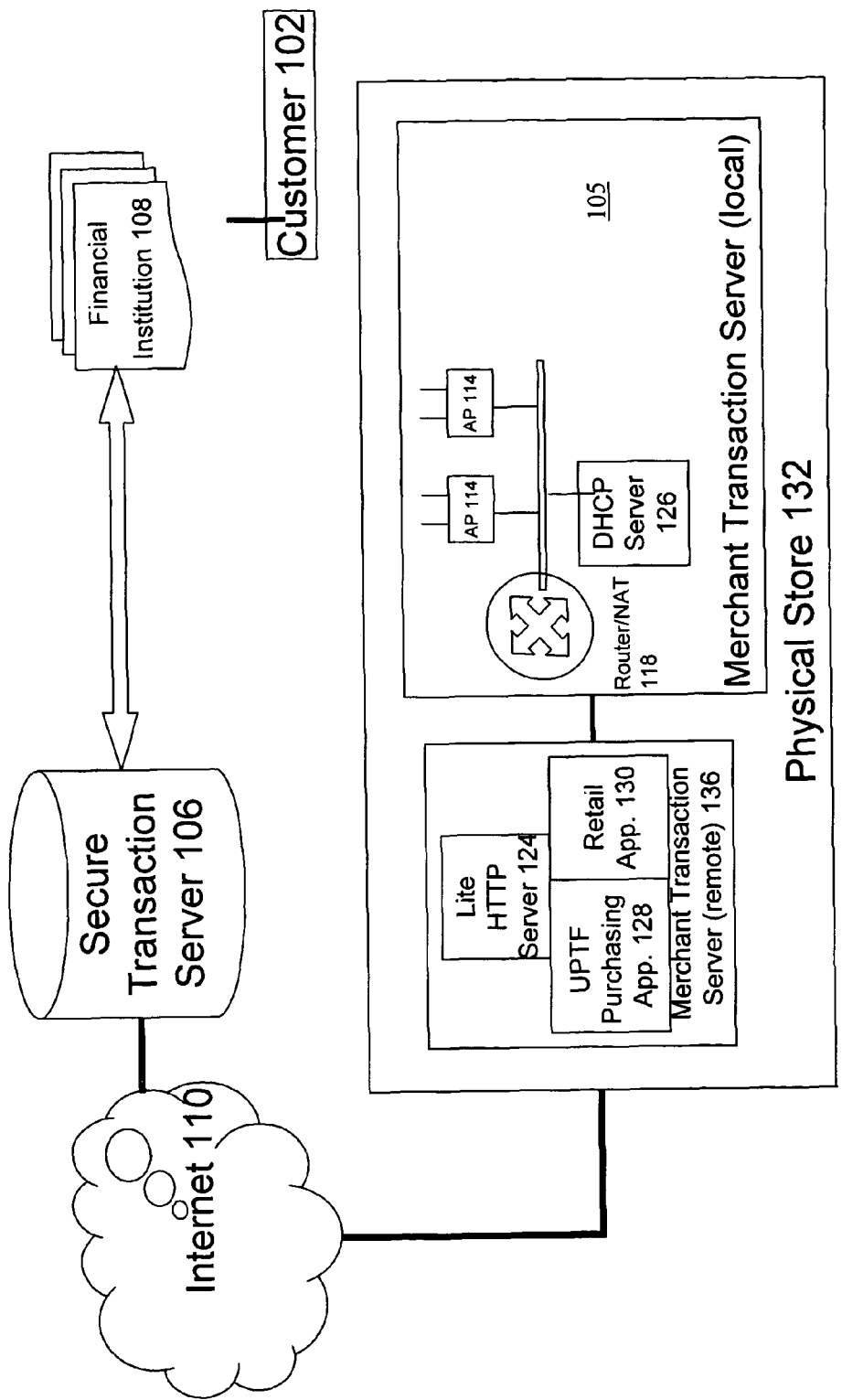
FIG. 4 shows the MTS 104 (remote) located in a computing device 104 that is different than that of the MTS 104 (local) but both are physically located in the same physical store location.

FIG. 4 shows the MTS 104 (remote) 136 is located in a computing device 102 that is different than that of the MTS 104 (local) 105 but both are physically located in the same physical store location 132 and coupled to each other through pathway 140.

Figure 5:
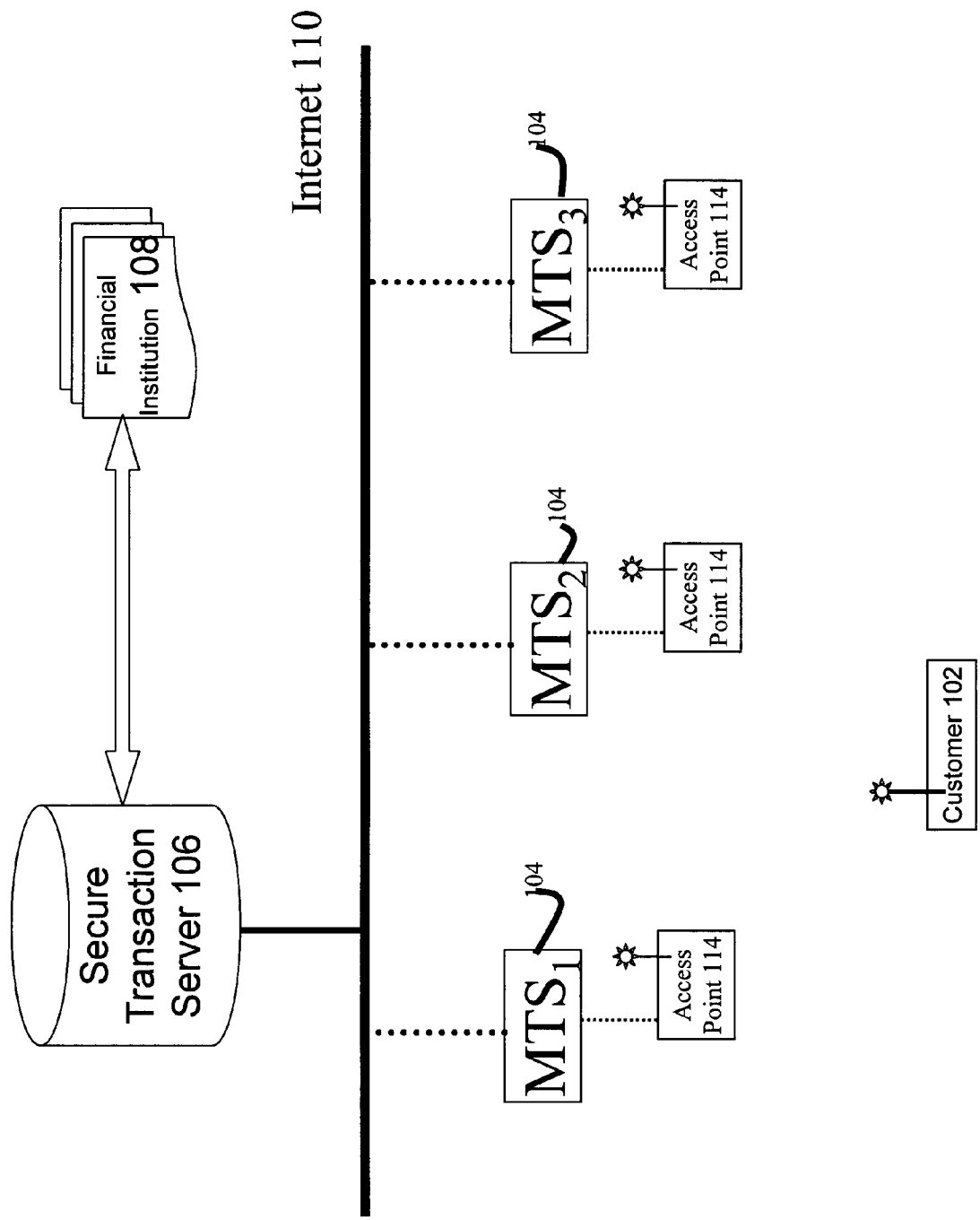
FIG. 5 shows an example of multiple MTS 104 deployed
Figure 6:
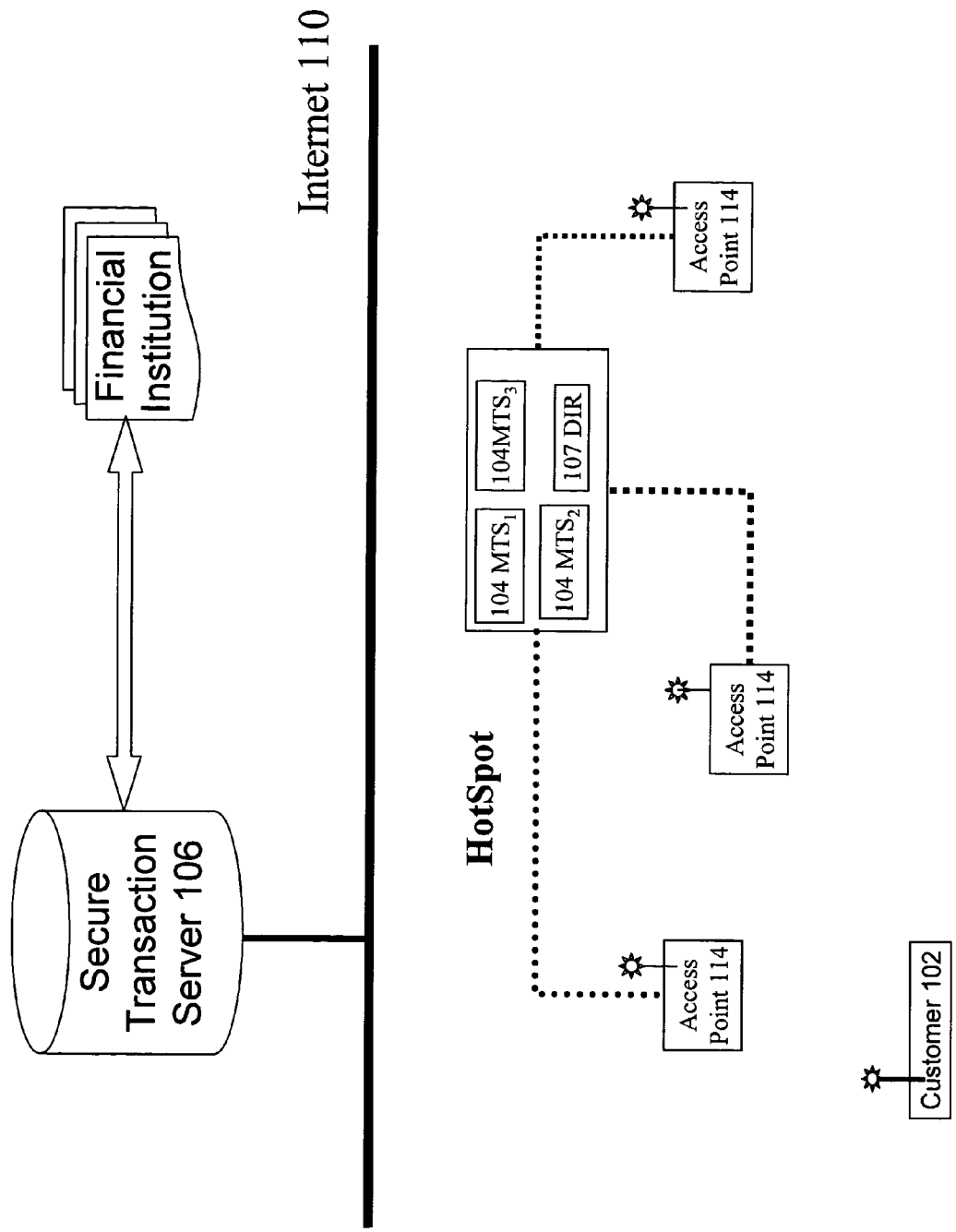
FIG. 6 shows an example of multiple MTS 104 deployed, sharing the Access Point infrastructure, as in a hotspot deployment

FIG. 5 shows multiple MTS 104 devices connected to the STS 106 and FIG. 6 shows multiple MTS 104 devices deployed in the same physical area (referred to as a hotspot) that covers a large retail area (where stores are available). The merchant devices share Access Points that provide wireless access to the merchant devices, which themselves might be located in the retail area or hosted elsewhere in the network. The device that is hosting the merchant stores also provides a directory 107 of the stores that are accessible via the aforementioned Access Points.

Service Spot

A more detailed explanation of a Service Spot is now presented.

A merchant essentially sets up a service spot in order to provide wireless transaction service access for the Merchant Server (MS) and connectivity to a Secure Transaction Server (STS 106). Specifically, the service spot performs at least the following functions:

Operated by an approved merchant

Provides a list of services that can be accessed through this service spot

Optionally, provides a minimum set of default services that every service spot should provide, such as user account status and balance, execution of transactions that a user conducted off-line, etc.

A service spot includes a connection (perhaps even an intermittent one) to the Internet and a wireless extension to it (WLAN, Bluetooth, IR, Zigbee, UWB, etc.).

Although IEEE 802.11b WLAN (also known as WiFi) is presented as a wireless connection, any other wireless mechanism supporting similar function could be included n a similar fashion with any other wireless mechanism or for a device 102 that operates by physically connecting into wired networks.

The UPTD 102

Next, a description of the UPTD 102 (the device 102) is presented.

The UPTD 102 includes the following features and capabilities:

2-way wireless communication capability (preferably IEEE 802.11b (WiFi) or 802.11a);

Processor and RAM memory;

FLASH memory for storage that is tamper-proof and protected from unauthorized reads;

a User Interface;

an LCD, such as a touch LCD);

buttons;

a Microphone;

a biometric device 102 such as fingerprint sensor;

power provided by a battery, such as a Li-ion battery, or a small solar panel or a combination of both;

a credit card size form factor;

a small footprint operating system (OS), such as LINUX; and device 102, or software, capable of generating timestamped random number sequences.

Secure Storage

These characteristics define a feature set of a UPTD 102, and each UPTD 102 is not required to include all of the foregoing features. Such a feature set can be implemented either as a special purpose device 102 (such as the one discussed later in the embodiment), or in a personal digital assistant (PDA), or a mobile phone equipped with some form of local wireless communication (infrared, Bluetooth, WLAN, RF-ID, visual displays, etc.) capabilities.

The UPTD 102 performs at least the following functions:

Optionally, once turned on, the device 102 requests user authentication, either by the user entering a PIN and/or through a biometric method; another authentication should be requested before authorizing any transaction;

Upon authorization the device 102 scans the airwaves for available service spots;

The device connects to a service spot the device 102 displays to the user available services (merchants and services that the merchant offers) and the user navigates through the offered services and selects which one to interact with;

the device 102 optionally presents to the user only "authenticated" services, that is services offered by an approved and authorized merchant that have been themselves been approved and authenticated;

On-board storage for records of the last n transactions; and

In a disconnected mode, the ability to cache transactions for completion when a live connection is accessible (service spot acts as a point of access to the network).

Figure 7:
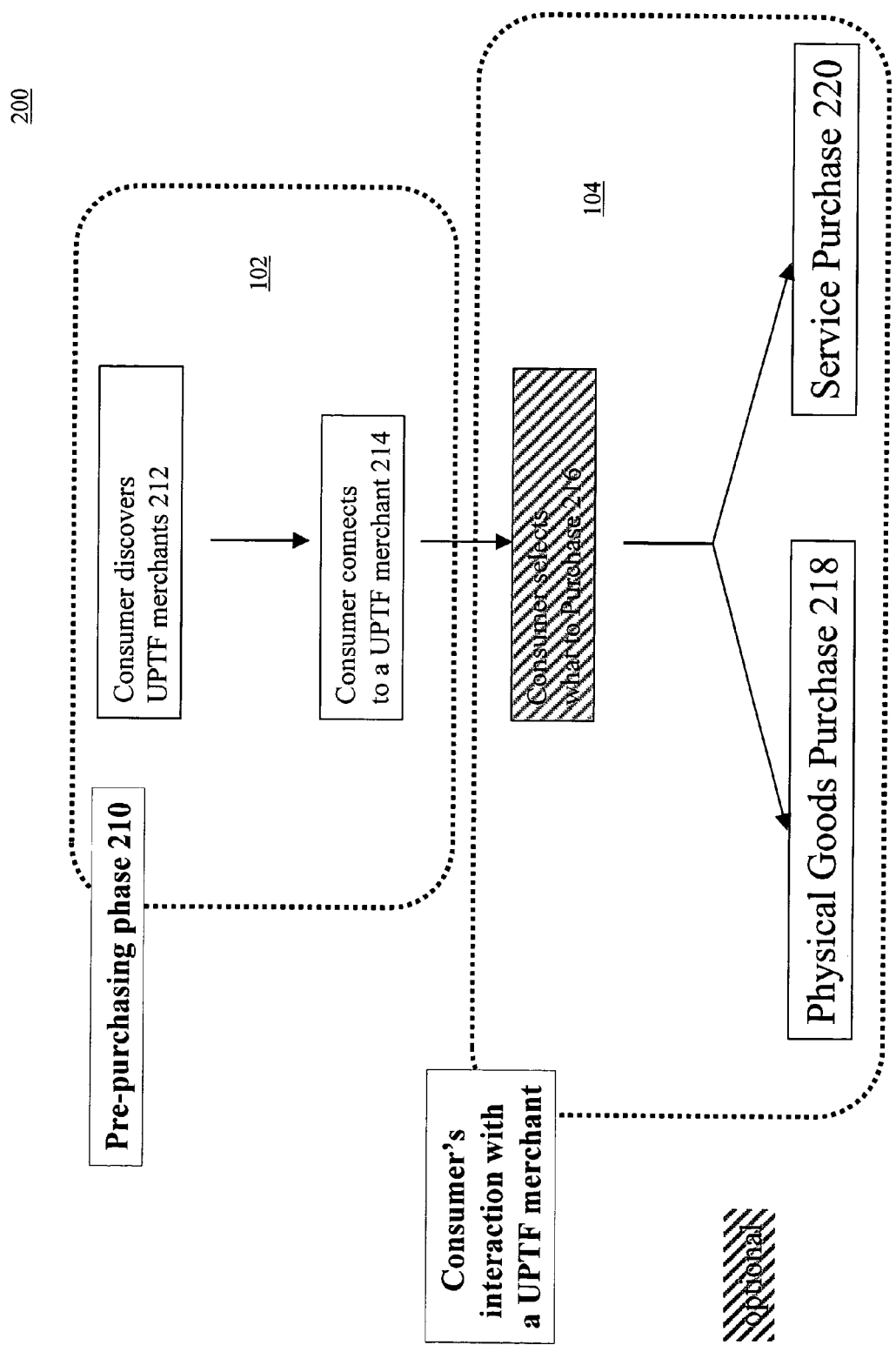
FIG. 7 shows the general workflow of a consumer's interaction with the merchant, through the consumer's UPTD 102.

FIG. 7 shows the general workflow 200 of a consumer's interaction with the merchant 104, through the consumer's UPTD 102.

Referring now to FIG. 7, upon initializing the UPTD 102 in the pre-purchasing phase 210, the UPTD 102 performs merchant discover 212 and upon the selection of the user, the UPTD 102 connects to a particular merchant 214. Depending on the type of purchase scenario, the consumer might or might not perform the "Select what to purchase" phase (optional) 216 and proceeds with either a physical goods purchase 218 or a service purchase 220. Each of these phases 218, 220 is subsequently described. Generally, the "select what to purchase" phase 216 is applicable in situations where the consumer has to place some order (such as when ordering at a restaurant, or buying tickets at a movie theater) and is not applicable in a payment at a cash register situations (such as when paying for one's groceries) at a supermarket.

Figure 8:
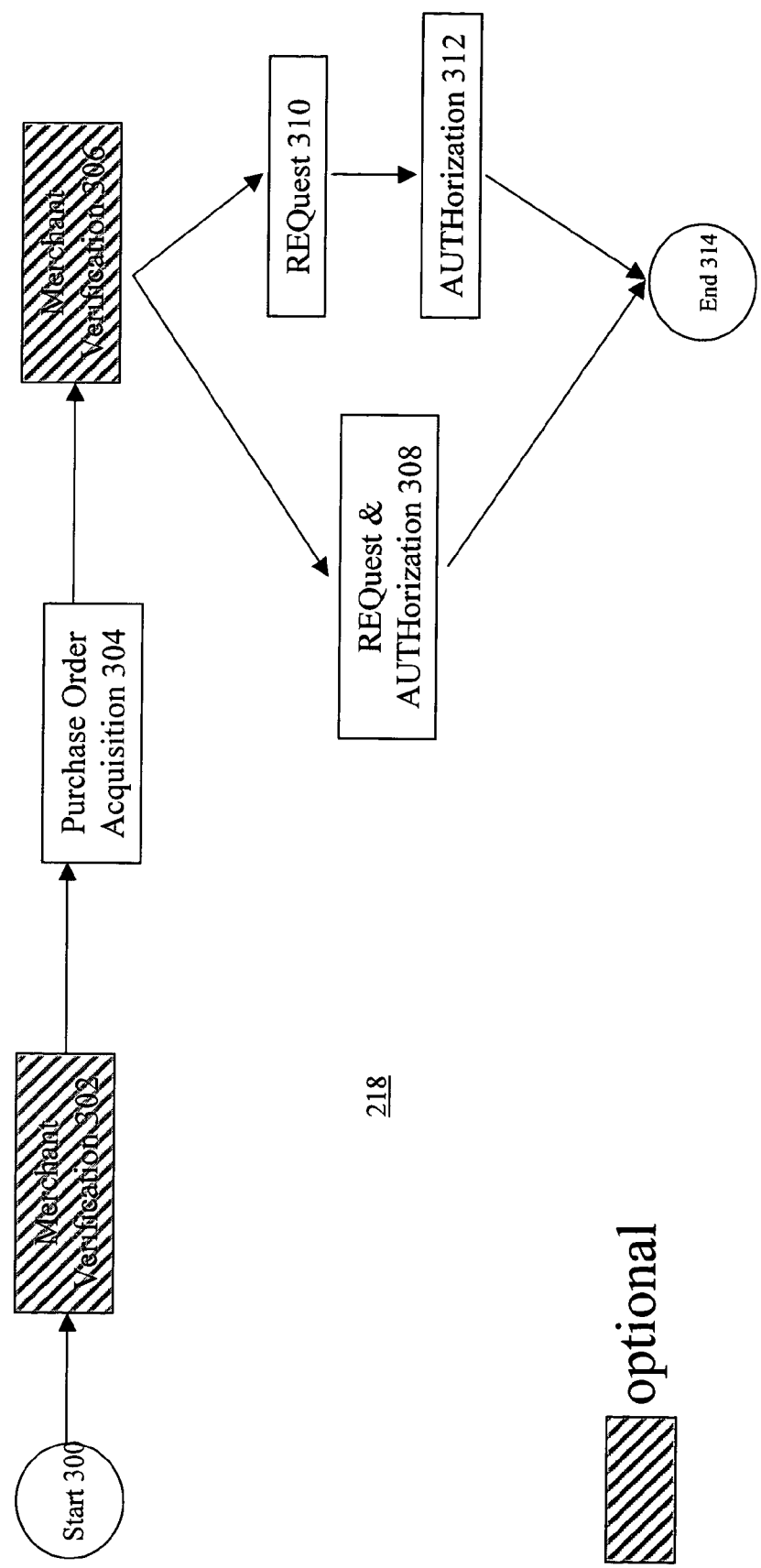
FIG. 8 shows the general workflow for a physical goods purchase (such as a Point of Sale, or POS, purchase, or paying the bill at a restaurant).

FIG. 8 shows the general workflow for a physical goods purchase 218 (such as a Point of Sale, or POS, purchase, or paying the bill at a restaurant).

As shown in FIG. 8, after the start 300 of the physical goods purchase 218, merchant verification 302 or merchant verification 306 occurs either prior to or after, respectively, purchase order acquisition 304. Merchant verification 302, 306 could be completely omitted.

As shown in FIG. 8, merchant verification 302, 306 is optional in the workflow 218. Merchant Verification may appear either before 302 or after 306 the Purchase Order Acquisition 304, or might be completely omitted. Every path from Start 300 to End 314 is a valid physical goods purchase workflow 218.

Each function 300, 302, 304, 306, 308, 310, 312, and 314 in FIG. 8 represents a function in the workflow 218 that is explained in subsequent figures. Each such function may be included in multiple pathways and multiple functions for some of them (e.g., Purchase Order Acquisition 304) are included.

Figure 9:
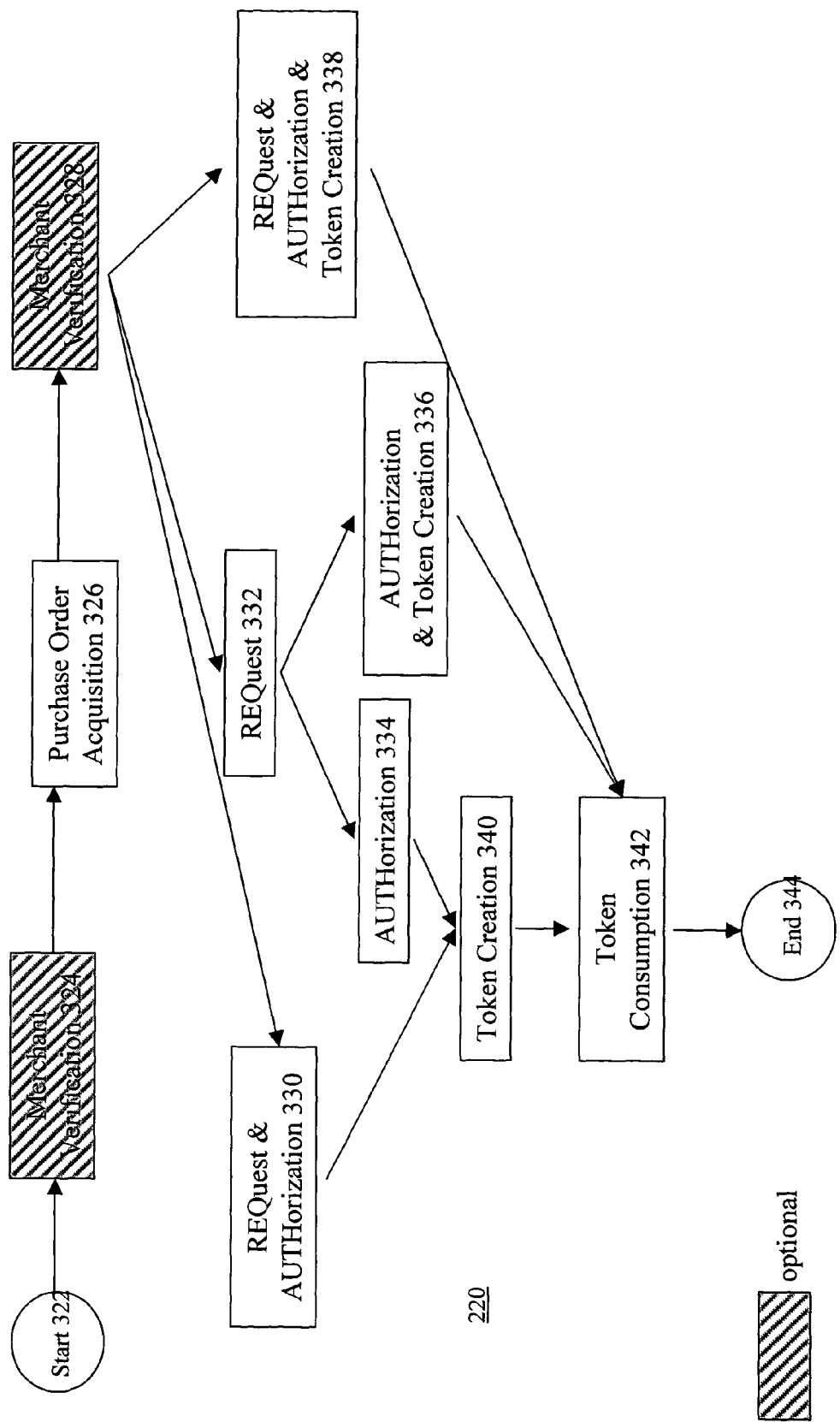
FIG. 9 shows the general workflow for a service purchase (such as buying a ticket at a movie theater and using it for admission).

FIG. 9 shows the general workflow for a service purchase 220 (such as buying a ticket at a movie theater and using it for admission). The term "service purchase" refers to both the purchase of a "ticket", or similar item that represents the right to access or use a service and the subsequent surrendering of the ticket for the purpose of service usage.

The merchant verification functions 324, 328 are optional in the workflow 220. Merchant Verification may appear either before 324 or after 328 the Purchase Order Acquisition 326, but not appear both before and after, or might be completely omitted. Every path from Start 322 to End 344 is a valid service goods purchase workflow. Each function in FIG. 9 represents a function in the workflow 220 that is explained in further detail in subsequent figures. Each such function may be included in multiple pathways and multiple functions for some of them (e.g., Purchase Order Acquisition 304) are included.

Transaction Flows

The transaction flows associated with the purchase of virtual goods and physical goods are now discussed in detail. Detailed accounts of the transaction flows can be found in FIGS. 10-28, and refer to FIG. 8 for physical goods and FIG. 9 for virtual goods (or services), respectively.

Before a detailed description of FIGS. 10-28 is presented, an overview of transactions for virtual goods and for physical goods is presented.

Transaction Flow for Virtual Goods

This workflow describes the processing involved when the service being purchased can be represented by a service token (or "virtual" goods). Typical examples of this type of transactions include purchasing a movie ticket, a bus ticket, or paying for parking or a highway toll. The transaction occurs in phases as described in FIGS. 7 and 9 (in more detail).

During the pre-purchasing phase, the customer discovers the available merchant in his vicinity browses and identifies the service she wishes to purchase. The details of the latter part of this phase are highly dependent on the type of service/goods to be purchased, the vendor's catalog system implementation, and the capacity of both the service spot type and client device 102. After the customer decides what to purchase, she indicates her intention to the merchant using the merchant specific interface delivered through the MS 104. After receiving the purchase request, the merchant's MTS 104 invokes the purchasing application that runs on the UPTD (described in detail herein below) and enters the purchasing phase.

The MTS 104 communicates with the UPTD 102 by generating a transaction proposal for this new transaction, which is in the form of a formatted purchase order, and sending the proposal back to the UPTD 102.

Upon receiving the transaction proposal, the UPTD 102 generates its own view of the transaction as described herein below. This view of the transaction is sent back to the MTS 104. The MTS 104 also computes its own view of the transaction. Both views are sent in the same secure communication session to the STS 106 for verification and authentication.

The STS 106 verifies the transaction using the matching rules specified herein below. After local verification that both parties are in good standing and of the legitimacy of the transaction, the STS 106 generates responses for both parties. If any error occurred during the verification and authentication process, an error response is generated for both parties indicating a transaction authorization failure and the corresponding reasons.

If the STS approved and eventually executed the transaction, i.e., the transfer of funds from payer (consumer) to payee (merchant), through means described herein below, the consumer's UPTD will also receive data that can be used to gain access to the service purchased or to consume such service. FIGS. 50 to 56, described in detail herein below, elaborate on the consumer's experience during such a service purchase and the execution of the associated workflow by his UPTD.

Transaction Flows for Physical Goods

The processing functions for transactions involving physical goods exchange are similar to those involving "virtual" goods. The most typical examples are paying for grocery, paying for appliances, etc, situations that generally describe payment at a cashier. The transaction occurs in phases as described in FIGS. 7 and 8 (in more detail).

A difference between transactions with physical goods and those without is the association between the goods and the consumer device 102. The problem does not appear in the case of a transaction to purchase a service, because the consumer can select the service to be purchased from his device. In the familiar example of paying for groceries using a charge card, checkout starts when a cashier opens a new virtual shopping cart on his cash register system for the new customer, then adding items to this shopping cart by scanning the items this customer wishes to purchase. Scanned physical goods are then packaged for customer pickup. After the creation of this virtual shopping cart, the cart needs to be associated with the customer's charge account. Such association is created when the customer swipes his/her credit/debit/membership card. The association can be created at any time after the virtual shopping cart is created. After the cashier finishes scanning all goods, and only after the association is created, the cashier will proceed with checkout payment by presenting the transaction to the customer charge card issuer for authorization.

The procedure is similar for using the UPTD 102. However, since the UPTD 102 communicates with the merchant MTS 104 via wireless link instead of a card swiping reader for charge card, there is a possibility of goods not being associated with the right UPTD 102. All the UPTD 102's in the range of the check-out point may be identified and potentially associated with the goods being scanned. Additional mechanisms are provided to prevent the MTS 104 from associating goods with devices 102 other than the customer's. The following is a discussion about a number of methods for creating such an association correctly.

The first option is to provide a transaction identification number to the consumer and the merchant devices. At some point prior to the handing over of physical goods, the merchant asks the consumer to present the transaction identification number and if they match, then the goods are handed over. A second option is to include a barcode or a barcode display on the client's UPTD device 102. Barcode is the simplest form of digitally readable identifier and it is almost universally available. Chances are that if a store sells physical goods, it has a barcode system installed for inventory and price check. Given the wide availability of barcode reading system and the maturity of the technology, adding a barcode to the UPTD 102 is the cheapest method to create the association because it does not require any additional hardware installation and maintenance. Also it is among the most reliable methods as well. Using this method, during the checkout process, the cashier may scan the UPTD 102 in order to receive the device 102 ID of the UPTD 102 and create the association between the goods being scanned and the customer's universal pervasive transaction account. Although the client would need to offer the UPTD 102 for scanning, the added action will increase client involvement of the checkout process and reduce the "disconnected-ness" or "not knowing what is going on" feelings of the customer. In addition, scanning of a customer's membership card is a common and well accepted practice in membership-ed retail stores so the level of added inconvenience is kept at minimum. In addition, adding a barcode reader adds security to the UPTD 102. Even though the device 102 ID of the UPTD is public and is "faked", the transaction will not succeed because of the encryption mechanism used by the STP. The barcode may be generated and displayed on the consumer device.

Other methods focus on the "physical proximity" between the client device 102 and the cashier. These methods include using technologies such as Infra Red (IR) or RF ID. In the first case, an IR transmitter is installed on each UPTD 102 and an IR reader is installed at each checkout lane. During checkout, the client needs to line up the IR transmitter with IR reader so the MTS 104 can receive the device 102 ID of the UPTD 102 over the IR communication link. In the second case, an RF ID is installed on each UPTD 102. If the ID is passive, an RF ID reader that uses an RF energy beam to activate the RF ID is required at each checkout lane. Because typically an RF ID has a very small transmission range, it is unlikely that the RF ID reader will pickup an RF ID of a device 102 in neighboring lanes or a different device 102 in the current checkout lane.

Other location determination technologies may also be employed for detecting the closest client device 102 from a cashier. Many of these techniques can use the WLAN communication on the devices 102 to perform location determination of the correct client. For example, special checkout lane antennas which can only receive wireless network signals of the client device 102 physically at the checkout counter may be installed to achieve the same level of proximity detection. The proximity of the client's device 102 can also be used as a form of security effectively preventing remote users from easily pretending to be present at a checkout station.

The UPTD 102 permits unmanned self-checkout stations, where the customer can, for example drop the items in a basket-like apparatus, so that the items can be immediately identified (perhaps using RF ID's attached to the item) and immediately generate a virtual shopping cart associated with the customer's UPTD 102 for transaction completion.

No matter what method is used to create the association, balance is struck between the probability of erroneous associations, the cost of installing and maintaining additional equipments and the convenience and ease of using UPTD 102 for checkout. At the beginning of the next phase, the transaction proposal by the merchant will include a list of items and their prices. Thus before hitting the "pay" button on his device 102, the client still has a chance to conduct a final inspection on the goods he/she is paying for.

The pre-authorization phase is identical to the transactions for virtual goods so the details are omitted here. The last "payment" phase is even simpler than that of a virtual good transaction because no token and token certificate is generated. Finally, the association between the shopping cart and the UPTD 102 can occur before or after the items are entered into the cart.

In another approach to the problem discussed, the consumer can use their device to "browse" to the virtual location of the cashier station that he is using to check out. This way he will see on his device the total amount of his purchase once the cashier has completed the "virtual" shopping cart and select to pay for it with their device. Although some other consumer might be able to do that too, one would not want to pay for someone else's groceries, so barring impatient consumers waiting in line, each consumer will end up paying for the items he is purchasing.

At a high level, the payment phase for a physical goods purchase does not differ from that of a service purchase, although in the case of a physical goods purchase the consumer does not need to present additional data in order to take possession of the purchased goods.

Returns, Cancelled Orders and Aborted Transactions

The fund transfer does not occur until the STS 106 receives acknowledgements from both client and merchant. Before this occurs, both the client and the merchant can cancel or abort the transaction at any point. Following the acknowledgement, returns are treated as a new transaction. The return transaction can also be realized in this framework, but details are omitted as it should be possible to implement such a system given the following discussion.

Details of Transaction Flows

FIGS. 10-28 are detailed descriptions of the functions shown in the purchase workflows 218, 220 of FIG. 8 and FIG. 9 respectively. FIGS. 10-28 show the actions of each of the Consumer (using UPTD 102), Merchant (using the Merchant Transaction Server 104) and Secure Transaction Server (STS) 106, and their respective communication (messages and other information exchanged between the involved parties) during the performance of the described workflow (or element).

"Consumer" stands for either the consumer's device 102 (consumer UPTF client device 102, or UPTD 102), or the combination of the UPTD 102 and its registered owner's (consumer, the person) interaction with it. The functionality of the UPTD 102 can be included in a standalone device or as part of a mobile phone or personal digital assistant (PDA).

Similarly, "Merchant" stands for either the merchant's device 104 (merchant UPTF device 104, or MTS 104), or the combination of the MTS 104 and its registered owner's (merchant, the person, or its representatives) interaction with it.

All messages from the consumer to the STS and the STS's responses to the consumer, even if such messages are forwarded to the STS by the merchant (or to the consumer, by the merchant) are encrypted according to the Security Agreement Submission (SAS) protocol, which is also referred to as the Secure Transaction Protocol (STP) or Secure Pervasive Transaction Protocol (SPTP) described) herein after. The SAS protocol is described in U.S. patent application Ser. No. 10/458,205, the contents of which are incorporated herein by reference, and, as related to the present invention, is discussed herein below with reference to FIGS. 57-63. The STP refers to the SAS adapted for purchase transactions as described in this invention.

Similarly, all messages from the merchant to the STS and the STS's responses to the merchant are encrypted according to the Secure Transaction Protocol (STP described) herein after. According to the STP, messages from either the consumer or the merchant to the STS include an encrypted part that can only be decrypted by the STS, which has access to all the necessary information for deciding the key that was used by the consumer (or the message) in order to encrypt the encrypted part of the message. As a result, even if the consumer's message to the STS is delivered by the merchant to the STS, the merchant is unable to read the encrypted part of the consumer's message to the STS, or to alter it in such a way that the STS will still believe that the message originated from the consumer. Similarly, when the STS sends a response to the consumer, that message to the consumer contains and encrypted part, that is encrypted with a key that is unique to that consumer. Only that consumer has all the information needed to reproduce that key and use it to decrypt the encrypted part of that message. Even if the STS's message to the consumer is delivered through the merchant the merchant will be unable to read or alter the encrypted part of the message in such a way that the consumer can be deceived about the response of the STS.

The following discussion with respect to FIGS. 10-28 applies to both a physical goods purchase 218 shown in FIG. 8 and a service purchase 220 shown in FIG. 9. That is, in FIGS. 10-28, merchant verification refers to merchant verification 302, 306, 324, and 328; purchase order acquisition refers to purchase order acquisition 304 and 326; REQuest and AUTHorization refers to REQuest and AUTHorization 308 and 330; REQuest refers to REQuest 310 and 332; and AUTHorization refers to AUTHorization 312 and 334.

Figure 10:
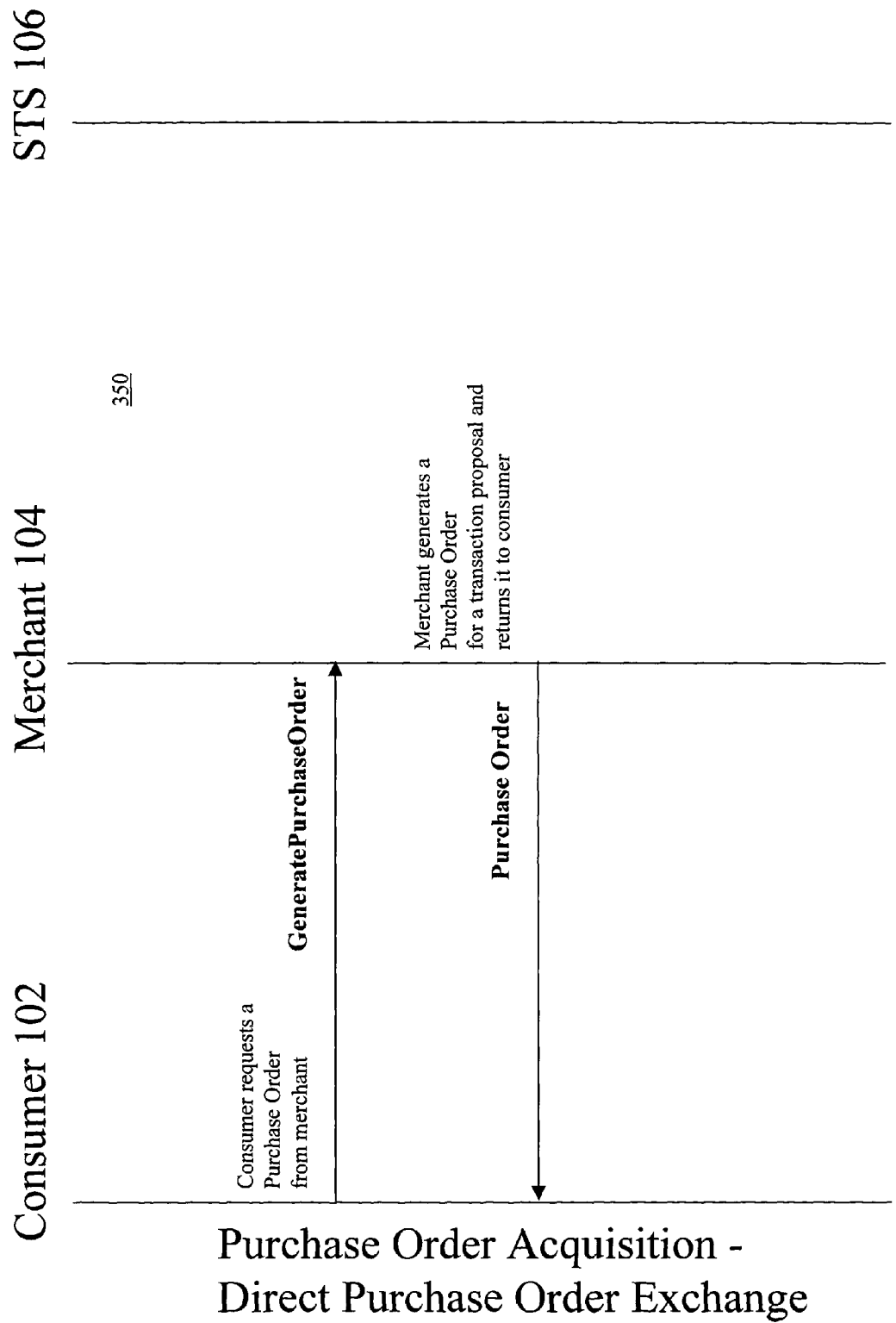
FIG. 10 shows one method for Purchase Order Acquisition

FIG. 10 shows a method 350 for Purchase Order Acquisition, referred to as Direct Purchase Order Exchange. "Purchase Order Acquisition" is the process during which the merchant communicates to the consumer the Purchase Order relating to the transaction to be attempted between merchant and consumer. A Purchase Order includes at a minimum, the amount of the transaction and some information that identifies (or can be used to identify) the merchant; in addition a Purchase Order may also include the time that the Purchase Order was issued (typically, the current local time for the merchant).

As shown in FIG. 10, the consumer 102 requests a purchase order from the merchant 104 by GeneratePurchaseOrder. The merchant 104 generates a purchase order for a transaction proposal and returns it to the consumer 102.

Figure 11:
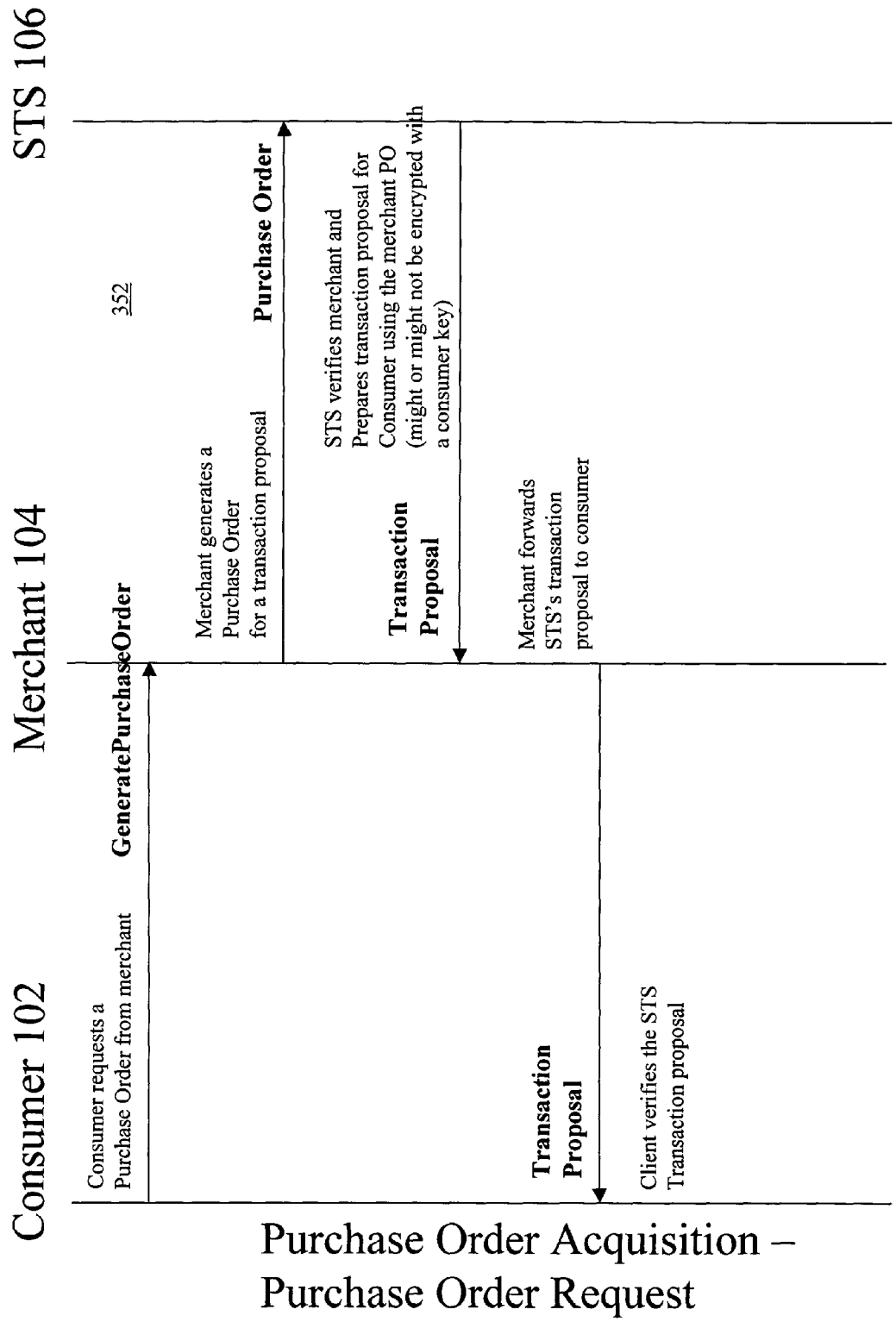
FIG. 11 represents another method for Purchase Order Acquisition that includes the STS 106 in the process.

FIG. 11 shows another method 352 for Purchase Order Acquisition, Purchase Order Request, that includes the STS 106 in the process. As shown in FIG. 11, the consumer 102 requests a purchase order from a merchant 104. The merchant 104 generates a purchase order for a transaction proposal and forwards it to the STS 106. The STS 106 verifies the merchant 104 and prepares the transaction proposal for the consumer 102 using the merchant 102 purchase order (which is encrypted with the consumer's key). The merchant 104 forwards the STS 106's transaction proposal to the consumer 102. The consumer 102 verifies the STS 106's transaction proposal.

Figure 12:
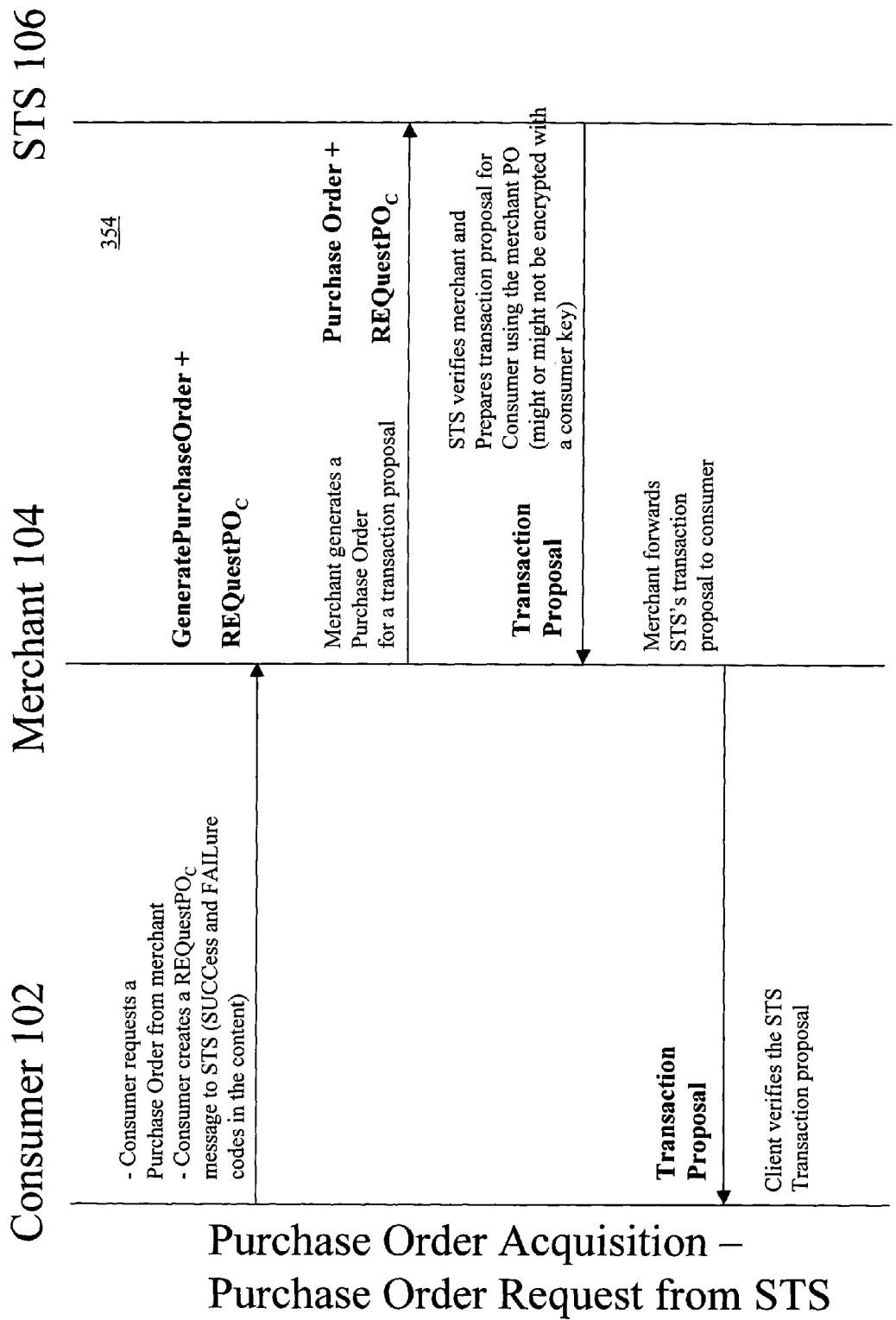
FIG. 12 represents yet another method for Purchase Order Acquisition that includes the STS 106 in the process.

FIG. 12 shows yet another method 354 for Purchase Order Acquisition, Purchase Order Request from STS 106, that includes the STS 106 in the process. As shown in FIG. 12, the consumer 102 requests a purchase order from a merchant 104 and creates and includes a REQuest PO message to the STS 106 in which SUCCess and FAILure codes in its content. The merchant 104 generates a purchase order for a transaction proposal and forwards it to the STS 106. The STS 106 verifies the merchant 104 and prepares the transaction proposal for the consumer 102 using the merchant 102 purchase order (which is encrypted with the consumer's key). The merchant 104 forwards the STS 106's transaction proposal to the consumer 102. The consumer 102 verifies the STS 106's transaction proposal.

Any of the Purchase Order Acquisition methods of FIGS. 10, 11, 12 can be used in each of the workflows of FIGS. 8, 9 but each of these Purchase Order Acquisition methods has different advantages and properties. The methods of FIGS. 11, 12 can be used to ensure that the Purchase Order received by the consumer has been generated by the merchant that is mentioned in the Purchase Order and that this merchant is a merchant capable for transactions verified by the STS 106.

Figure 13:
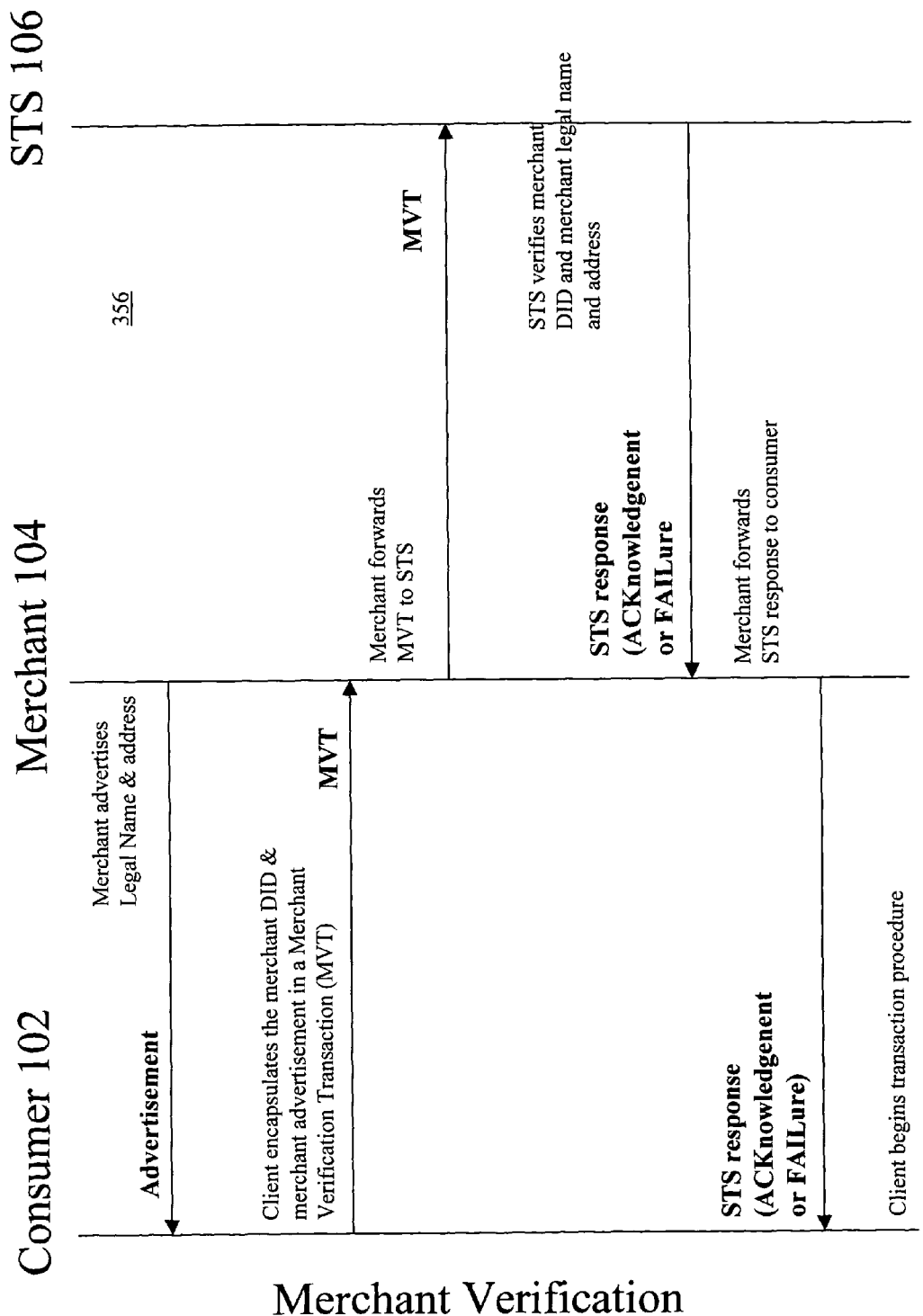
FIG. 13 shows a method for Merchant Verification.

FIG. 13 shows a method 356 for Merchant Verification. As shown in FIG. 13, a merchant transmits an advertisement (including the merchant legal name and address) to the consumer 102. The consumer 102 encapsulates the merchant DID and merchant advertisement in a merchant verification transaction (MVT) and transmits the MVT to the merchant 104. The merchant 104 forwards the MVT to the STS 106. The STS 106 verifies the merchant DID and the merchant legal name and address. The STS 106 provides a response (acknowledgement or failure) to the merchant 104, which forwards the STS 106 response to the consumer 102. The consumer 102 begins the transaction procedure, based upon the STS 106 response.

Figure 14:
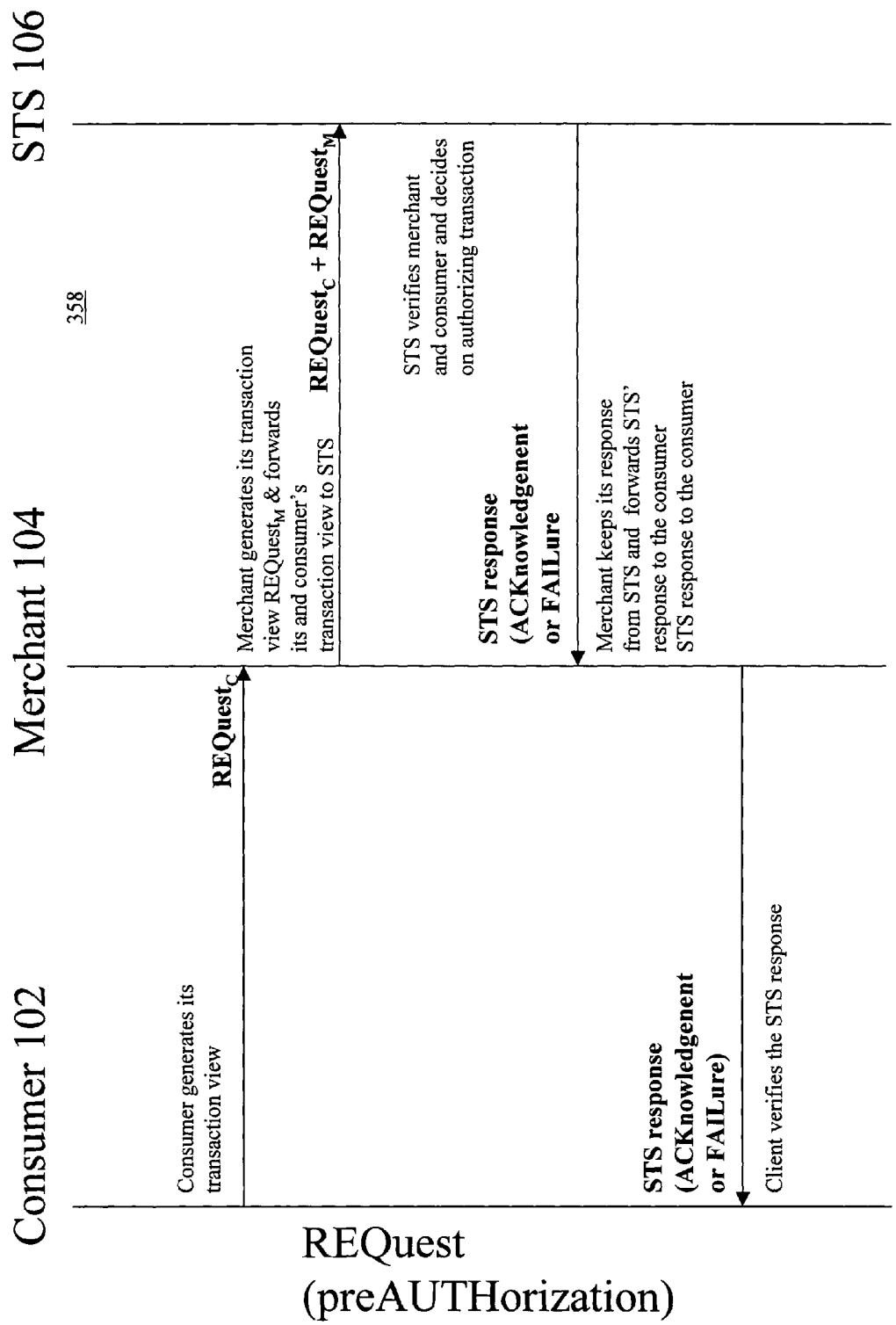
FIG. 14 shows a method for a consumer to request a transaction.

FIG. 14 shows a method 358 for a consumer 102 to request a transaction. This method 358 is referred to as pre-authorization because, by itself, it does not authorize a transaction to be executed with the financial institution. As shown in FIG. 14, the consumer 102 generates its transaction view request and transmits its transaction view request to the merchant 104. The consumer might see on his device a representation of a Purchase Order and enter his PIN in order to initiate the process of the device creating its view request. The merchant 104 generates its transaction view request and forwards the merchant's transaction view request and the consumer's transaction view request to the STS 106. The STS 106 verifies the merchant and the consumer based upon each, respective, transaction view request, and determines whether to authorize the transaction based thereon. The STS 106 then transmits a response (an acknowledgement or a failure) to the merchant 104. The merchant 104 keeps its response from the STS 106 and transmits the STS' response for the consumer 102 to the consumer 102. The consumer 102 then verifies the STS 106's response.

Figure 15:
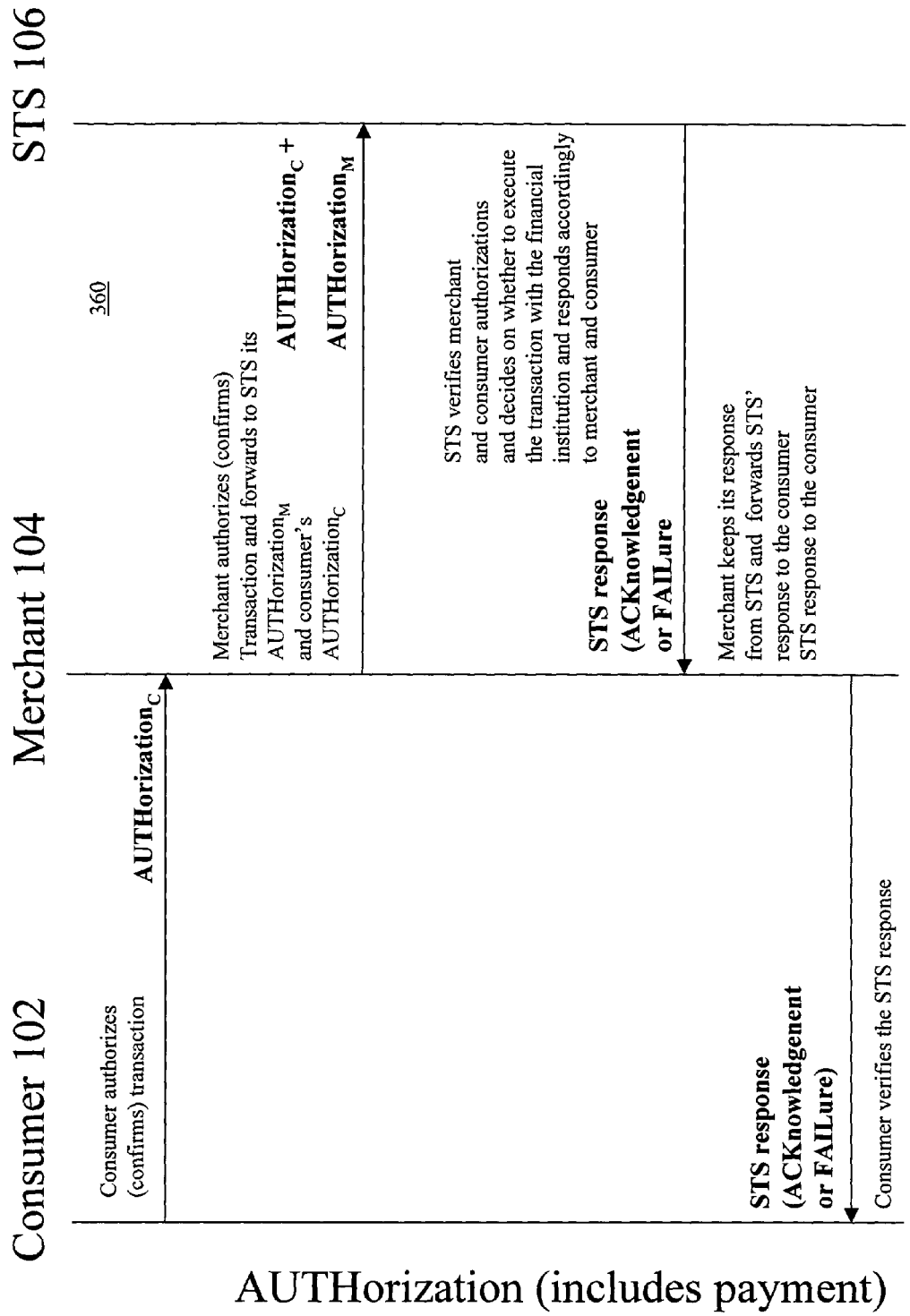
FIG. 15 shows a method for authorizing a transaction, following a request for a transaction.

FIG. 15 shows a method 360 for authorizing a transaction (including a payment). The method 360 includes the execution of a transaction (actual payment) with the relevant financial institution. As shown in FIG. 15, the consumer 102 authorizes (or confirms) a transaction by transmitting an authorization to the merchant 104. The consumer might see on his device a request to confirm and authorize this transaction, or he might see a listing of the account available for paying for this transaction and upon selecting a financial account for such payment the device will generate its authorization. The merchant 104 authorizes (or confirms) the transaction and forwards to the STS 106 its authorization and the consumer 102's authorization of the transaction. The STS 106 verifies the merchant and the consumer authorizations and determines whether to execute the transaction with the financial institution, and responds accordingly to the merchant 104 and consumer 102. The merchant 104 keeps its response from the STS 106 and transmits the STS' response for the consumer 102 to the consumer 102. The consumer 102 then verifies the STS 106's response.

Figure 16:
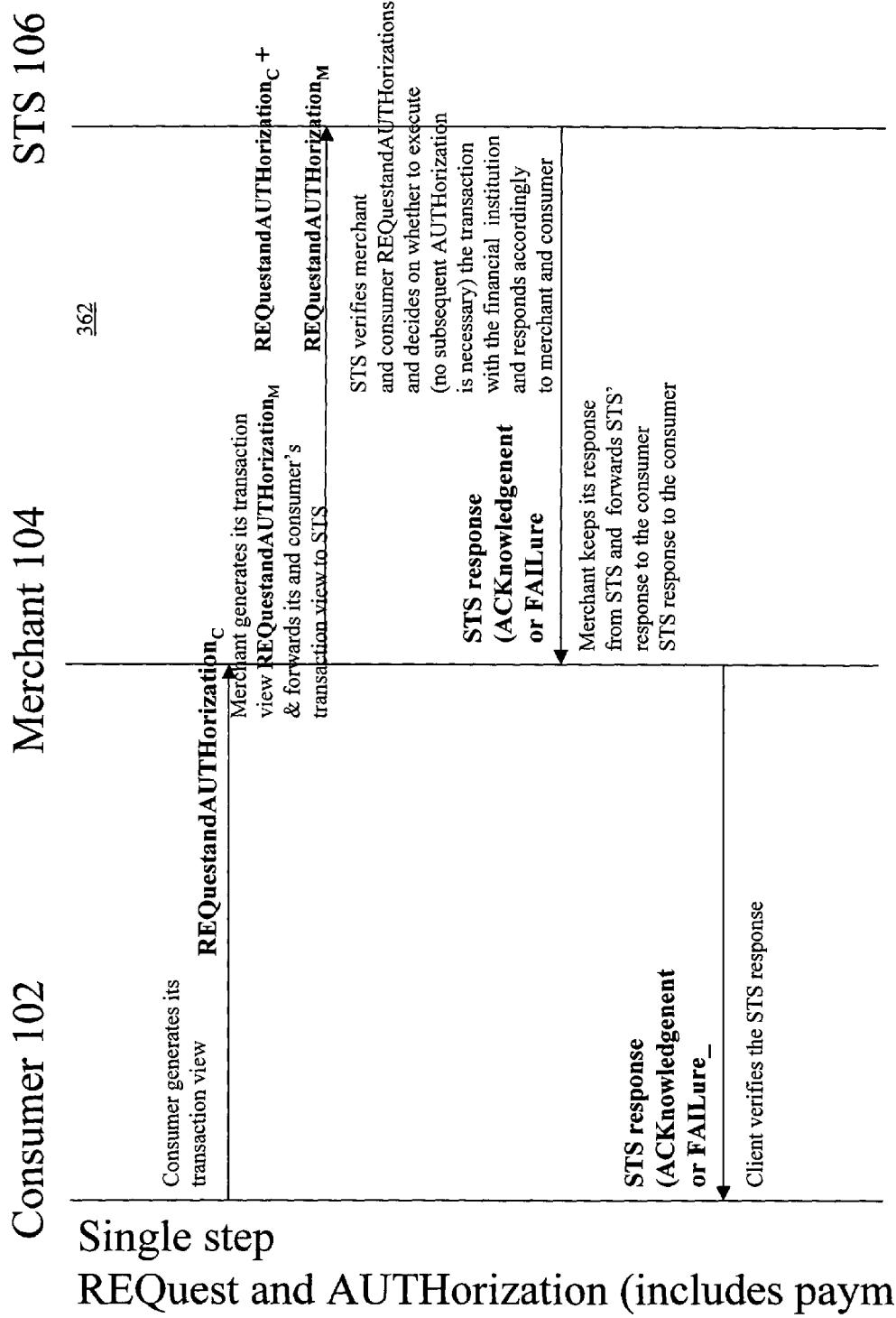
FIG. 16 shows a method for a single step request and authorization of a transaction.

FIG. 16 shows a method 362 for a single step request and authorization of a transaction. This method includes the execution of a transaction (actual payment) with the relevant financial institution. As shown in FIG. 16, a consumer 102 generates its transaction view request and authorization and transmits its transaction view request and authorization to the merchant 104. The consumer might see on his device a representation of the purchase order and asked for his PIN and authorization using his default financial account for payment. The merchant 104 generates its transaction view request and authorization and forwards its transaction view request and authorization and the consumer 102's transaction view request and authorization to the STS 106. The STS 106 verifies the merchant and consumer transaction view request and authorizations, and determines whether to execute the transaction with the financial institution, and responds accordingly to the merchant 104 and the consumer 102. The merchant 104 keeps its response from the STS 106 and transmits the STS' response for the consumer 102 to the consumer 102. The consumer 102 then verifies the STS 106's response.

Figure 17:
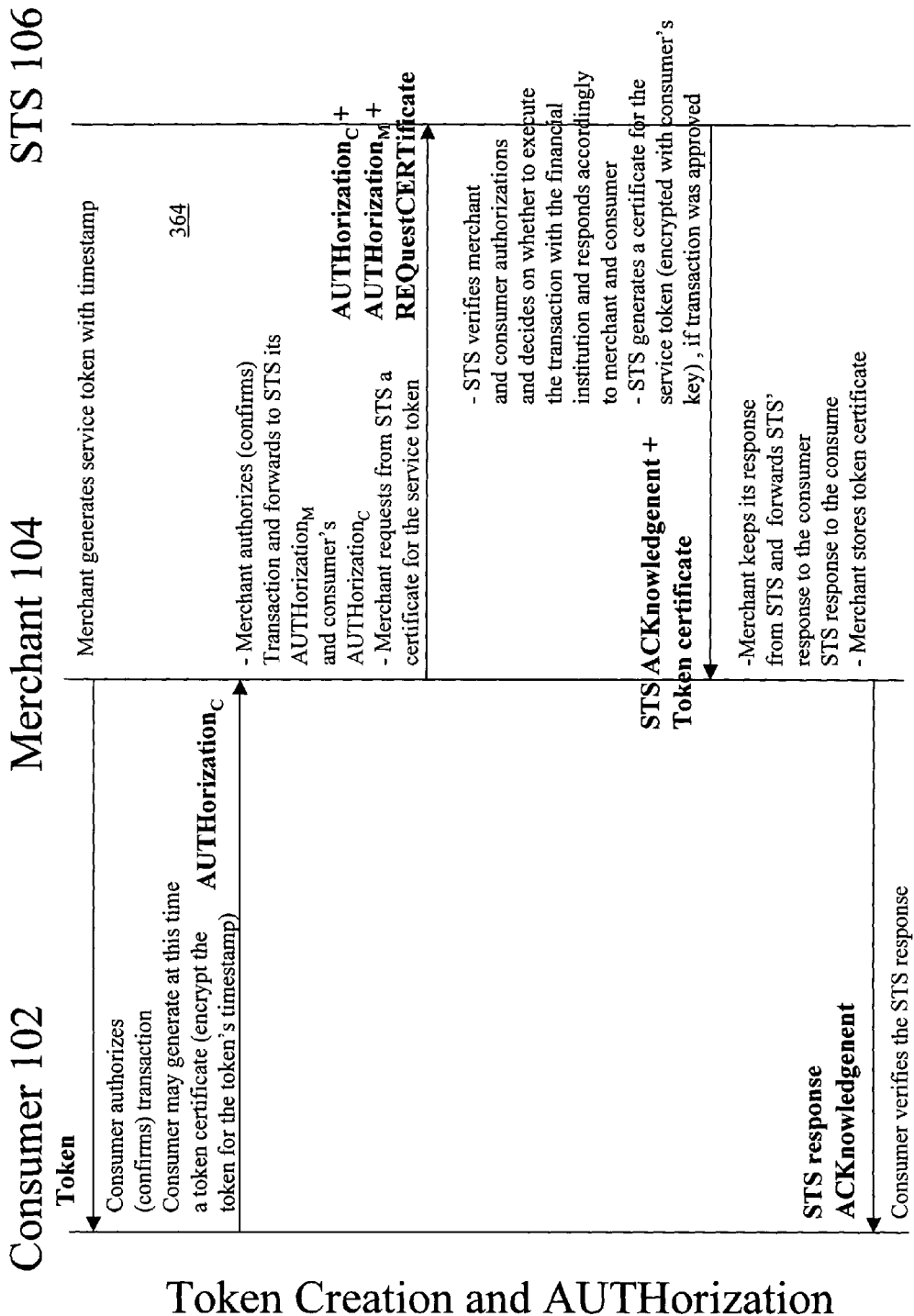
FIG. 17 shows a method for creating a service token (to be later used for gaining access to a service) and authorization of the associated transaction (includes the actual payment with the related financial institution).

FIG. 17 shows a method 364 of creating a service token (to be later used for gaining access to a service) and authorization of the associated transaction (includes the actual payment with the related financial institution). As shown in FIG. 17, the merchant generates a service token with timestamp and transmits it to the consumer 102. The consumer 102 authorizes (or confirms) a transaction. The consumer might see on his device a request to confirm and authorize this transaction, or he might see a listing of the account available for paying for this transaction and upon selecting a financial account for such payment the device will generate its authorization. The consumer 102 may generate a token certificate (by encrypting the token for the token's timestamp). The consumer 102 transmits the consumer's authorization to the merchant 104. The merchant 104 authorizes (or confirms) the transaction and forwards to the STS 106 its authorization and the consumer 102's authorization. In addition, the merchant 104 requests from the STS 106 a certificate for the service token. The STS 106 verifies the merchant 104 and consumer 102 authorizations and determines whether to execute the transaction with the financial institution, and responds accordingly to the merchant 104 and consumer 102. That is, the STS 106 generates a certificate for the service token encrypted with the consumer 102's key if the transaction was approved. The merchant 104 keeps its response (and stores the token certificate) from the STS 106 and transmits the STS' response for the consumer 102 to the consumer 102. The consumer 102 then verifies the STS 106's response.

Figure 18:
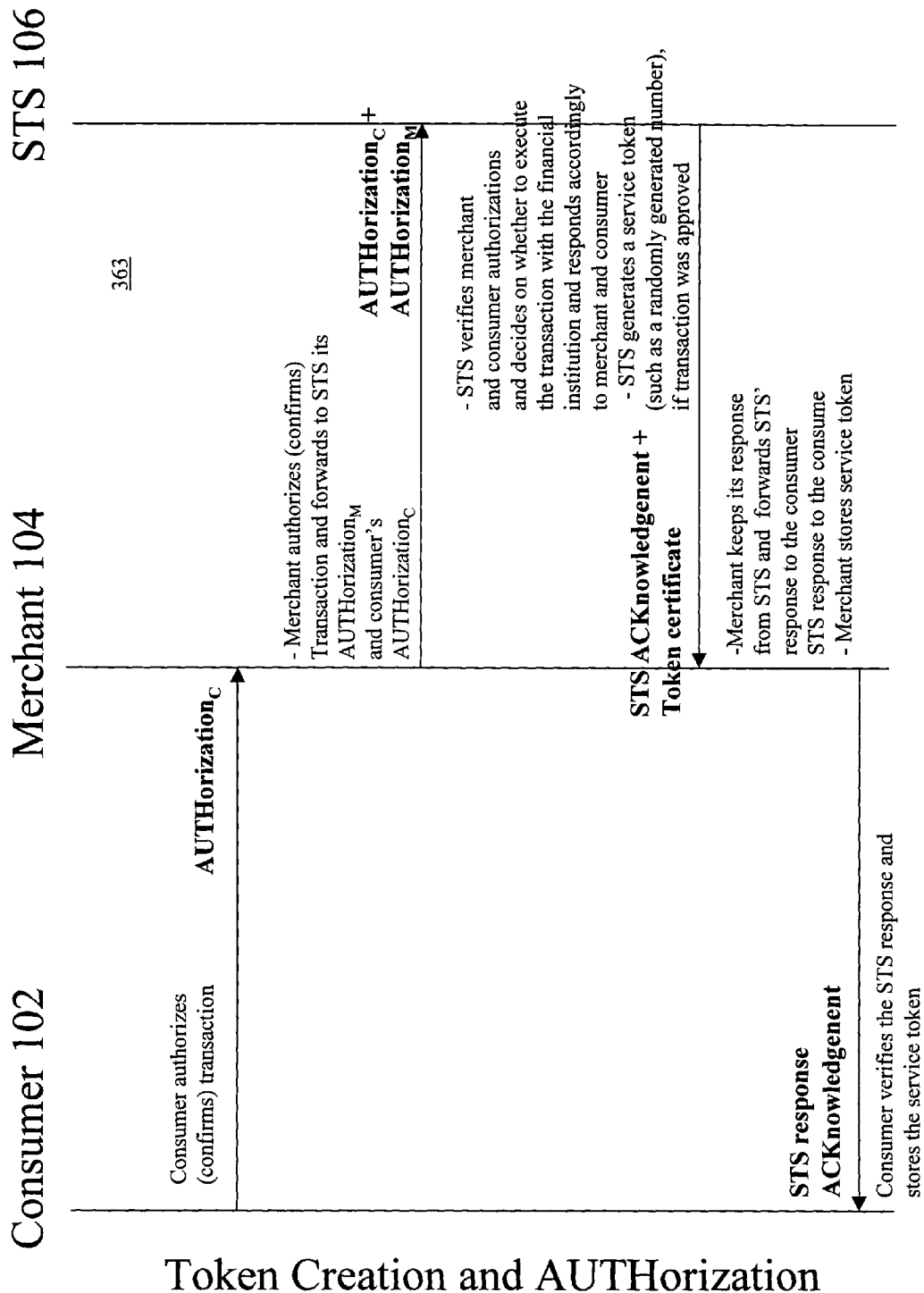
FIG. 18 shows another method for creating a service token (to be later used for gaining access to a service using the method of FIG. 28) and authorization of the associated transaction (includes the actual payment with the related financial institution).

FIG. 18 shows another method 363 of creating a service token (to be later used for gaining access to a service) and authorization of the associated transaction (includes the actual payment with the related financial institution). As shown in FIG. 18, the consumer 102 authorizes (or confirms) a transaction. The consumer might see on his device a request to confirm and authorize this transaction, or he might see a listing of the account available for paying for this transaction and upon selecting a financial account for such payment the device will generate its authorization. The consumer 102 transmits the consumer's authorization to the merchant 104. The merchant 104 authorizes (or confirms) the transaction and forwards to the STS 106 its authorization and the consumer 102's authorization. The STS 106 verifies the merchant 104 and consumer 102 authorizations and determines whether to execute the transaction with the financial institution, and responds accordingly to the merchant 104 and consumer 102. In addition, the STS 106 generates a randomly generated number (token), to be associated with this transaction if the transaction was approved, which the STS includes to both of its responses to the merchant and the consumer. The merchant 104 keeps its response (and stores the token) from the STS 106 and transmits the STS' response for the consumer 102 to the consumer 102. The consumer 102 then verifies the STS 106's response and stores the service token.

Figure 19:
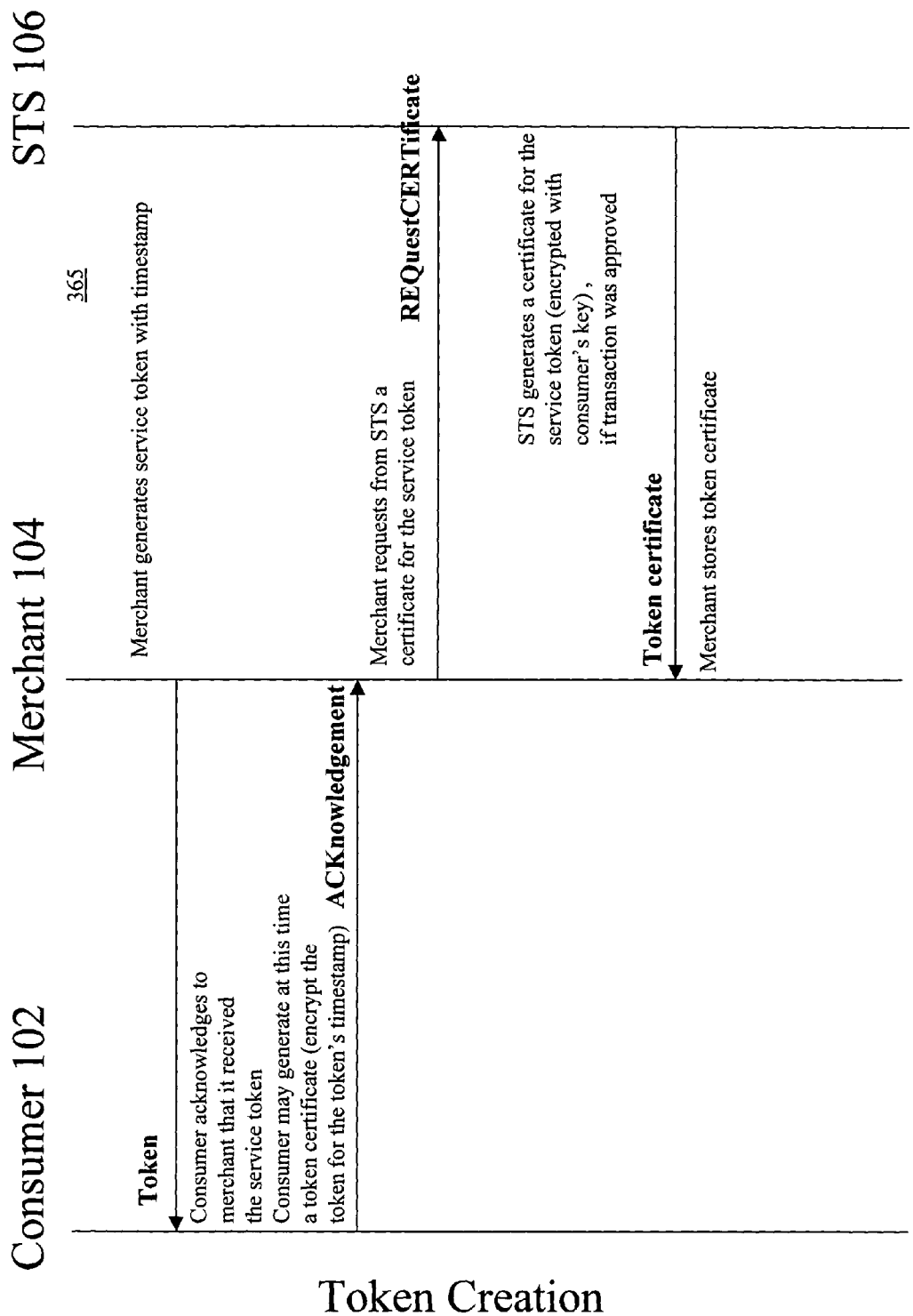
FIG. 19 shows a method for creating a service token (to be later used for gaining access to a service.

FIG. 19 shows a method 365 of creating a service token (to be later used for gaining access to a service). As shown in FIG. 19, the merchant generates a service token with timestamp and transmits it to the consumer 102. The consumer 102 acknowledges to the merchant 104 that it received the service token. The consumer 102 may generate a token certificate (by encrypting the token with a key that corresponds to the token's timestamp). The consumer 102 transmits the consumer's authorization to the merchant 104. The merchant 104 requests from the STS 106 a certificate for the service token. The STS 106 generates a certificate for the service token encrypted with the consumer 102's key if the transaction was approved. The merchant 104 stores the token certificate from the STS 106.

Figure 20:
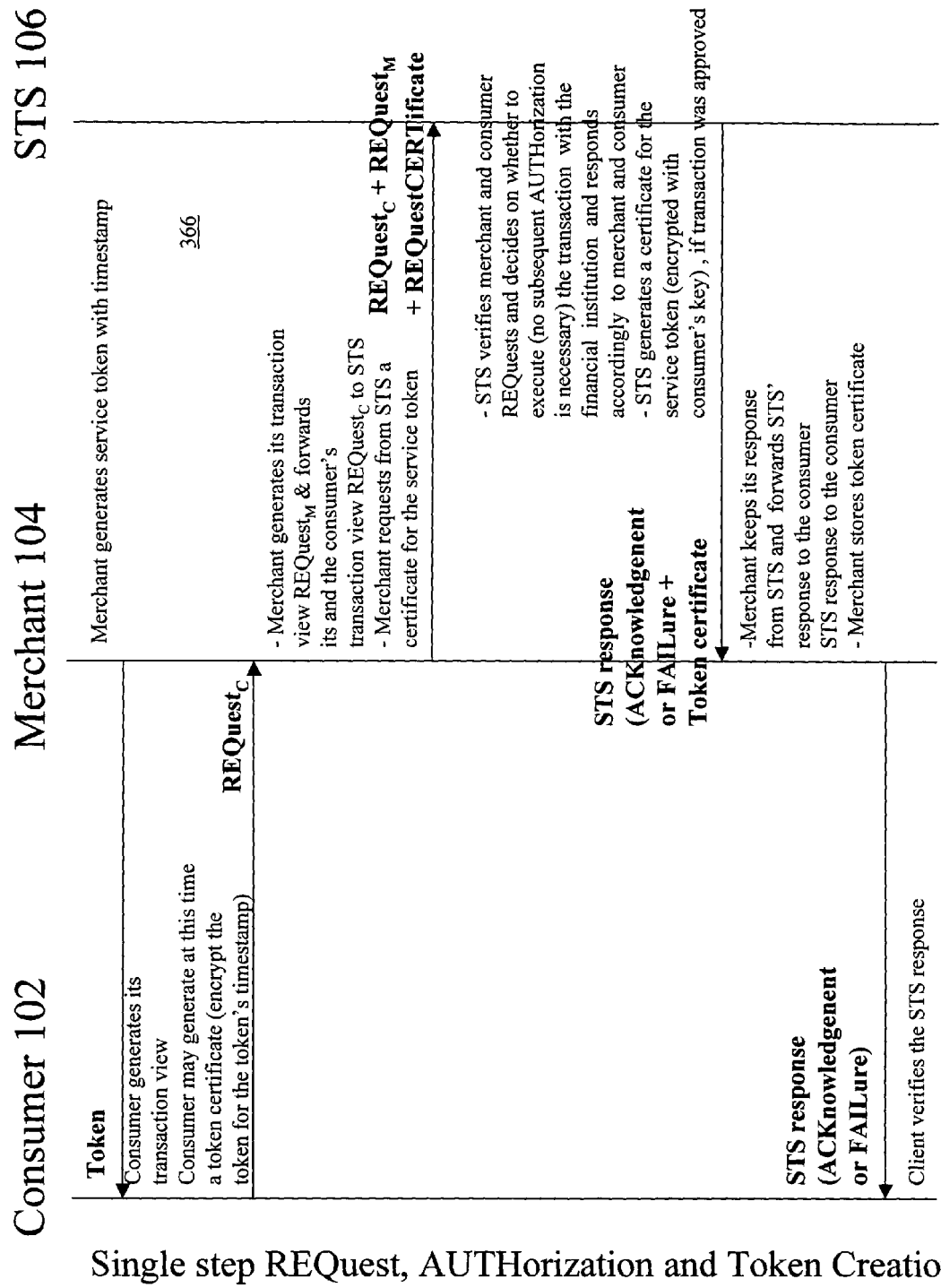
FIG. 20 shows a method for a single step request for a transaction, creation of a service token (to be later used for gaining access to a service) and authorization of the associated transaction (includes the actual payment with the related financial institution).

FIG. 20 shows a method 366 of a single, step request for a transaction, creation of a service token (to be later used for gaining access to a service) and authorization of the associated transaction (includes the actual payment with the related financial institution). As shown in FIG. 20, the merchant generates a service token with timestamp and transmits it to the consumer 102. The consumer 102 authorizes (or confirms) a transaction. The consumer might see on his device a representation of the purchase order and asked for his PIN and authorization using his default financial account for payment. The consumer 102 may generate a token certificate (by encrypting the token for the token's timestamp). The consumer 102 transmits the consumer's authorization to the merchant 104. The merchant 104 authorizes (or confirms) the transaction and forwards to the STS 106 its authorization and the consumer 102's authorization. In addition, the merchant 104 requests from the STS 106 a certificate for the service token. The STS 106 verifies the merchant 104 and consumer 102 authorizations and determines whether to execute the transaction with the financial institution, and responds accordingly to the merchant 104 and consumer 102. That is, the STS 106 generates a certificate for the service token encrypted with the consumer 102's key if the transaction was approved. The merchant 104 keeps its response (and stores the token certificate) from the STS 106 and transmits the STS' response for the consumer 102 to the consumer 102. The consumer 102 then verifies the STS 106's response.

Figure 21:
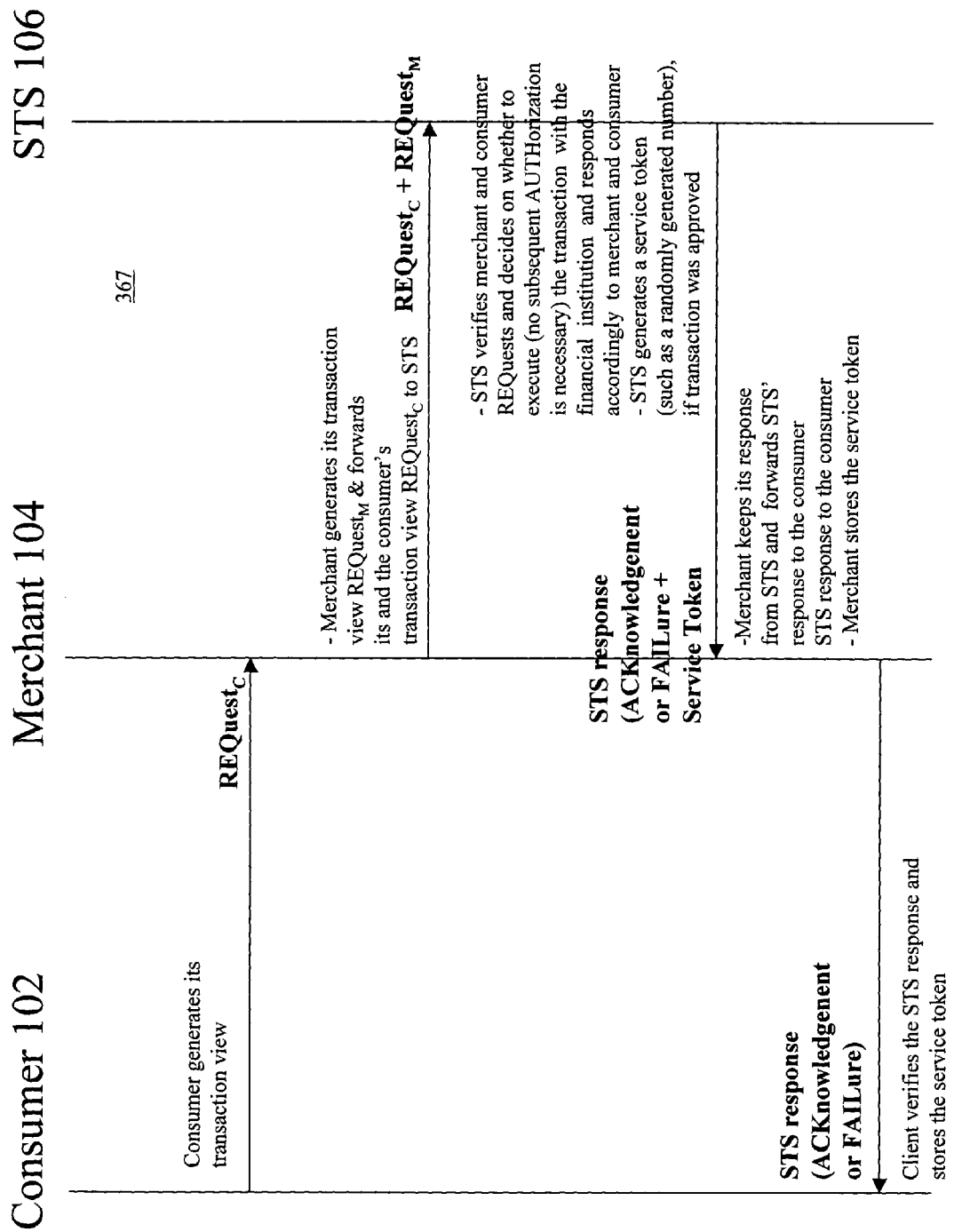
FIG. 21 shows another method for a single step request for a transaction, creation of a service token (to be later used for gaining access to a service, using the method of FIG. 28) and authorization of the associated transaction (includes the actual payment with the related financial institution).

FIG. 21 shows another method 367 of a single step request for a transaction, creation of a service token (to be later used for gaining access to a service) and authorization of the associated transaction (includes the actual payment with the related financial institution). As shown in FIG. 18, the consumer 102 authorizes (or confirms) a transaction. The consumer might see on his device a representation of the purchase order and asked for his PIN and authorization using his default financial account for payment. The consumer 102 transmits the consumer's authorization to the merchant 104. The merchant 104 authorizes (or confirms) the transaction and forwards to the STS 106 its authorization and the consumer 102's authorization. The STS 106 verifies the merchant 104 and consumer 102 authorizations and determines whether to execute the transaction with the financial institution, and responds accordingly to the merchant 104 and consumer 102. In addition, the STS 106 generates a randomly generated number (token), to be associated with this transaction if the transaction was approved, which the STS includes to both of its responses to the merchant and the consumer. The merchant 104 keeps its response (and stores the token) from the STS 106 and transmits the STS' response for the consumer 102 to the consumer 102. The consumer 102 then verifies the STS 106's response and stores the service token.

Figure 22:
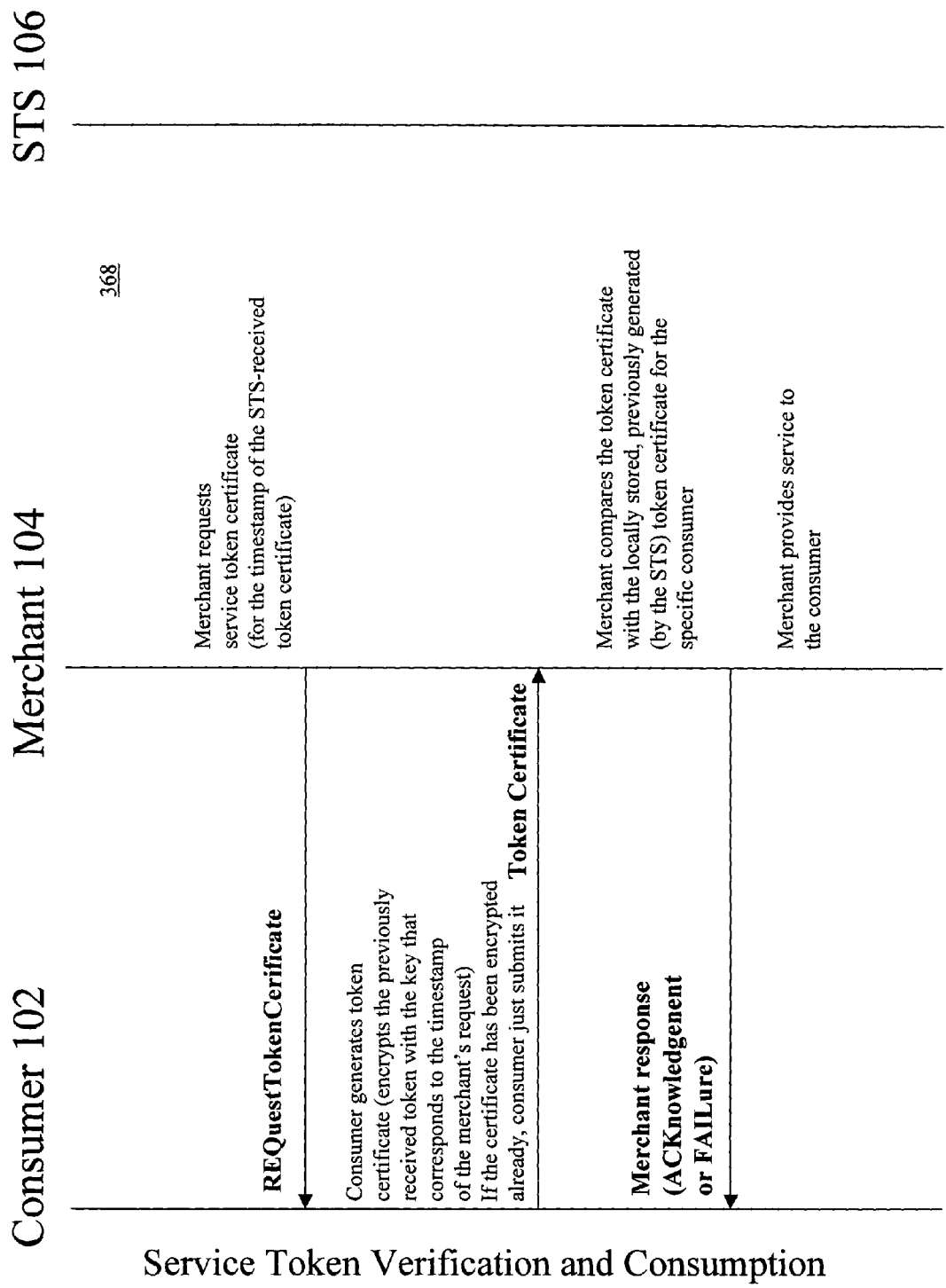
FIG. 22 shows a method for submitting, verifying and eventually consuming a previously gained (and paid for) service token
Figure 32:
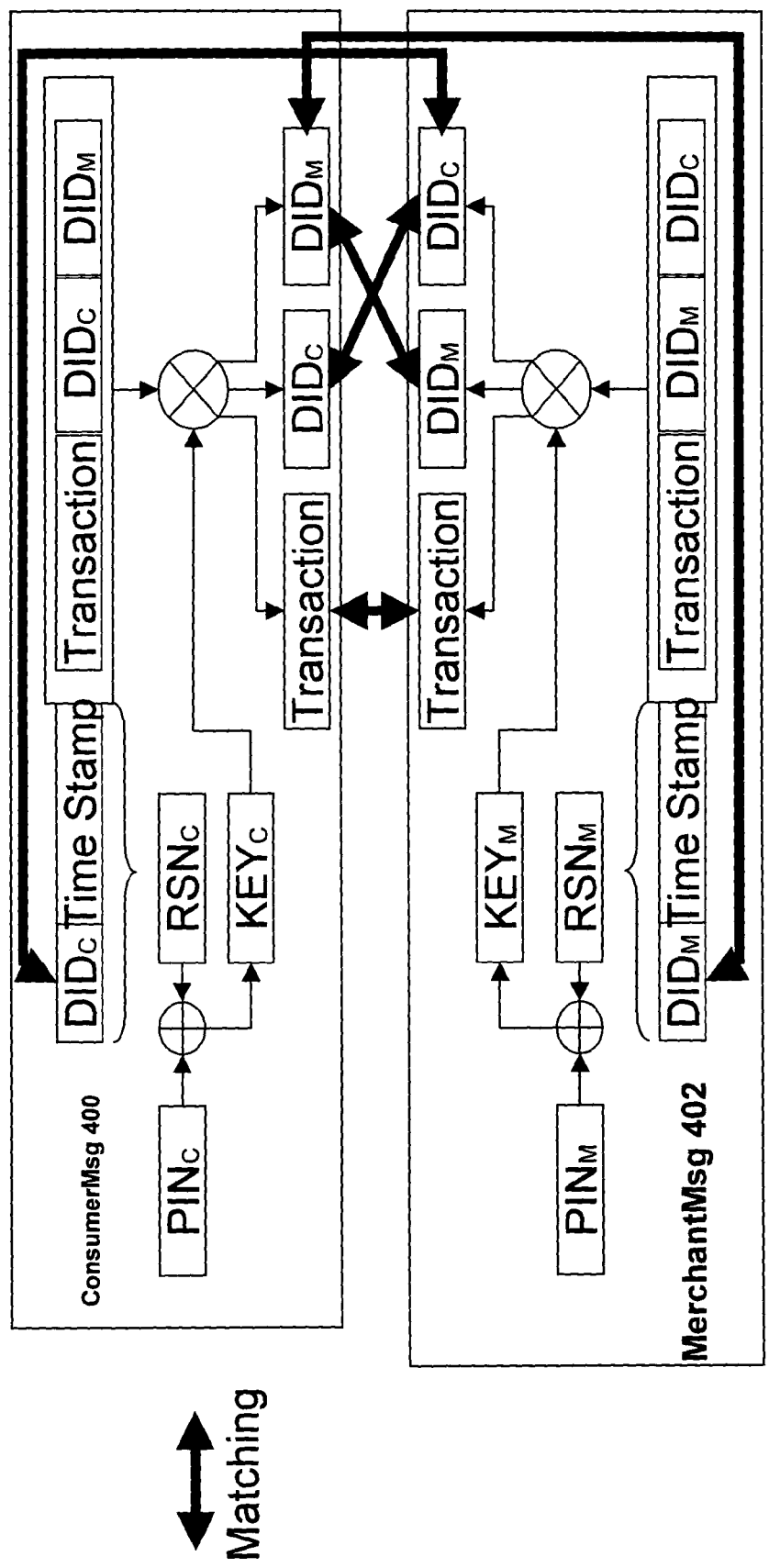
FIG. 32 shows the Secure Transaction Server part of FIG. 31 with further detail on the matching and cross-referenced data.

FIG. 22 shows a method 368 of submitting, verifying and eventually consuming a previously gained (and paid for) service token. The described method will take place as the consumer gains access to the service (e.g., entering a movie theater, similarly to giving a ticket to the usher upon entering a movie theater). As shown in FIG. 32, the merchant 104 requests a service token certificate for the timestamp of the STS-received token certificate. The consumer 102 generates a token certificate (by encrypting the previously received token with the key that corresponds to the timestamp of the merchant 104's request. If the certificate has been encrypted already, the consumer 102 just submits it to the merchant 104. The merchant 104 compares the token certificate with the locally-stored, previously generated (by the STS 106) token certificate for the specific consumer 102. The merchant 104 transmits a response (acknowledgement or failure) to the consumer 102, and the merchant 104 provides service to the consumer 102. This method will typically follow any of the methods described in FIGS. 17, 19, 20, 23.

Figure 23:
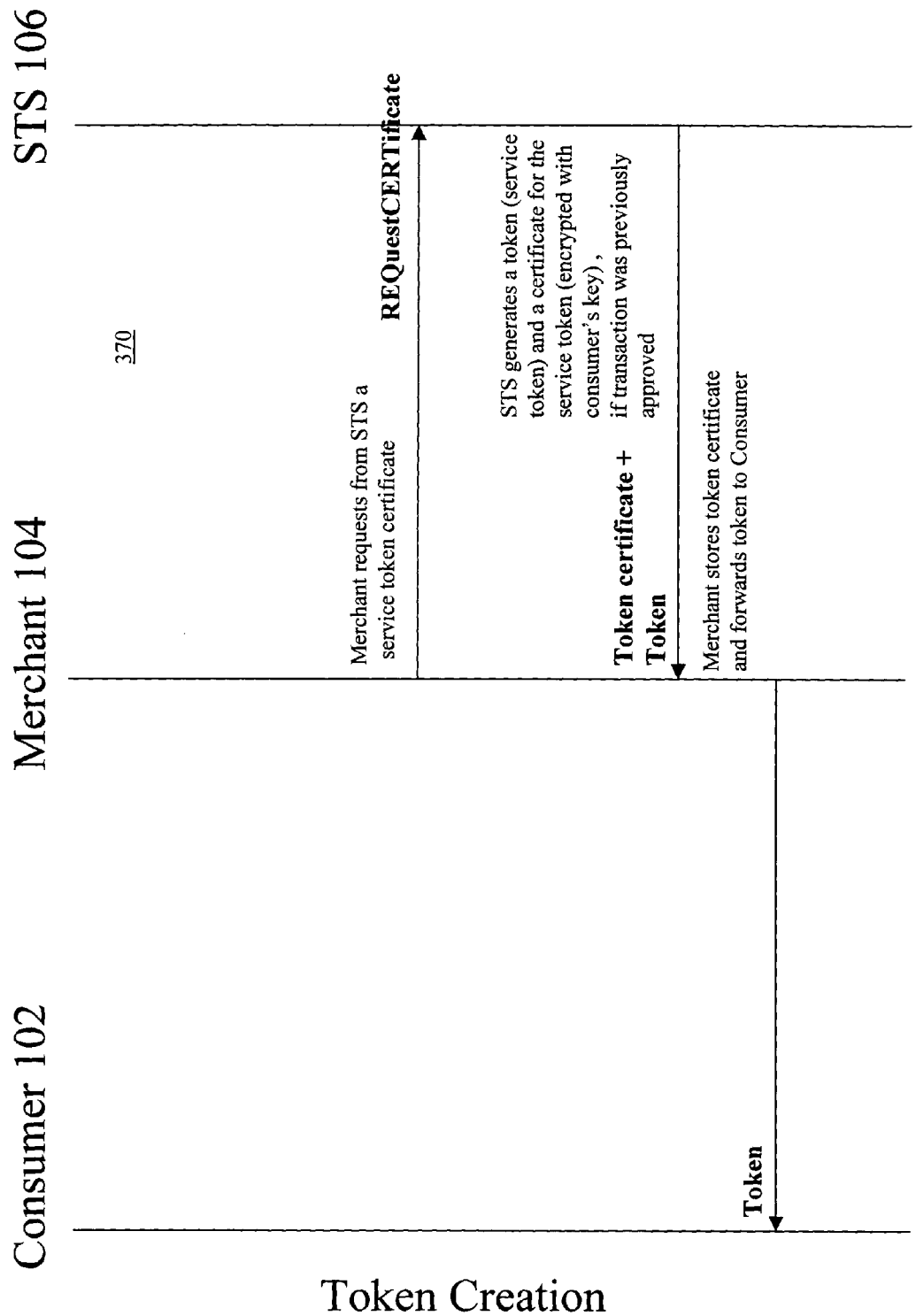
FIG. 23 shows an alternative method for creating a service token (to be later used for gaining access to a service).

FIG. 23 shows an alternative method 370 of creating a service token (to be later used for gaining access to a service). Unlike the method of FIGS. 19 the MTS 104 issues a request for a token to the STS 106 and it is the STS 106 that generates a token and its accompanying certificate.

Figure 24:
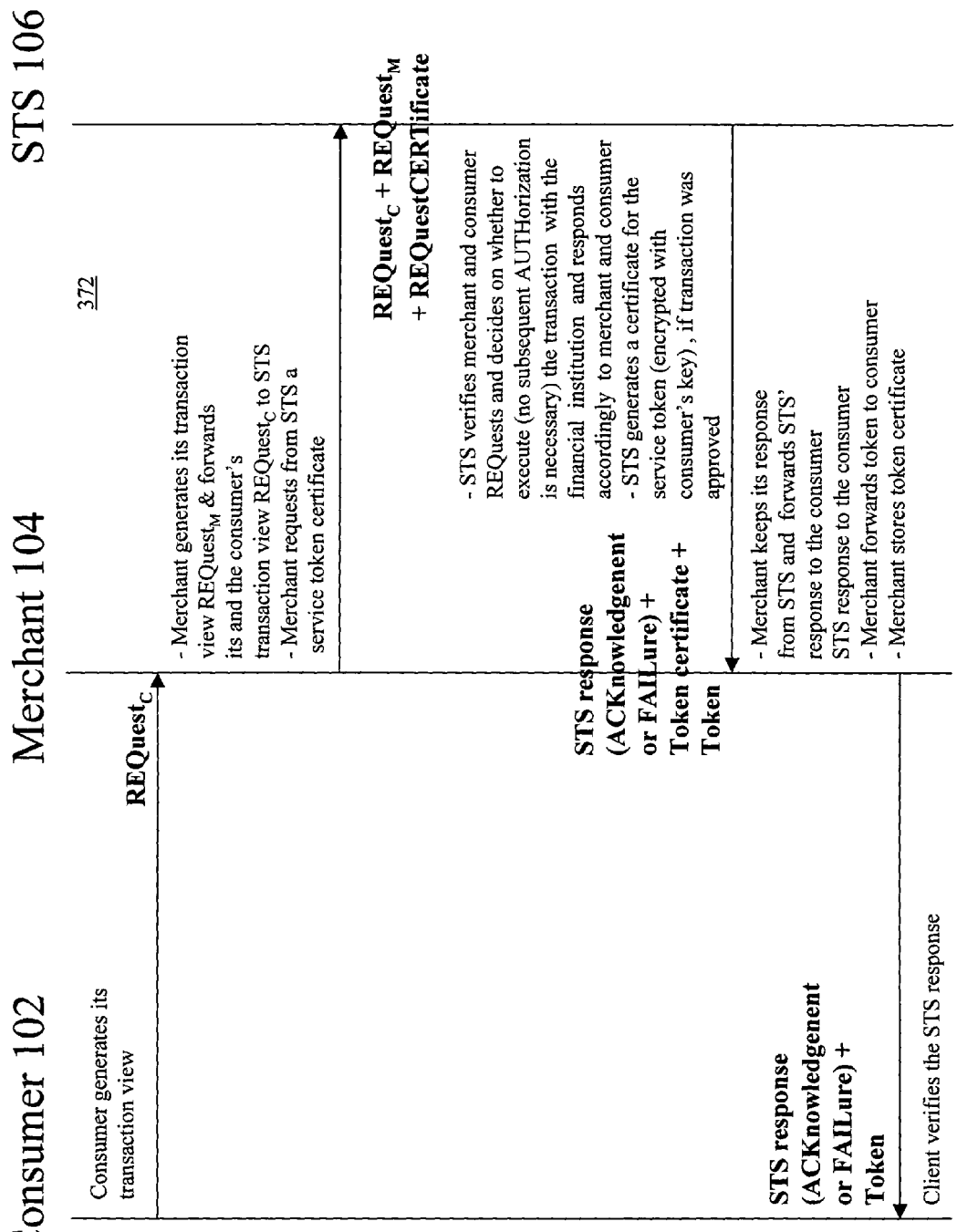
FIG. 24 shows a method for a single step request for a transaction, creation of a service token (to be later used for gaining access to a service) and authorization of the associated transaction (includes the actual payment with the related financial institution).

FIG. 24 shows a method 372 of a single step request for a transaction, creation of a service token (to be later used for gaining access to a service) and authorization of the associated transaction (includes the actual payment with the related financial institution); this is similar to the method 366 shown in FIG. 20, but unlike the method 366 of FIG. 20, the MTS 104 issues a request for a token to the STS 106 and it is the STS 106 that generates a token and its accompanying certificate.

Figure 25:
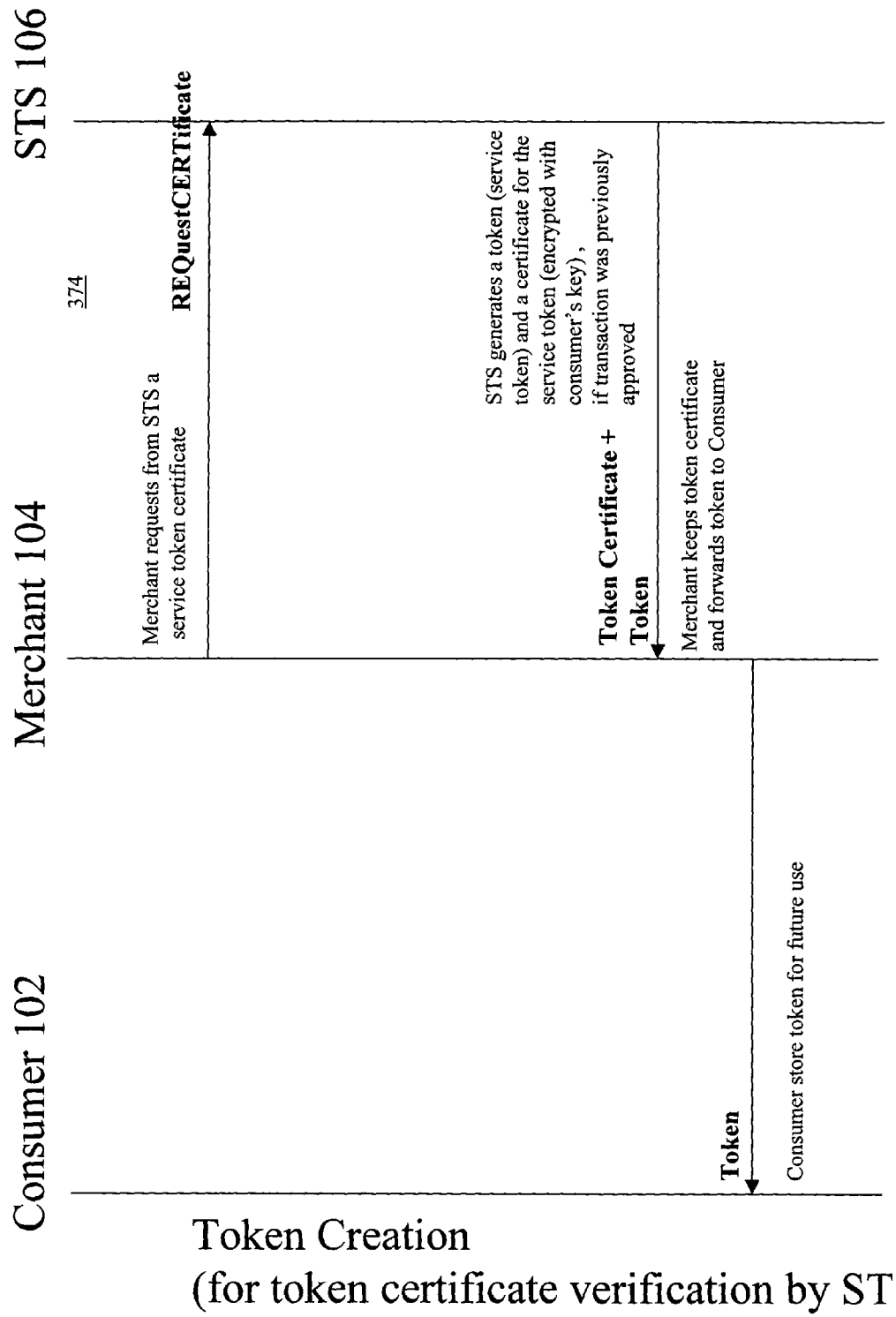
FIG. 25 shows a method for creating a service token (to be later used for gaining access to a service FIG. 26 shows a method for a single step request for a transaction, creation of a service token (to be later used for gaining access to a service) and authorization of the associated transaction (includes the actual payment with the related financial institution), to be used for a token created with method of FIG. 27.

FIG. 25 shows a method 374 of creating a service token (to be later used for gaining access to a service. Unlike the methods of FIG. 17 and FIG. 18, this token creation method 374 is intended for a token certificate verification and consumption by the STS 106, such as the methods of FIG. 26 and FIG. 27.

Figure 26:
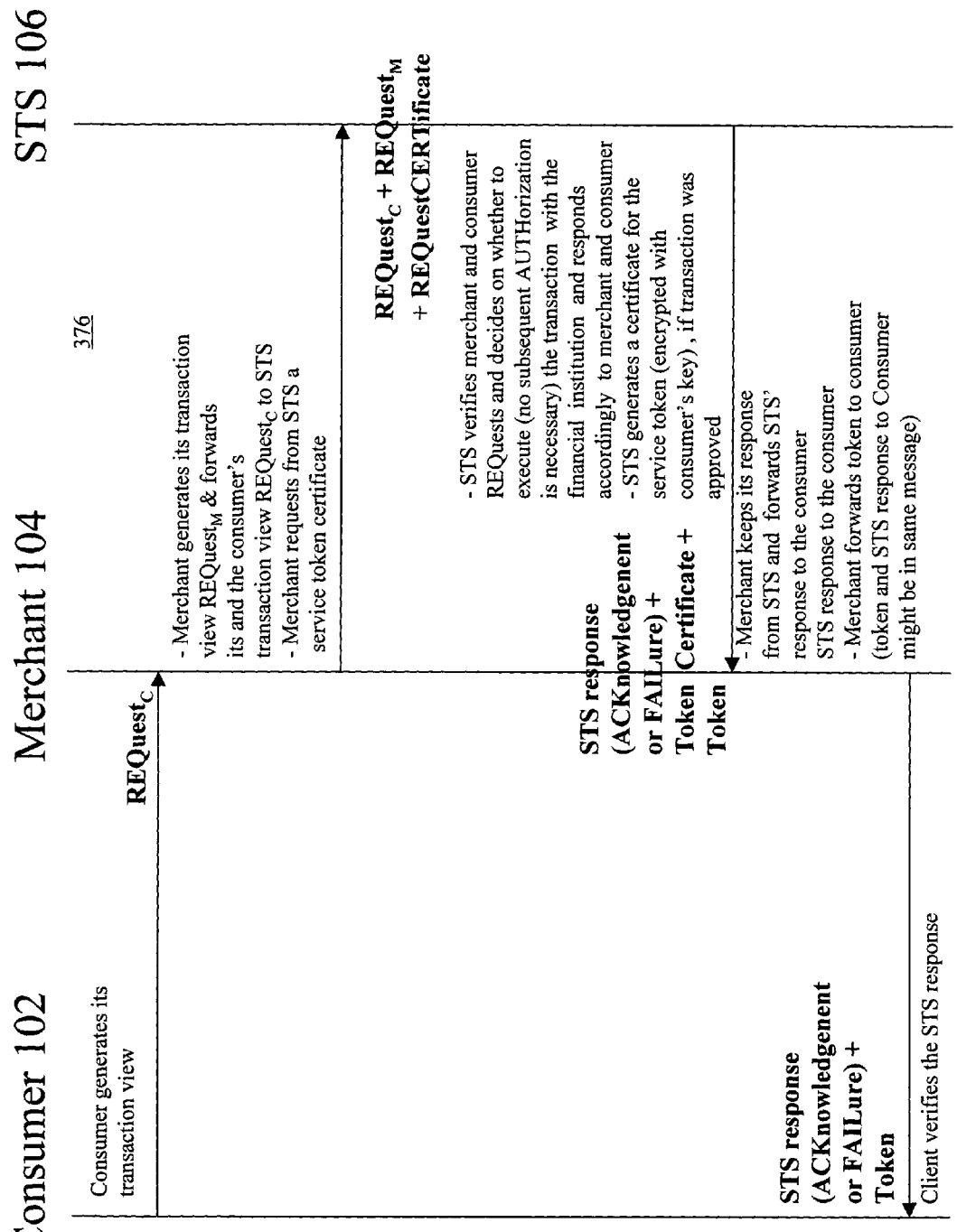

FIG. 26 shows a method 376 of a single step request for a transaction, creation of a service token (to be later used for gaining access to a service) and authorization of the associated transaction (includes the actual payment with the related financial institution), to be used for a token created with the method 374 shown in FIG. 25. The method 376 shown in FIG. 36 takes place as the consumer 102 gains access to the service (e.g., entering a movie theater, similarly to giving a ticket to the usher upon entering a movie theater). As shown in FIG. 36, the consumer 102 generates its transaction view request and transmits same to the merchant 104. The merchant 104 generates its transaction view request and transmits its transaction view request and the consumer 102's transaction view request to the STS 106. The merchant 104 also requests from the STS 106 a service token certificate. The STS 106 verifies the merchant 104 and consumer 102 authorizations and determines whether to execute the transaction with the financial institution, and responds accordingly to the merchant 104 and consumer 102. That is, the STS 106 generates a certificate for the service token encrypted with the consumer 102's key if the transaction was approved. The merchant 104 keeps its response (and stores the token certificate) from the STS 106 and transmits the STS' response for the consumer 102 to the consumer 102. The merchant 104 forwards the token to the consumer 102 (that is, the token and the STS response to the consumer 102 may be included in the same message). The consumer 102 then verifies the STS 106's response.

Figure 27:
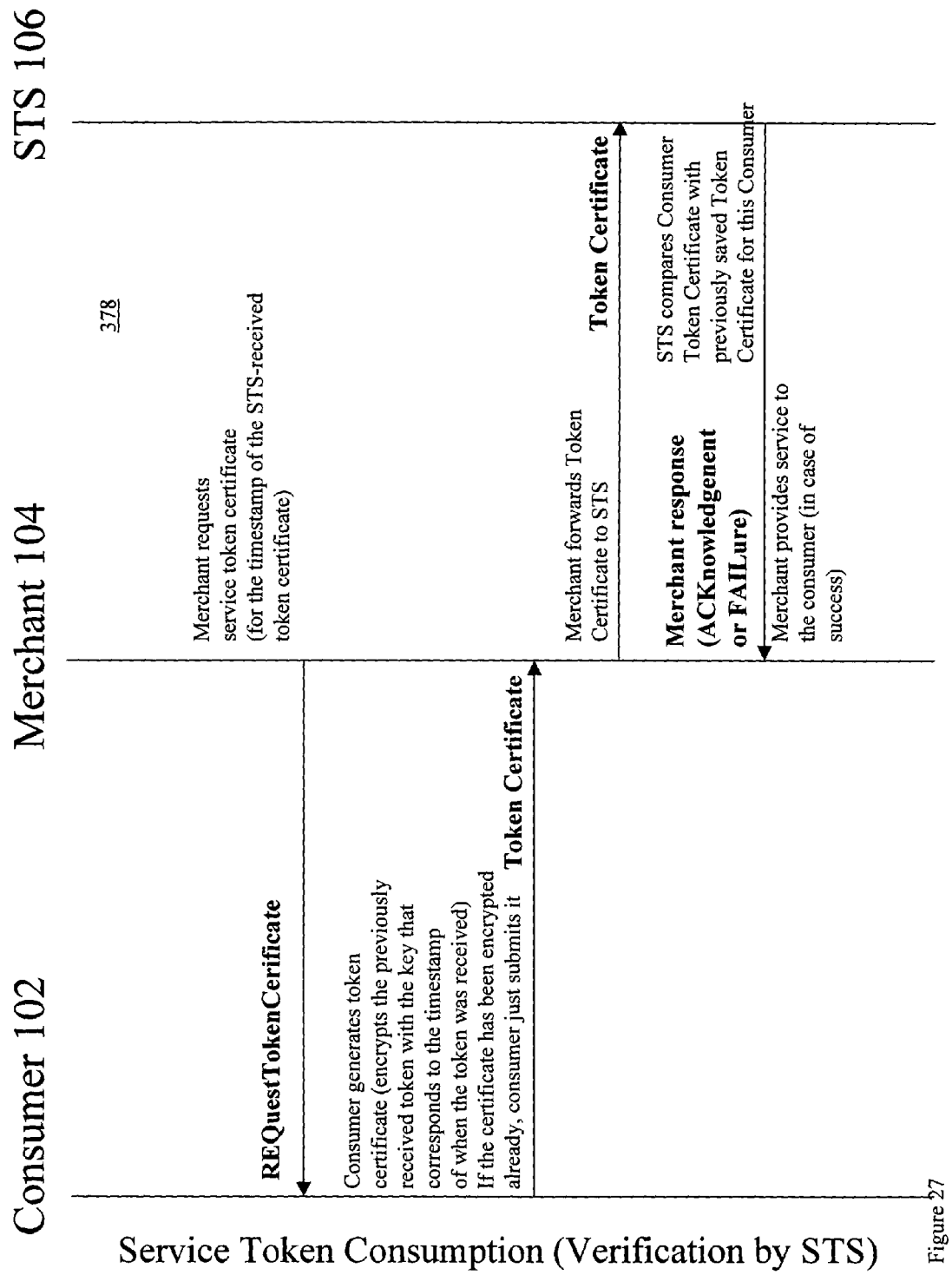
FIG. 27 shows a method for submitting, verifying and eventually consuming a previously gained (and paid for) service token), to be used for a token created with the method of FIG. 26. The described method will take place as the consumer gains access to the service (e.g., entering a movie theater, similarly to giving a ticket to the usher upon entering a movie theater).

FIG. 27 shows a method 378 of submitting, verifying and eventually consuming a previously gained (and paid for) service token, to be used for a token created with the method of FIG. 25. The described method will take place as the consumer gains access to the service (e.g., entering a movie theater, similarly to giving a ticket to the usher upon entering a movie theater). As shown in FIG. 27, the merchant 104 requests a service token certificate for the timestamp of the STS-received token certificate. The consumer 102 generates a token certificate (by encrypting the previously received token with the key that corresponds to the timestamp of the merchant 104's request. If the certificate has been encrypted already, the consumer 102 just submits it to the merchant 104. The merchant 104 forwards the token certificate to the STS 106. The STS 106 compares the token certificate with the previously-saved token certificate for the specific consumer 102. The merchant 104 receives a response (acknowledgement or failure), and the merchant 104 provides service to the consumer 102.

Figure 28:
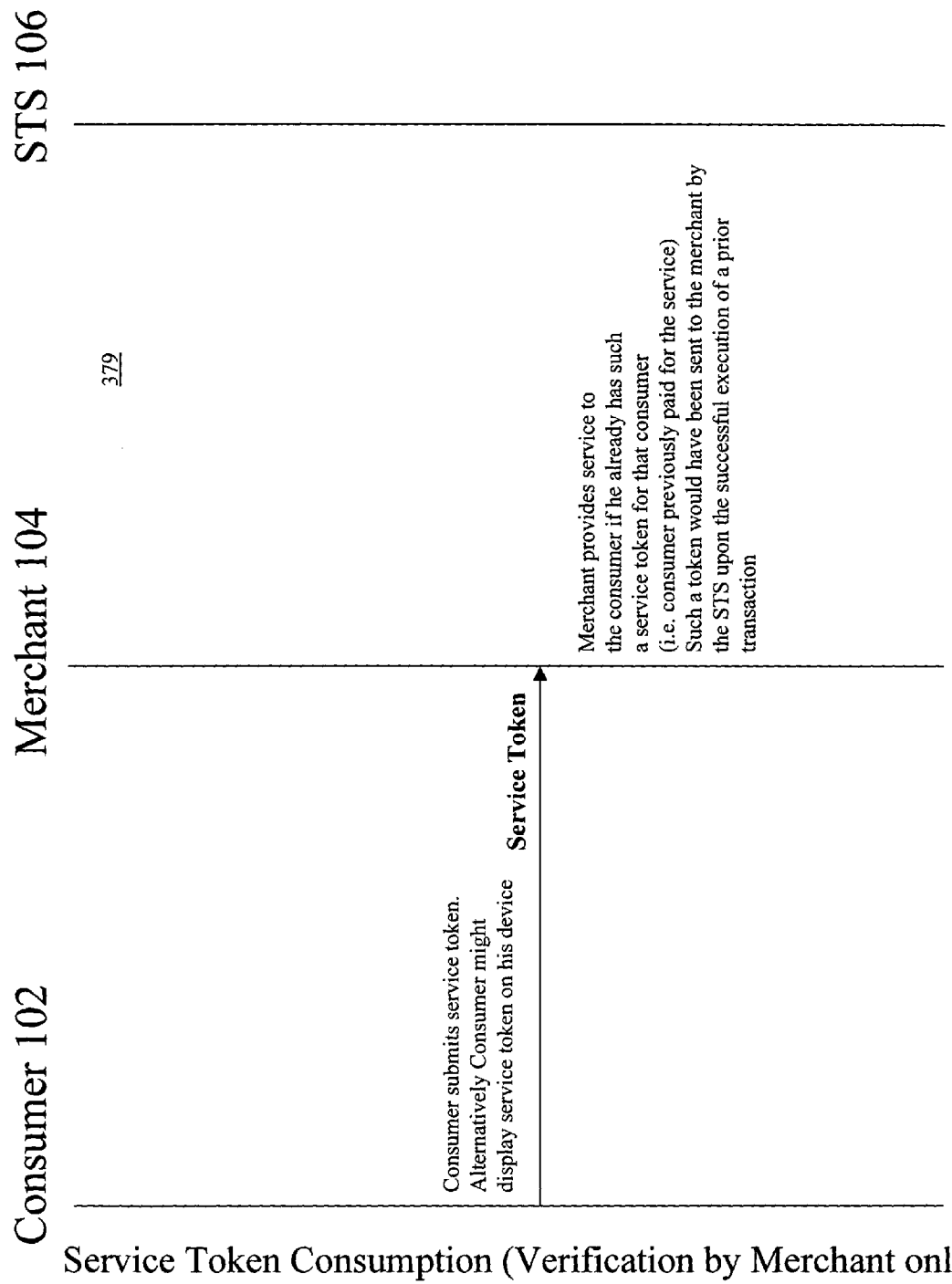
FIG. 28 shows a method for submitting, verifying and eventually consuming a previously gained (and paid for) service token), to be used for a token created with the method of FIG. 18, or the method of FIG. 21. The described method will take place as the consumer gains access to the service (e.g., entering a movie theater, similarly to giving a ticket to the usher upon entering a movie theater).

FIG. 28 shows another method 379 for submitting, verifying and eventually consuming a previously gained (and paid for) service token. The method of FIG. 28 will be typically used following the token creation methods of FIG. 18 or 21. In this scenario the STS previously sent a randomly generated number to each of merchant and consumer when responding to them following a successful payment for a service by the consumer to the merchant. Upon consumption of the service the consumer need only submit to the merchant that previously obtained random number, or token, which can also be thought of a reference to a receipt.

In all of the above methods were the consumer submits a token or a token certificate to the merchant (the methods of FIGS. 27 and 28), this submission can be made over the wireless channel, or the token, or token certificate can be displayed on the consumer's device for the merchant or a merchant's representative to visually inspect it and compare it to the corresponding token, or token certificate, relating to the purchased transaction that the merchant has previously stored, or some representation of that token or token certificate can be displayed and read by equipment provided and/or operated by the merchant. For example, the token or token certificate can be displayed in barcode form that can be read by a barcode reader. Upon successfully reading such a barcode and comparing the read data (representing a token or token certificate) to a previously stored token or token certificate, the merchant will grant access to the consumer bearing the device that displayed the barcode.

In one embodiment, all of the messages mentioned in the previous methods (FIGS. 11-28) that originate either from the merchant 104, or the consumer 102 and are intended for the STS 106, are sent in pairs. Since the consumer 102 does not have a direct communication link to the STS 106, its messages to the STS 106 are submitted to the merchant 104 who then forwards them to the STS 106. Related messages intended for the STS 106 (a pair of messages, one from the merchant 104 and one from the consumer 102), represent the respective views of the merchant 104 and the consumer 102 relevant to the attempted action (e.g., requesting a transaction, authorizing a transaction, etc.). These messages are encrypted in the way described elsewhere in this document and include sufficient cross-referencing information (as described elsewhere in this document) that can be used to verify that both registered owners of the devices 102 that submit the messages are communicating the same intent to the STS 106.

Security Framework

This section discloses how the security framework and protocol for universal pervasive transactions, which is itself described elsewhere in this document, is used in this invention in order to provide security for, and guarantee certain properties of, transactions between merchants and consumers. The security framework and protocol is referred to as the Security Agreement Submission (SAS) protocol (or Secure Transmission Protocol (STP), and includes a Security Agreement Submission encryption (SASE) mechanism.

The STS 106 is the Agreement Verification Party (AVP) of the security framework and protocol for universal pervasive transactions. The merchant and the consumer are two agreement parties (AP) of the security framework and protocol for universal pervasive transactions.

The security framework delegates most of the security burden to the STS 106 and ensures that the security framework does not weaken the security functions of financial institutions and their networks. Assumptions of the security framework are that the wireless link between, for example, the consumer 102 and the merchant 104, is insecure and neither the merchant 104 nor the consumer 102 trusts one another to be whatever they claim to be and to not (willingly or unwittingly) manipulate or corrupt the transaction.

The security framework executes the following functions:

Authenticates user identity, merchant identity and transaction identity;

Ensures that transaction data (if intercepted) cannot be re-used as the transaction code is good for only one transaction;

Ensures that no rogue party can pretend to be merchant; and

Trusts the transaction but not the parties involved.

The security framework relies on the independently created Agreement Party Views (one generated from the consumer's device 102 and one generated by the merchant 104) that together are used to uniquely identify and authorize a transaction when they both are received and processed at the STS 106, but each one of them is useless by themselves, and even if "broken" cannot be re-used. The Secure Transaction Server 106 is the intermediary server that verifies that both tokens for a transaction, one from the UPTD 102 and one from the Merchant Transaction Server (MTS 104) are valid and that they constitute a proper transaction request, before committing it to the financial institution. After confirmation of the transaction verification, a notification is sent to the UPTD 102 and MTS 104.

One difference between the security framework for UPTD 102 and other Internet-based secure transaction systems is that with the security framework described herein, there are three distinct security environments:

Between client's UPTD 102 and merchant's MTS 104;

Between the MTS 104 and STS 106; and

Between STS 106 and payment service, or financial network, or financial institution in general.

The present invention addresses the special characteristics of each component 102, 104, and 106 and connection environment involved in the whole process. Other internet transaction security frameworks such as the Secure Electronic Transaction (SET) protocol, jointly developed by VISA™ and MASTERCARD™; the Public Key Infrastructure (PKI) by VeriSign; or HTTPS/SSL by Netscape, typically assume that all parties involved in the transaction have significant computing resources. Limited by its physical dimension, battery capacity, computing power, and memory size, a UPTD 102 is not burdened with providing the platform required for such frameworks. Moreover, in terms of network connection between transaction components 102, 104, and 106, these frameworks typically abstract the connections between the components without addressing the issues specific to different types of connectivity. The purchasing environment of the present invention can employ both wireless and wired connection segments. The security settings and requirements are different in different segments and such differences are considered from the beginning of the framework's design phase.

The present invention uses the security framework and protocol for universal pervasive transactions, which focuses on providing security in the first and second types of environments, above. The third type of environment is typical for e-commerce scenarios and has been well-studied and understood, and solutions have already been proposed. Moreover, many financial institutions have established their own secure protocols for on-line transaction processing. In such an environment, in order to interact with these financial institutions, the STS 106 follows the established standards and interfaces for submitting the transactions received from service spots to these payment services after local (STS 106) processing is complete. Without getting into the details of different existing on-line transaction protocols, in the rest of this document these protocols are referred to as Transaction Over Internet (TOI) protocols.

The method of encrypting/decrypting a transaction message in the present invention, using security framework and protocol for universal pervasive transactions, is illustrated in FIGS. 29-41, which are explained collectively.

Figure 29:
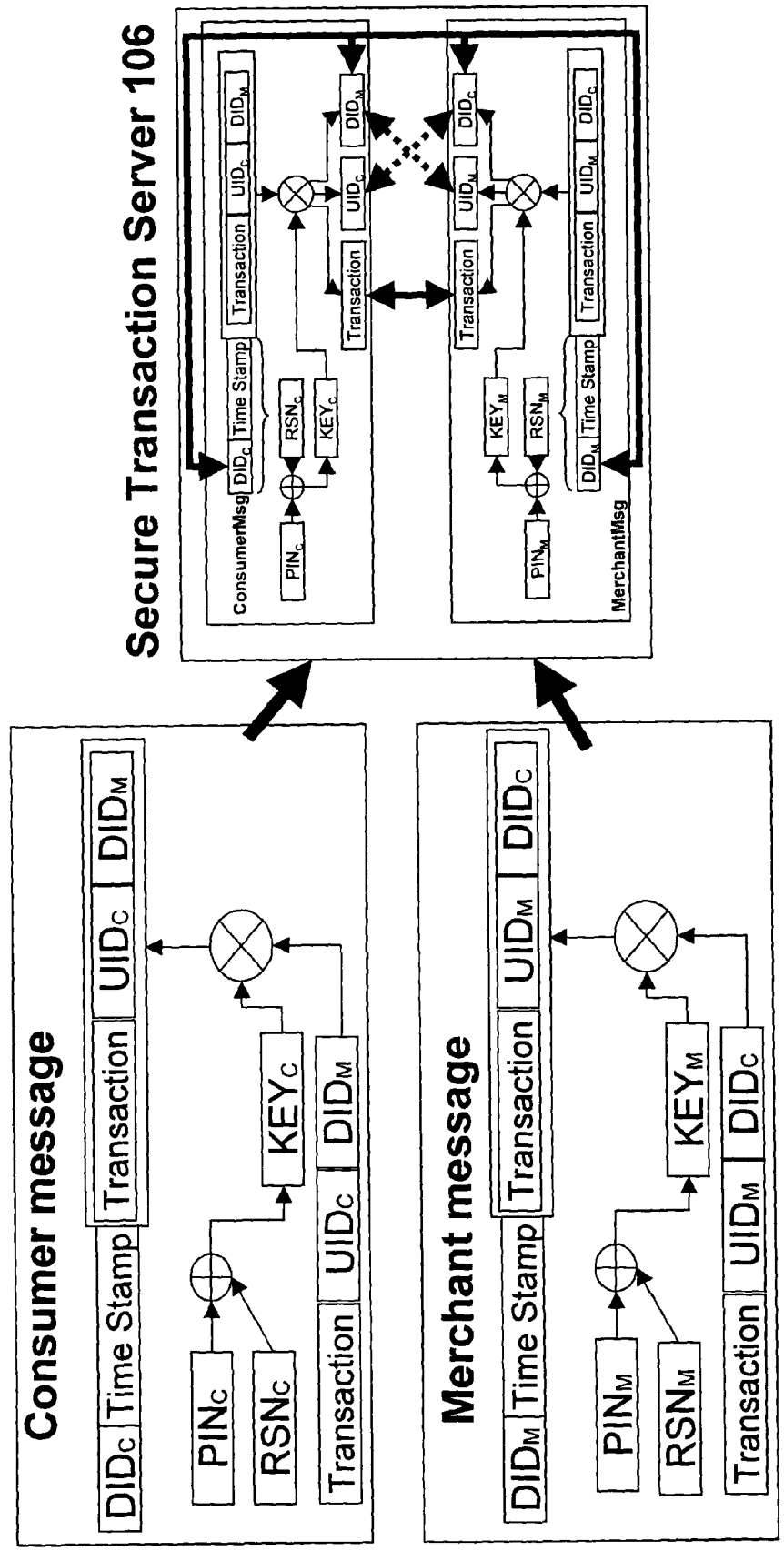
FIG. 29 shows how consumer and merchant create their messages to the STS 106 for such a pair of messages.

FIG. 29 shows the secure pervasive transaction protocol encryption details 380, that is, how consumer 102 and merchant 104 create their messages to the STS 106 for such a pair of messages. The "transaction" element in each message is the content of the communicated intent (a request, an authorization, etc.).

User input refers to information entered by the consumer on the consumer device used for the purchasing transaction and by the merchant on the merchant's device. Since the merchant (person) might be busy to enter such information on a per transaction basis, the information might be permanently stored on the merchant device and read by the appropriate merchant software on a per transaction basis, instead of being entered by the merchant or his representatives. Specifically, user input refers to the PIE of the security framework and protocol for universal pervasive transactions, which in the examples of FIGS. 29-32 is presumed to be a PIN, but it can be any other PIE (Personal Identification Entry) in accordance to the security framework and protocol for universal pervasive transactions.

In FIGS. 29-32, the user input includes $PIN_C$ and, $PIN_M$.

In addition, in FIGS. 29-32, components of messages are encrypted. These components include Transaction, $UID_C$, $DID_M$; Transaction, $UID_M$, $DID_C$.

Figure 30:
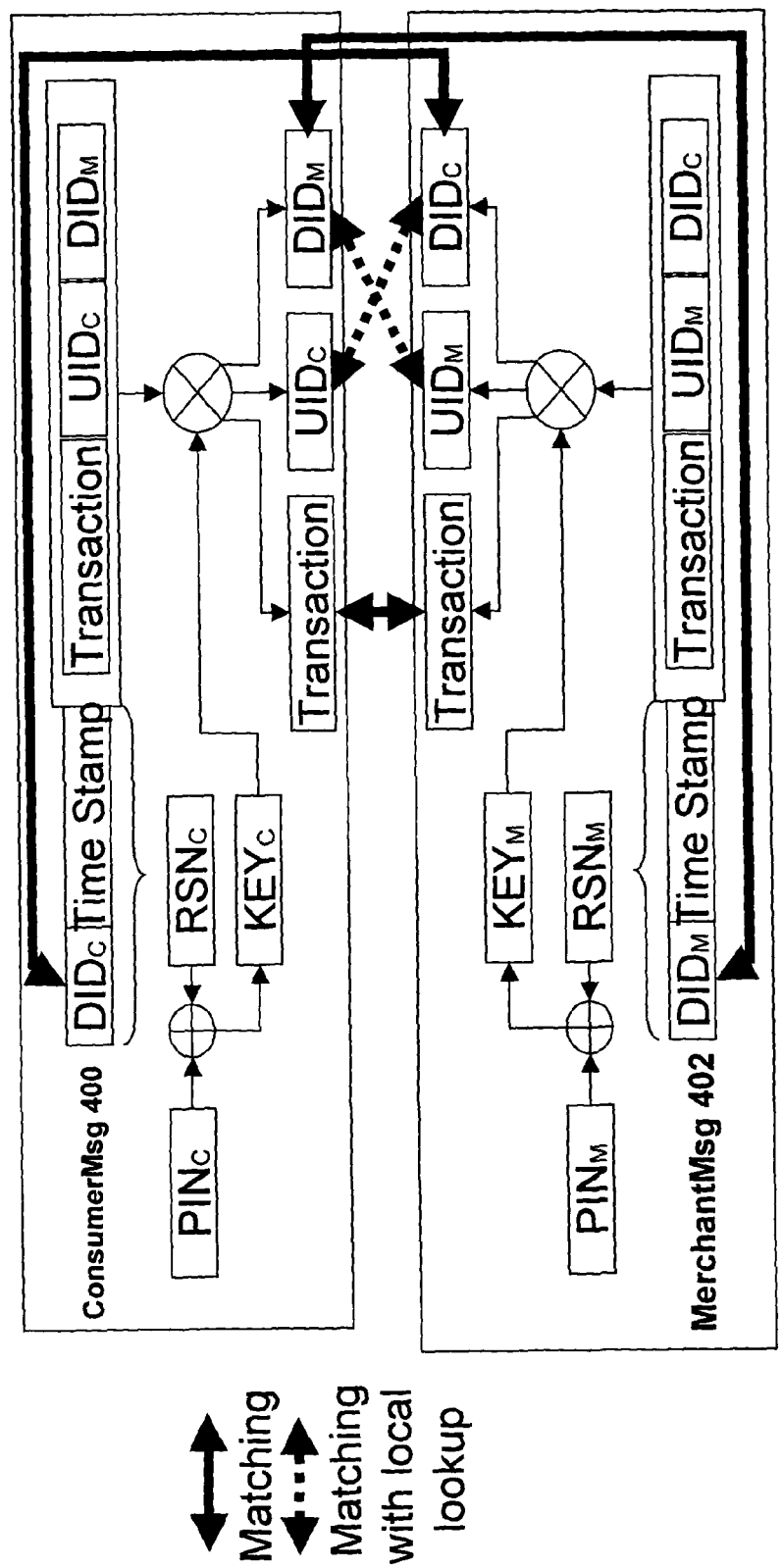
FIG. 30 shows the Secure Transaction Server part of FIG. 29 with further detail on the matching and cross-referenced data.

FIG. 30 shows the Secure Transaction Server 106 part of FIG. 29 with further detail on matching and cross-referenced data (which is also disclosed in further detail here in, in the discussion of the security framework and protocol for universal pervasive transactions).

Figure 31:
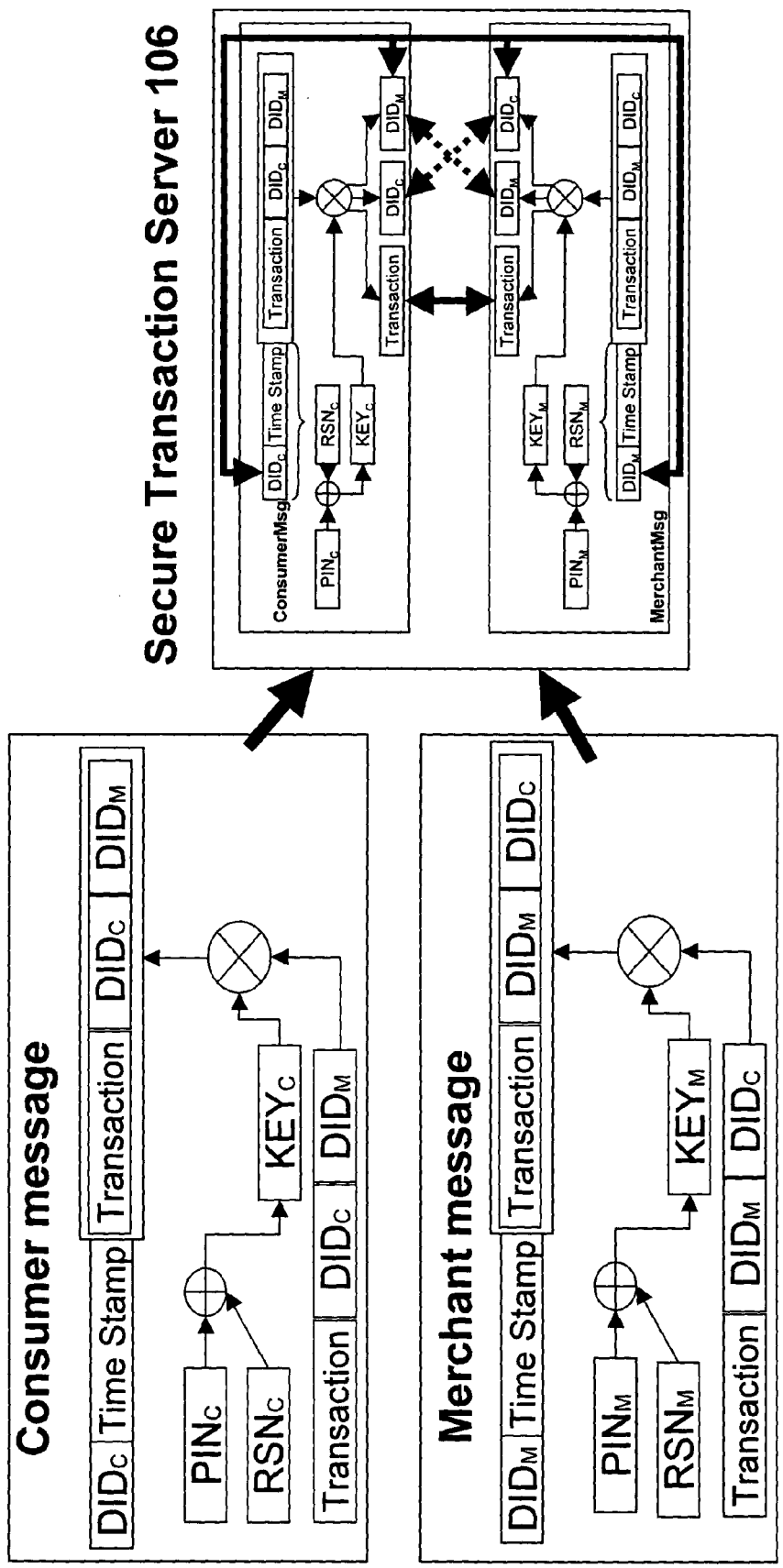
FIG. 31 shows another way of how consumer and merchant create their messages to the STS 106 for such a pair of messages.
Figure 41:
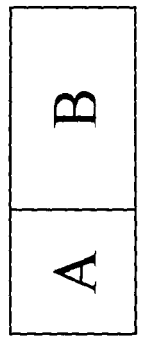

FIGS. 31 and 32 are similar to FIGS. 29 and 30, respectively, one difference being that merchant 104 and consumer 102 use the Device 102 Identifier, or DID, of their interlocutor in this communication (instead of the User Identifier, or UID); this difference results in slightly different processing by the STS 106 as illustrated in FIG. 41.

FIGS. 29-32 are explained in further detail. In FIGS. 29-32, the consumer 102 corresponds to the AP1 1101 shown in FIG. 57, the merchant 104 corresponds to the AP2 1102 shown in FIG. 57, the STS 106 corresponds to the AVP 1106 shown in FIG. 57, and the encryption and decryption functions correspond to those explained with reference to FIGS. 57-63.

As shown in FIG. 29, the consumer 102 and the merchant 104 each separately generate and transmit to the secure transaction server 106 a message regarding the transaction. The secure transaction server 106 then decodes the separately transmitted messages and compares information included therein.

The consumer device 102 generates and transmits a consumer message (ConsumerMsg) including a plaintext part ($DID_C$ and Time Stamp of the consumer device) and an encrypted part (Transaction view of the consumer, consumer user ID ($UID_C$), and merchant device ID ($DID_M$)).

Referring again to FIG. 29, the consumer device 102 generates the encrypted part of the consumer message as follows. The consumer device 102 encrypts the consumer's PIN ($PIN_C$) and the consumer's Random Sequence Number ($RSN_C$), using encoding functions (algorithms) of the Secure Agreement Submission protocol (or STP) discussed herein below with reference to FIGS. 57-63, to form the consumer KEY ($KEY_C$). The consumer device 102 then encrypts (again using the encoding functions (algorithms) discussed herein below with reference to FIGS. 57-63 the Transaction, consumer user ID, and merchant device ID using the consumer key, to generate the encrypted part of the consumer message.

The consumer device 102 then transmits the consumer message to the secure transaction server 106.

Likewise, the merchant device 104 generates the merchant message (MerchantMsg) using a similar procedure. The merchant message includes a plaintext part (the merchant ID ($DID_M$) and the time stamp of the merchant 104) and an encrypted part.

The encrypted part of the merchant message is generated by the merchant device 104 as follows. The merchant device 104 encrypts the merchant's PIN ($PIN_M$) and the merchant's Random Sequence Number ($RSN_M$), using encoding functions (algorithms) of the Secure Agreement Submission protocol (or STP) discussed herein below with reference to FIGS. 57-63, to form the merchant KEY ($KEY_M$). The merchant device 104 then encrypts (again using the encoding functions (algorithms) discussed herein below with reference to FIGS. 57-63 the merchant's view of the Transaction, merchant user ID ($UID_M$), and consumer device ID ($DID_C$) using the merchant key, to generate the encrypted part of the merchant message.

The merchant device 104 then transmits the merchant message to the secure transaction server 106.

Once the secure transaction server (STS) 106 receives the message (either the consumer message or the merchant message), the STS 106 decrypts each message and compares the information included in the message to the information included in the other message (either the consumer message or the merchant message).

As shown in FIGS. 29 and 30, the STS 106 uses the consumer's PIN ($PIN_C$) and the consumer's random sequence number ($RSN_C$), both of which are stored at the STS, to reproduce the consumer KEY ($KEY_C$) for the timestamp of the message using the functions (algorithms) of the Secure Agreement Submission protocol (SAS, or STP) discussed herein below. The STS 106 then uses the consumer KEY to decrypt the encrypted part of the received consumer message, again using the functions (algorithms) of the SAS (STP) discussed herein below.

Likewise, the STS 106 uses the merchant's PIN ($PIN_M$) and the merchant's random sequence number ($RSN_M$) both of which are stored at the STS, to reproduce the merchant KEY ($KEY_M$) using the functions (algorithms) of the Secure Agreement Submission protocol (SAS, or STP) discussed herein below. The STS 106 then uses the merchant KEY to decrypt the encrypted part of the received merchant message, again using the functions (algorithms) of the SAS (STP) discussed herein below.

Once the STS 106 has decrypted the consumer message and the merchant message, the STS 106 compares the Transaction included in the consumer message with the Transaction included in the merchant message. The STS 106 then uses local lookup (that is, lookup in a table stored in the STS 106) to determine whether the device ID ($DID_M$) of the merchant included in the consumer message matches (or corresponds) with the user id ($UID_M$) of the merchant included in the merchant message, and whether the device id ($DID_C$) of the consumer included in the merchant message matches (or corresponds) with the user id of the consumer included in the consumer message.

FIGS. 31 and 32 show generating, transmitting, and decoding a consumer message and a merchant message using the consumer device ID ($DID_C$) in place of the consumer user ID ($UID_C$), and the merchant device ID ($DID_M$) in place of the merchant user ID ($UID_M$). As in the case of FIGS. 29 and 30, the Transaction views of the consumer and the merchant included, respectively, in the consumer message and the merchant message, are compared directly with each other by the STS 106 to determine if they match. However, in FIGS. 31 and 32, the consumer's device id ($DID_C$s) included in the consumer message and in the merchant message are compared directly with each other by the STS 106 to determine if they match, and the merchant's device id ($DID_M$) included in the consumer message and in the merchant message are compared directly with each other by the STS 106 to determine if they match.

Figure 33:
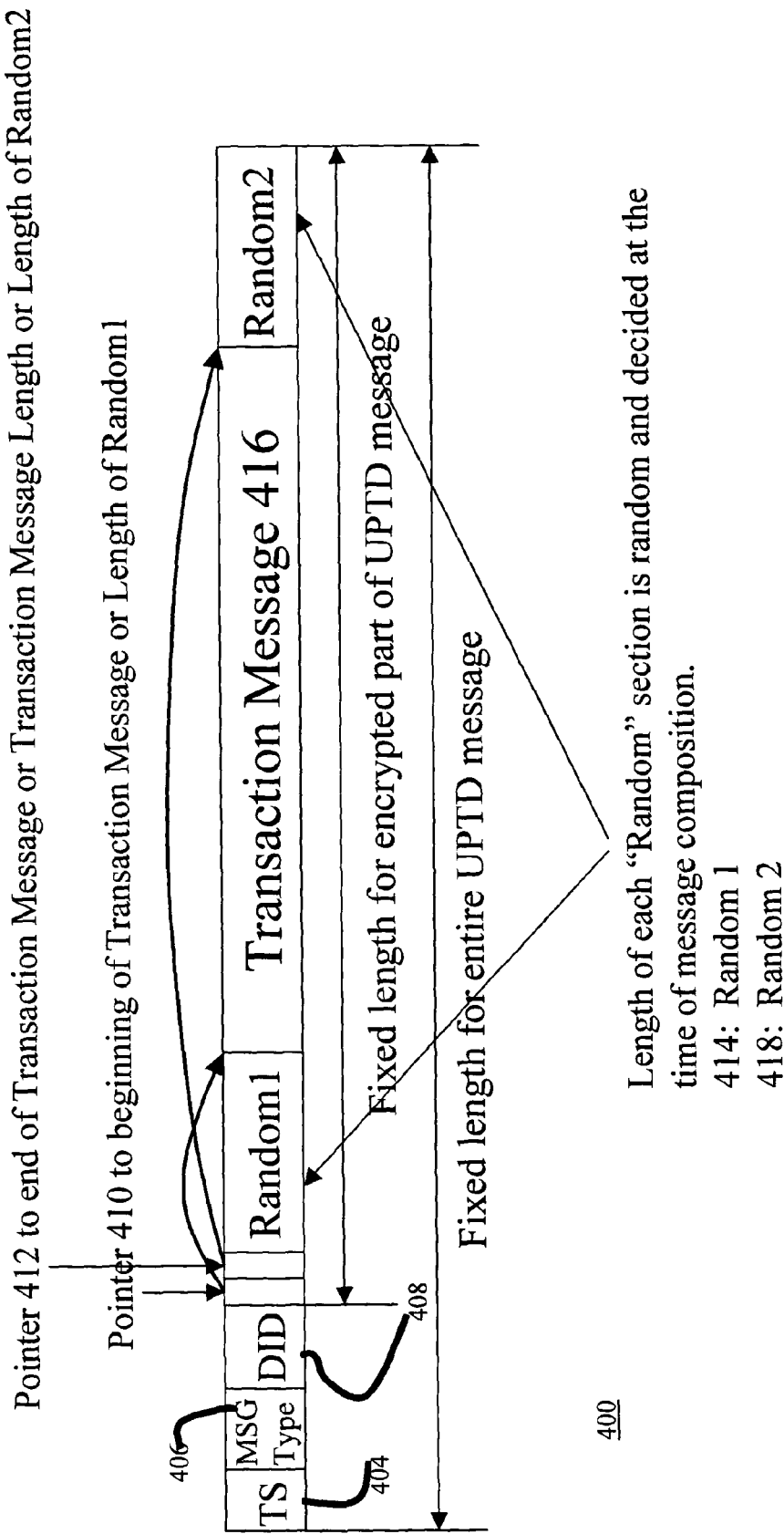
FIG. 33 shows a preferred encoding for a UPTD 102 message, such as the messages in FIGS. 29 and 31.

FIG. 33 shows an encoding for a UPTD 102 message 400, such as the messages in FIGS. 30 and 32. Other variations of the encoding of a UPTD 102 message exist, for example, one that does not include either (or one of the two) of the sets of random bits before or after the "transaction message" (the content of the communication). Note, that this encoding does not elaborate on the specific format and/or representation of each of the mentioned elements. For example, a TS (a Timestamp) is actually represented based upon different encodings/representations which do not modify/affect the workings of the protocol.

More particularly, the UPTD message 400 shown in FIG. 33 is a fixed length for the entire message 400, with a fixed length for the encrypted part of the UPTD message 400. The UPTD message 400 includes a TS 404, a message type 406, DID 408, a pointer 410 to the beginning of the transaction message or length of Random 1 (414), a pointer 412 to the end of the transaction message or transaction message length of length of Random 2 (418), Random 1 (414), the transaction message 416, and Random 2 (418). The encrypted part of the UPTD message 400 includes the pointers 410, 412, Random 1 (414), the transaction message 416, and Random 2 (418). The length of each "Random" (that is, Random 1 (414) and Random 2 (418)) is random and decided at the time of message composition.

FIGS. 34 to 41 provide additional detail of an example of the content of the transaction message part of FIG. 33, that is the message type 406, the DID 408, and the transaction message 416 of the UPTD message 400 shown in FIG. 33. Such detail is offered as an example and is drawn from the particular implementation of a UPTF system. Each one of the messages in FIGS. 34 to 41 corresponds to a message in one specific transaction workflow shown in FIG. 43.

FIG. 34 shows a REQuest for transaction by Payer (Consumer) message 420.

FIG. 35 shows a REQuest for transaction by Payee (Merchant) message 422.

FIG. 36 shows the STS 106's RESPONSE to REQuest for transaction by Payer message 424.

FIG. 37 shows the STS 106's RESPONSE to REQuest for transaction by Payee message 426.

FIG. 38 shows a Payer's AUTHorization message 428.

FIG. 39 shows a Payee's AUTHorization message 430.

Figure 40:
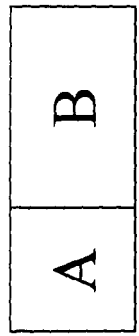

FIG. 40 shows the STS 106's RESPONSE to AUTHorization for transaction by Payer message 432.

FIG. 41 shows the STS 106's RESPONSE to AUTHorization for transaction by Payee message 434.

The following discussion is an embodiment implementing the software components on the UPTD 102, the service spot (that is, the MTS 104) and the Secure Transaction Server 106.

Software

Device 102 Software

The device 102 software includes all the software that is executed on the UPTD 102. The primary functions of the UPTD 102 software include:

Identifying a service spot (104) and listing the available services in that particular location;

Enabling the user to interact with the available services;

Perform purchasing transactions; and

Interact with the user during purchasing transactions;

The above describes the minimum necessary software functions for a UPTD 102. In addition, a device 102 may provide access to device 102-stored data, such as receipts and records of past transactions, user spent organized by account, date, etc., and so on. In addition, a device 102 may provide software-supported functionality that is unrelated to supporting the authorization of financial transactions, or to financial data altogether, such as games, calendar, contacts, etc.

In addition, device 102 might require authenticating its user prior to operation (or purchasing). Upon turning on the device 102 it might requests user authentication, either through a biometric authentication (such as a fingerprint) or a device access PIN. In the case of fingerprint authorization the device 102 displays a message to the user to put their finger on the appropriate area on the device 102. If a PIN is used for authorization, a numeric keypad is displayed on the device 102. If the device 102 has a touch screen the user can enter the PIN in a fashion similar to entering a PIN at an ATM. If a conventional display is used, then the user has to navigate the keypad using the device 102's buttons (4 buttons for up-down-left-right, or 8 buttons for 8 possible directions of movement) and then press the device 102's "enter" button to accept an entry. As a convenience to the user, after each number entry, the highlighted button will be the middle button in the display (in a typical 3-3-3-1 keypad arrangement, this button will be the number 5).

After authenticating the user, the device 102 scans all channels for available access points (potential service spots 104) in the user's proximity. This process can also take place in the background while the user is going through the process of authenticating herself to the device 102. During this "discovery" phase the device 102 identifies all available service spots (multiple access points might belong to the same service spot) and receives the "homepage" for each service spot. The homepage for each service spot might be encoded in the service spot's network ID (SSID), or it might be exchanged between the device 102 and the service spot 104 using a service discovery protocol. When the list of service spots has been compiled the device 102 launches a browser window which displays a locally generated information message (e.g., HTML page) for the user to inspect. The browser window displays the names of the available service spots as a listing that describes the service spot. For example the device 102 displays one service spot per line and no more than 4 lines per page (for readability purposes), although the font size and number of lines per screen might also be user-configurable. An example of the outcome of this stage can be seen in FIG. 51.

The listing of merchants appears as follows:

Sam's Restaurant

Jeff Books

Movie Park

The user then selects which merchant they would like to interact with. The selection is done either using the touch display or by navigating the page using the device 102 arrow-keys and the enter button. The overall experience is similar to web browsing. Upon selecting a merchant to interact with, for example, Movie Park, the user sees a listing of services offered by that merchant. For example:

Buy tickets for a movie

View movie schedule

Pay at concession stand

The user selects which service she wants to interact with and she proceeds depending on the selected service in a manner similar to purchasing or transacting through a browser. When the user is ready to start the payment phase, he starts the purchasing application running on his UPTD 102. It is important to note that the user explicitly invokes this application, either by selecting it from a listing of application available on the device or by pressing a button that has been "linked" to that application. As the user, durng payment, enters his PIN it is important that the user always starts himself the purchasing applications so that he realizes that if his PIN is requested without him having started the payment application first, then most likely some untrusted party is attempting to trick the consumer into entering his PIN in some remote web page, thus attempting to steal the user's PIN. Even though obtaining the PIN is such (or anyother) manner, would not be sufficient for a fraudulent party to attempt a purchasing transaction impersonating a consumer operating a UPTD 102, forcing the user to start the purchasing application himself, through some action that involves the invocation of the proper application on his own device, further strengthens the security of the system. So, when the user reaches the point of having to approve payment, the user is requested, by the purchasing application for her PIN and then she is presented with the listing of available financial accounts (credit card, bank accounts, etc.) that she can use for this particular payment. The device 102 preferably displays alias for these accounts, as opposed to actual account numbers. For the purposes of the presented method, it is not necessary that the device 102 maintains account numbers locally, a precaution which adds to the security of the overall method. The listing of the available accounts is updated in the background as the device 102 uses the ubiquitously offered (by all service spots) "update account" service, through which the STS provides the device 102 with an up-to-date listing of device 102-associated accounts. After the user selects the account (the PIN could optionally be requested after the selection has been made, as opposed to before it), the transaction request is generated and transmitted as described previously.

The device 102 might keep a history of prior receipts, organized for viewing in multiple ways for the user's benefits. These receipts do not contain actual account numbers and they are generated from the approved transaction messages that the device 102 has received. When the user wants to gain access to a paid service, the user submits the token or token certificate that is associated with the receipt, by invoking a local, i.e., running on the UPTD, application, for example the "submit receipt" application. The reason and mechanism for this invocation are the same as those discussed previously with respect to the purchasing application.

When the user is done interacting with the service, she might select to turn the device 102 off or the device 102 might turn itself off after a fixed (or user-specified) time period.

Turning the device 102 off could mean either of the following: the device 102 shuts itself off the way a personal computer does and has to be rebooted the next time, or, the device 102 goes into suspend mode where the device 102 is powered down after it has saved its memory state to a rewritable memory and upon rebooting it can restore itself by reading its prior memory state and loading it into runtime memory, or, it can go into sleep mode, meaning that it shuts down all power consumption except retaining memory and can be restored immediately by powering up essential components.

Merchant Software

The merchant software includes the service spot, a connection to the STS 106 and some integration (in most cases) with the merchant's point of sale system. The primary functions of the merchant installed software are:

carry out the transaction workflow that is relevant to the type of business that the merchant is carrying out;

implement a service spot, meaning that it can display the merchant-offered services on the customer's UPTD 102;

connect securely to the STS 106 so that it can submit the relevant parts of a transaction request; and integrate with the merchant's billing system so that appropriate pricing is displayed to each user for each prospective transaction and the necessary records for each successful transaction are created.

In cases where the merchant 104 also enables self-checkout, additional hardware and software supporting same is included to support customer self-checkout The core of the service spot is a wireless access point (or a set of them) which can provide access to the services that are available at the service spot. The wireless access point might support any or all of available wireless technologies, such as 801.11b, Bluetooth, RF-ID, Zigbee, IR and so on, meaning that it can provide (wireless) access to any device 102 that supports any of these technologies. It is not necessary that the access point is wireless and indeed the same functionality could be achieved if the client device 102 engages in some form of physical contact with the access point, for example swiping a card, waving a card at very close proximity to the access point and so on. For the most part though, the benefits of the discussed apparatus and methods will be evidenced in the case of a wireless interaction between the device 102 and the access point.

One configuration included on an MTS 104 providing a service spot includes:

a laptop computer by FUJITSU LIMITED, WINDOWS XP, .NET FRAMEWORK, WLAN AP (directly connected), WEB SERVER, DHCP SERVER, .NET WEB APPLICATION (STORE), a web service interface for STS 106 communication, .NET application (C#) for purchasing application, and wireless communications to a UPTD 102 for purchase transaction messages.

The subsequently described method for the interaction between a service spot and a UPTD 102 is only one of many ways of implementing the functionality of displaying on the UPTD 102 the available service spot services and managing the interaction between the device 102 and the service spot.

A service spot may include multiple access points 114. The service spot provides wireless access to a web server that provides the service spot's interface to the available services and the means for interacting with them. A compatible and enabled client device 102 receives the address of the homepage of the service spot after establishing a connection to the service spot through any of the service spots' access points. In WLAN terms a service spot is identified by a SSID and the service spot's homepage might be included in the SSID itself. The homepage of the service spot provides a listing of the available services. Broadly speaking, there exist two types of services: (a) services that are local and particular to the service spot, e.g., browsing a catalog or menu, paying a bill, purchasing an item, etc., and (b) remote services that might be accessed through the service spot but are not executed by the particular service spot, e.g., providing account balances, service listing for neighboring service spots, etc. In the latter case, the service spot is only providing network connectivity between the UPTD 102 and some other service spot or other authorized system. For the purposes of establishing wireless network connections to authorized devices 102 the service spot might also run a DHCP server so that a temporary network address can be assigned to the device 102 for the duration of the interaction between device 102 and service spot.

Upon granting a UPTD 102 a connection to the service spot the service spot server acts as a web server allowing the user to browse the services. Two critical functions of the server are to manage the workflows associated with the specific transactions that the service spot offers and to authorize the service spot's end of a transaction. The first part is similar to what most e-commerce web servers do when offering purchasing services to online customers. In the service spot case though, the necessary workflows might be different, occasionally more complex and in the case of some types of transactions they might require coordination with other service spot systems (e.g., when purchasing a physical good and allowing a self-checkout). The service spot will act as a conduit for transmitting the client-generated part of a transaction request to the STS 106 and to deliver the response of the server to the client device 102. The process of transmitting the client's part of the transaction to the merchant server and the merchant server's response to the client could be implemented either as an integral part of the web-based interaction between the device 102 and the server or as a separate protocol (synchronized with the browsing). After the service spot receives an approval from the STS 106 then it can pass it to the appropriate POS component for further processing (e.g., printing a hardcopy receipt, if the user so requires).

The service spot communicates (using a secure wired network) with the STS 106. As mentioned, the service spot acts as a medium for transporting the device 102's transaction request to the transaction server. Upon processing all the constituent parts of the transaction, the transaction server generated response, if any, will be forwarded to the device 102 and the merchant respectively. This response concludes the transaction between the merchant and the customer.

The service spot will require differing degrees of POS integration that depends on the type of store and the complexity of the existing POS infrastructure. In that sense, the requirements are not different from integrating any payment/register solution, such as a credit card processing device 102 into the store IT infrastructure. An additional requirement though, is that the store makes available an electronic version of the store-offered services, similar to creating an electronic storefront (web-store).

Secure Transaction Server 106 Software

The STS 106 has incoming connections from multiple service spots and outgoing connections to one or more financial institutions. The primary functions of the STS 106 are:

To process the merchant 104 and the consumer 102 parts of each transaction;

To properly decrypt and match the corresponding parts of each transaction in order to identify that the requested transaction is valid and it was properly requested by all involved parties;

To notify the requesting merchant and customer that a transaction request has been approved and authorized;

To, in parallel, or subsequently, forward the transaction request to the relevant payment service; and To keep records of merchant and consumer accounts, UPTD 102's and their related data and to record all transactions.

To control account registration and account deactivation for lost or stolen devices.

The interaction with the financial institution 108 depends on the nature of the arrangement with the institution 108 and the nature of the account or accounts associated with the device 102.

If the device 102 is associated with a single online payment service account (such as PayPal or C2it) the interaction with the institution can be accessed in any of the following two ways. In the absence of an arrangement with the third party, the institution will be accessed through the web-based financial institution's interface, which would require a web-scraping script for logging into the corresponding user account and performing the actions that a web user would perform if she accessed the account through the web, using a web client. Preferably (for purposes of robustness, speed and efficiency) the third party system will be accessed through an available Application Program Interface (API) that will offer direct access to the transaction posting system; such transactions would have to occur via a secure network connection (either in the form of a dedicated network, VPN, or through the use of appropriate security protocols, such as SSL).

If the STS 106 has to handle multiple financial accounts directly (meaning if the STS 106 is its own online payment service) then the server will have to connect to proprietary financial networks or to Automated Clearinghouse Network (ACH) and access each bank account separately in order to process each transaction request. Although such a system is significantly more complex that the one described previously, its implementation follows established technologies and has been done already by a variety of online payment services The architecture of the STS 106 is the typical 2-tier or 3-tier one for this type of application, i.e., a database server accessed through an application server and application layer API's. Multiple servers might be deployed in order to accommodate load and fast access due to geographic constraints and heavy transaction volume.

The primary function of the server is to authorize transaction requests 106 using the STP. The server keeps a real-time and up-to-date record of all the UPTD 102's in use; specifically, the server knows the device 102 ID of each UPTD 102 in circulation, the user account associated with the device 102 and the transaction authorizing PIN issued for each device 102. The server also does the same for each merchant-owned service spot. As long as the server knows the seed for each client device 102 (and merchant service spot), corresponding PIN's, random generator and the means for resolving the time of a generated ID by the client, it will be able to decrypt the constituent parts of a transaction request and decide whether to authorize a transaction.

Beyond serving the functionality discussed, the server might provide implementation and support for additional applications, such as the cashier-less store discussed elsewhere in this document, analytics on transactional data, monitoring of customer transactions in order to provide opportunities for customized offers by financial institutions to consumers, etc. Such applications can be designed on top of the typical 2-tier or 3-tier architecture mentioned before.

One example of an STS 106 configuration includes a DELL desktop computer, WINDOWS XP, .NET FRAMEWORK, NET application, C# (for STS 106 functionality), and a web services (e.g., WSDL and SOAP-based) interface for MTS 104 communication.

Figure 42:
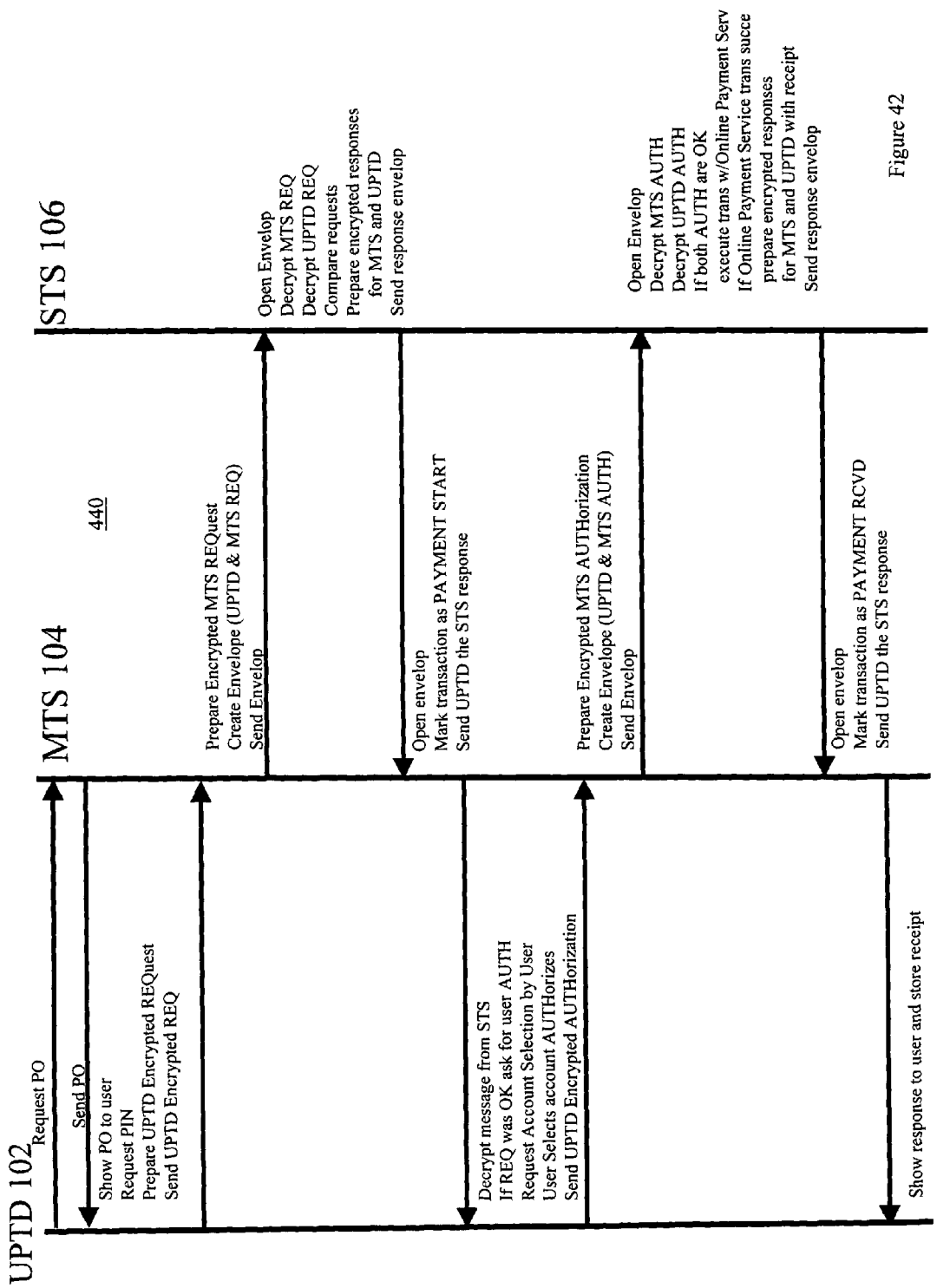
FIG. 42 describes in detail an example of a physical goods purchase such as the one in FIG. 3.

FIG. 42 describes 440 in detail a physical goods purchase such as the one shown in FIG. 6. Each of Purchase Order Acquisition (FIG. 10), REQuest (FIG. 14) and AUTHorization (FIG. 15) can be seen in further detail as the actions and messages of the consumer and merchant devices and of the STS 106 are described. These actions are carried out by the purchasing applications of the UPTD 102 and the MTS 104 and by the STS 106.

As shown in FIG. 42, the UPTD 102 transmits to the MTS 104 a Request PO, and the MTS 104 sends to the UPTD 102 a PO (purchase order) in response to the UPTD 102's request. The UPTD 102 displays the PO to the user, and requests that the user input to the UPTD 102 a PIN. The UPTD 102 prepares and transmits a UPTD Encrypted REQuest to the MTS 104.

Upon receiving the UPTD Encrypted REQuest, the MTS 104 prepares an Encrypted MTS REQuest, creates an envelope (including the UPTD & MTS REQ) and transmits the envelope to the STS 106.

Upon receiving the envelope, the STS 106 decrypts the MTS REQuest, decrypts the UPTD REQuest, compares the MTS REQuest and the UPTD REQuest with each other, and, based upon the results of the comparison of the MTS REQuest and the UPTD REQuest with each other, prepares encrypted responses (such as PAYMENT START if the comparison by the STS 106 had indicated that MTS REQuest and the UPTD REQuest agree with each other) for the MTS 104 and the UPTD 102. The STS 106 includes a listing of the accounts associated with the specific UPTD 106 in its response to the UPTD 106. The STS 106 then sends the responses to the MTS 104 in a response envelope.

Upon receiving the response envelope from the STS 106, the MTS 104 opens the envelope, marks the transaction as PAYMENT START (if the comparison by the STS 106 had indicated that MTS REQuest and the UPTD REQuest agree with each other), and transmits to the UPTD 102 the STS 106 response included in the response envelope.

The UPTD 102 then decrypts the message from the STS 106. If the message from the STS 106 indicates that the REQuest was acceptable (that is, if the comparison by the STS 106 had indicated that MTS REQuest and the UPTD REQuest agree with each other), then the UPTD 102 queries the user for AUThorization. The UPTD 102 displays a listing of accounts received by the STS 106 and waits for the user to indicate which account to use for the purchase and authorize the transaction. If the user AUThorizes (that is, provides AUThorization), the UPTD prepares and forwards to the MTS 104 an encrypted AUThorization.

The MTS 104 then prepares encrypted MTS AUThorization, creates an envelope (including the UPTD and the MTS AUThorizations) and transmits the envelope to the STS 106.

Upon receipt of the envelope, the STS 106 opens the envelope, and decrypts the MTS AUThorization and decrypts the UPTD AUThorization. If both the MTS AUThorization and the UPTD AUThorization are acceptable to the STS 106, the STS 106 transmits to the financial institution 108 (not shown in FIG. 42) in communication with the STS (such as PAYPAL) a message to execute the authorized transaction.

Upon completion of the authorized transaction, the financial institution transmits a message to the STS 106 indicating whether the transaction has succeeded. If the financial institution indicates in the message that the transaction has succeeded, the STS 106 prepares encrypted responses for the MTS 104 and the UPTD 102 and transmits the encrypted responses to the MTS 104 in a response envelope.

Upon receiving the response envelope, the MTS 104 opens the envelope, marks that transaction as PAYMENT RECEIVED, and forwards to the UPTD 102 the STS 106 response.

The UPTD 102 receives the STS 106 response.

Figure 43:
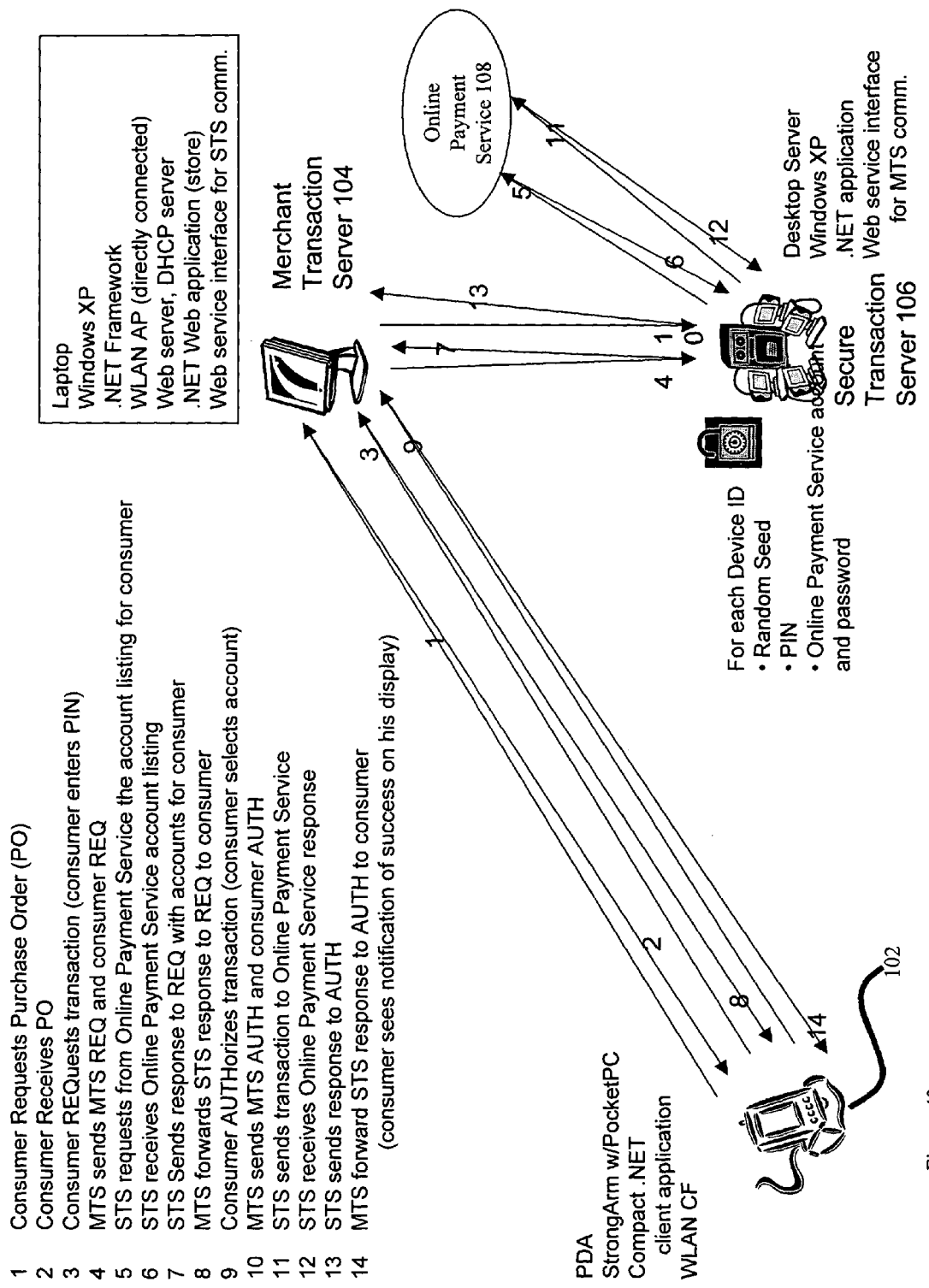
FIG. 43 is a representation of the message flow between UPTD 102, MTS 104, STS 106 and financial institution (in this case an Online Payment Service), during one (of many possible) physical goods purchase.

FIG. 43 is a representation of the message flow between UPTD 102, MTS 104, STS 106 and payment service (in this case an Online Payment Service) 108, during a physical goods purchase.

Referring now to FIG. 43, 1 the UPTD 102 transmits a Request PO (purchase order) to the MTS 104;

2 the MTS 104 sends the PO to the UPTD 102;

3 the UPTD 102 sends a UPTD transaction REQuest to the MTS 104; user enters PIN 4 the MTS 104 sends an MTS transaction REQ and UPTD REQ to the STS 106;

5 STS requests from Online Payment Service the account listing for consumer

6 STS receives Online Payment Service account listing 7 the STS 106 sends a response to the REQs to the MTS 104;

8 the MTS 104 forwards the STS response to REQ to the UPTD 102;

9 the UPTD 102 sends the UPTD transaction AUTHorization to the MTS 104;

10 the MTS 104 sends the MTS transaction AUTH and UPTD AUTH to the STS 106;

11 the STS 106 sends the transaction to an online payment service 108

12 the STS 106 receives the online transaction service 108 response;

13 the STS 106 sends a response to AUTH to the MTS 104; and 14 the MTS 104 forwards the STS 106 response to AUTH to UPTD 102.

Figure 44:
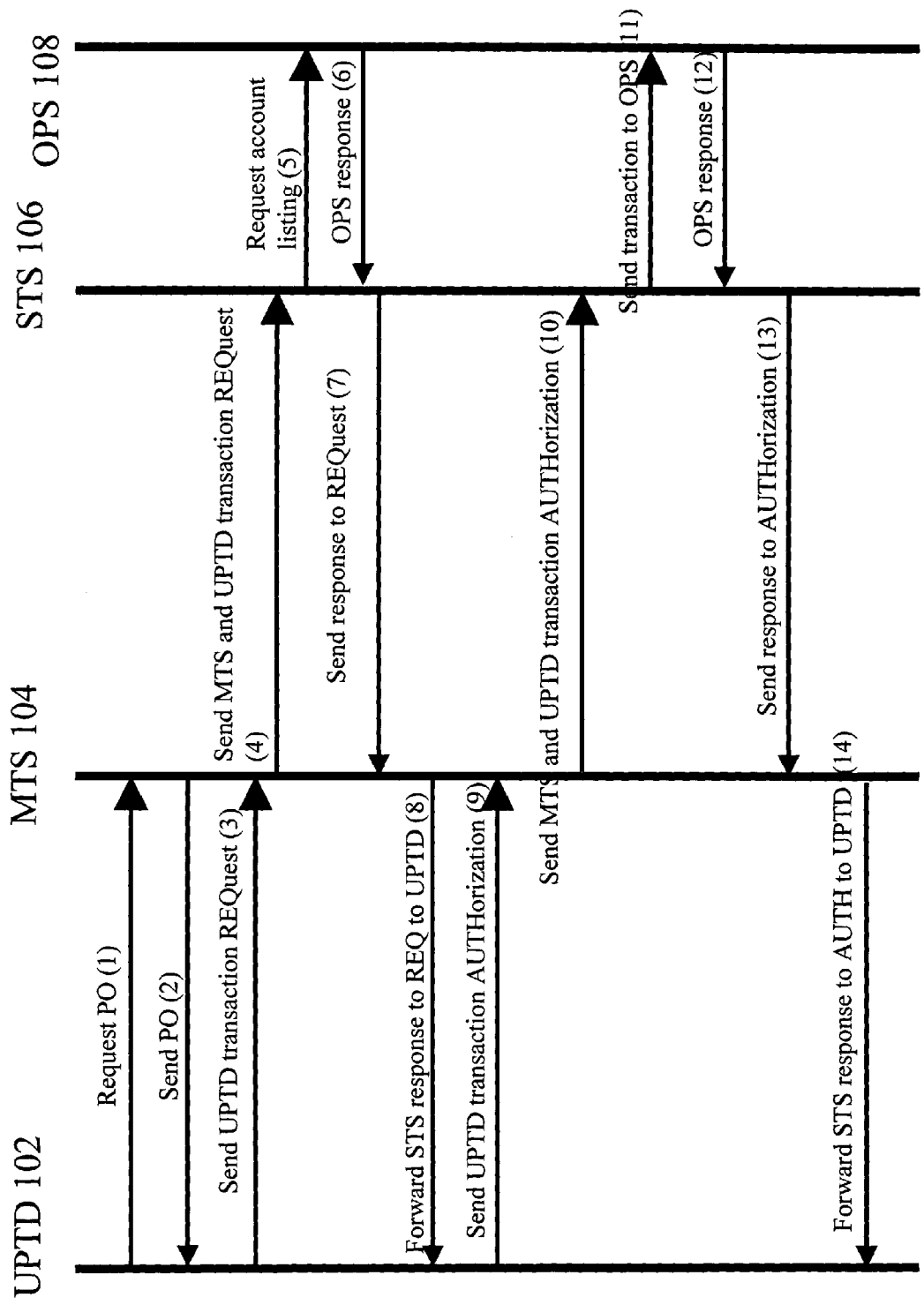
FIG. 44 is an alternate representation of the same information as in FIG. 43. The figure represents detail of the messages exchanged during a physical goods purchase such as the one described in FIG. 8, using the Purchase Order Acquisition method of FIG. 10.

FIG. 44 is an alternate representation of the same information as in FIG. 43, and the above-mentioned functions 1-14 explained with respect to FIG. 43 also apply to FIG. 44.

Figure 45:
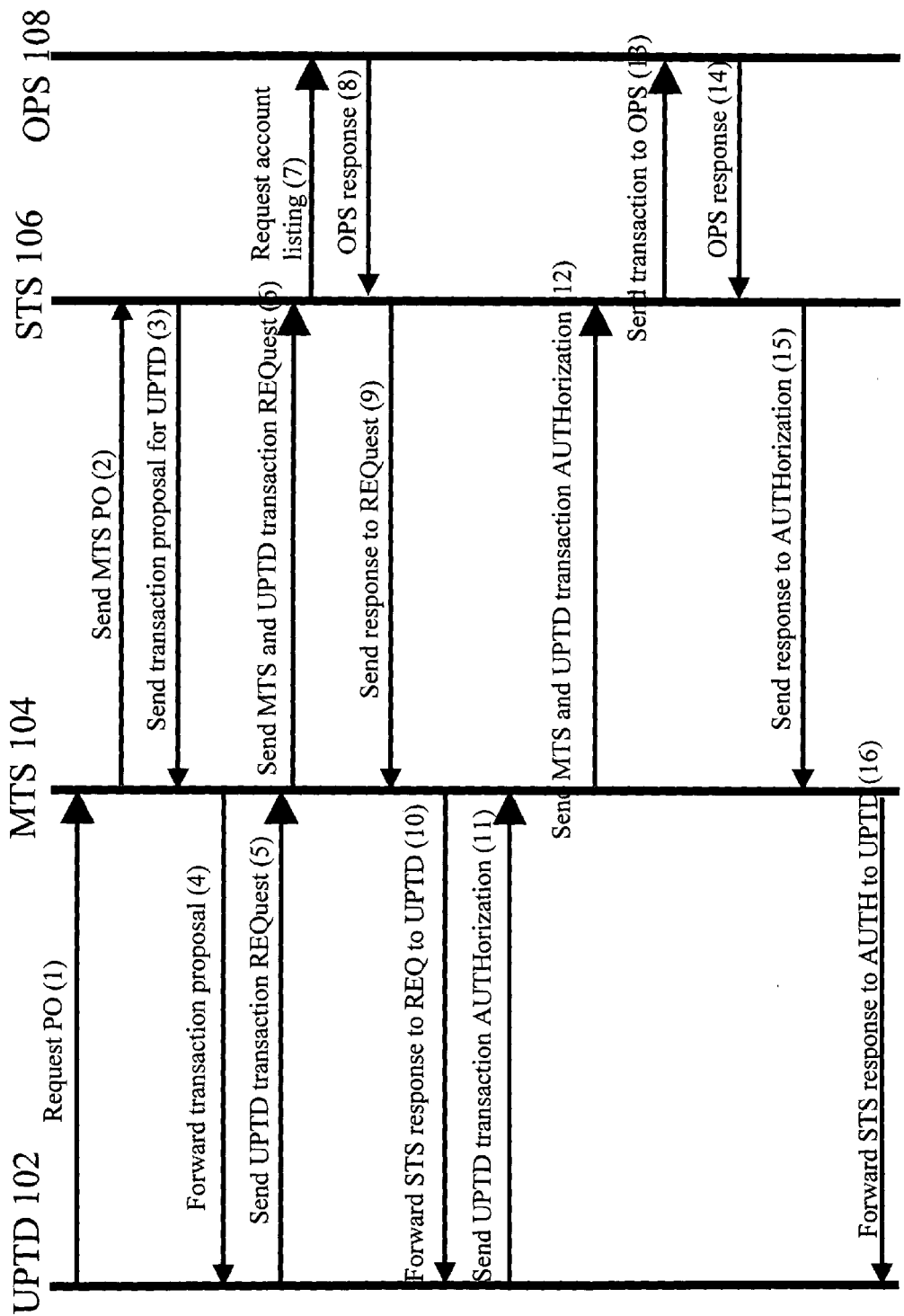
FIG. 45 is similar to FIG. 43, but the Purchase Order is requested from the STS. The figure represents detail of the messages exchanged during a physical goods purchase such as the one described in FIG. 8, using the Purchase Order Acquisition method of FIG. 11 or the method of FIG. 12.

FIG. 45 is similar to FIGS. 43 and 44 but it represents detail of the messages exchanged during a physical goods purchase such as the one described in FIG. 7, but using the Purchase Order Acquisition method of FIG. 11.

Referring now to FIG. 45, 1 the UPTD 102 sends a Request for a purchase order (Request PO) to the MTS 104;

2 the MTS 104 sends the MTS PO to the STS 106;

3 the STS 106 sends Transaction Proposal to the MTS 104;

4 the MTS 104 forwards the Transaction Proposal to the UPTD 102;

5 the UPTD 102 sends UPTD transaction REQuest to the MTS 104;

6 the MTS 104 sends the MTS transaction REQ and UPTD REQ to the STS 106;

7 STS requests from Online Payment Service the account listing for consumer;

8 STS receives Online Payment Service account listing;

9 the STS 106 sends a response to REQ to the MTS 104;

10 the MTS 104 forwards the STS response to REQ to UPTD 102;

11 the UPTD 102 sends UPTD transaction AUTHorization to the MTS 104;

12 the MTS 104 sends the MTS transaction AUTH and UPTD AUTH to the STS 106;

13 the STS 106 sends the transaction to the online payment service 108 (such as PAYPAL);

14 the STS 106 receives the online payment service response;

15 the STS 106 sends a response to AUTH to the MTS 104; and 16 the MTS 104 forwards the STS response to AUTH to UPTD 102.

Business Models and Revenue Generation

Figure 46:
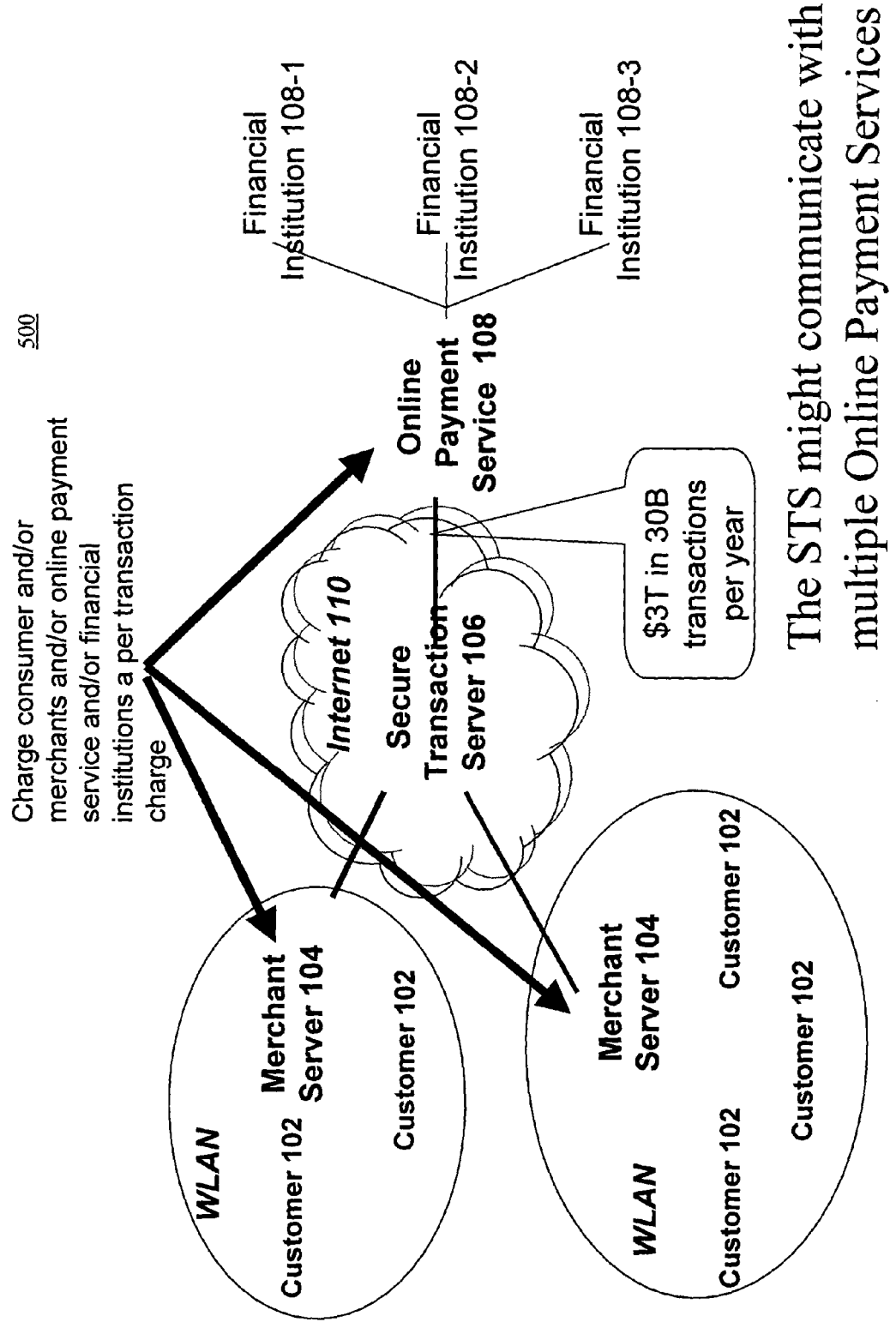
FIG. 46 is a representation of a UPTF business model.

FIG. 46 is a representation of a UPTF business model 500. As shown in FIG. 46, multiple customers 102 communicate with respective merchant servers 104 through wide area local area networks (WLANs) 105. The merchant servers 104 communicate with the secure transaction server 106 through the Internet 110. The secure transaction server 106 communicates also through the Internet 110 with an online payment service 108, which communicates with various financial institutions 108-1, 108-2, and 108-3. Therefore, the secure transaction server 106 may communicate with multiple online payment services 108.

In the UPTF business model 500 shown in FIG. 46, merchants 104 and/or online payment services 108 and/or financial institutions 108-1, 108-2, and 108-3 are charged a fee per transaction. This fee can be a flat fee or a percentage of the total amount of the transaction, or a combination thereof, and it can be charged to any of the consumer, merchant, or financial institution.

In the presented system architecture, the Secure Transaction Server 106 is the necessary component for resolving transactions and making possible the further processing. Three parties rely on the successful processing of the Transaction Server: customer, merchant, on-line payment service. All three can be charged a fee per transaction processed, since all three parties benefit from the process.

Many types of pushed information can be supplied to the devices 102. For example the user can receive pre-approved credit cards (or special per transaction APR's, or special offers and coupons) as the user is about to make a purchase. For such mechanisms to work, real-time access to the STS 106 will be necessary enabling the deployment of such applications as add-on services to the STS 106. Parties, such a bank who issued a particular credit card, will be the paying customer in such a case.

Devices 102 in the UPTF Framework

The UPTD 102 is a single device that replaces the multiple plastic credit cards and smartcards that everyone typically carries on their person and provides a more convenient, efficient and secure way to conduct a credit card purchase. Through a wireless communication capability built into the device 102, a transaction can be conducted without the placement of the card into a card reader or a user signature. This leads to reduced time and labor for every purchase, benefiting both consumer and merchant. A Secure Transaction Service (STS 106) is defined that will verify each transaction prior to being committed, providing protection against fraud.

The main features of the device 102 are:

Wireless 2-way communication; and

Limited, simple user interface, consisting of a display (e.g., LCD) and several buttons for an on/off switch, navigation and confirm/pay/transact functions.

Mobile phones with 2-way wireless communication, such as IR, Bluetooth, WLAN, etc, PDA's with 2-way wireless communication, such as IR, Bluetooth, WLAN, etc, and special purpose devices described next can be used as consumer devices in the described invention.

FIGS. 47 to 50 show one particular embodiment of a UPTD 102; this is a new device, whose only purchase is to perform purchasing transactions in the way described in the current invention. Examples of other devices which may execute UPTD 102 functions include mobile phones or personal digital assistants (PDAs).

Figure 47:
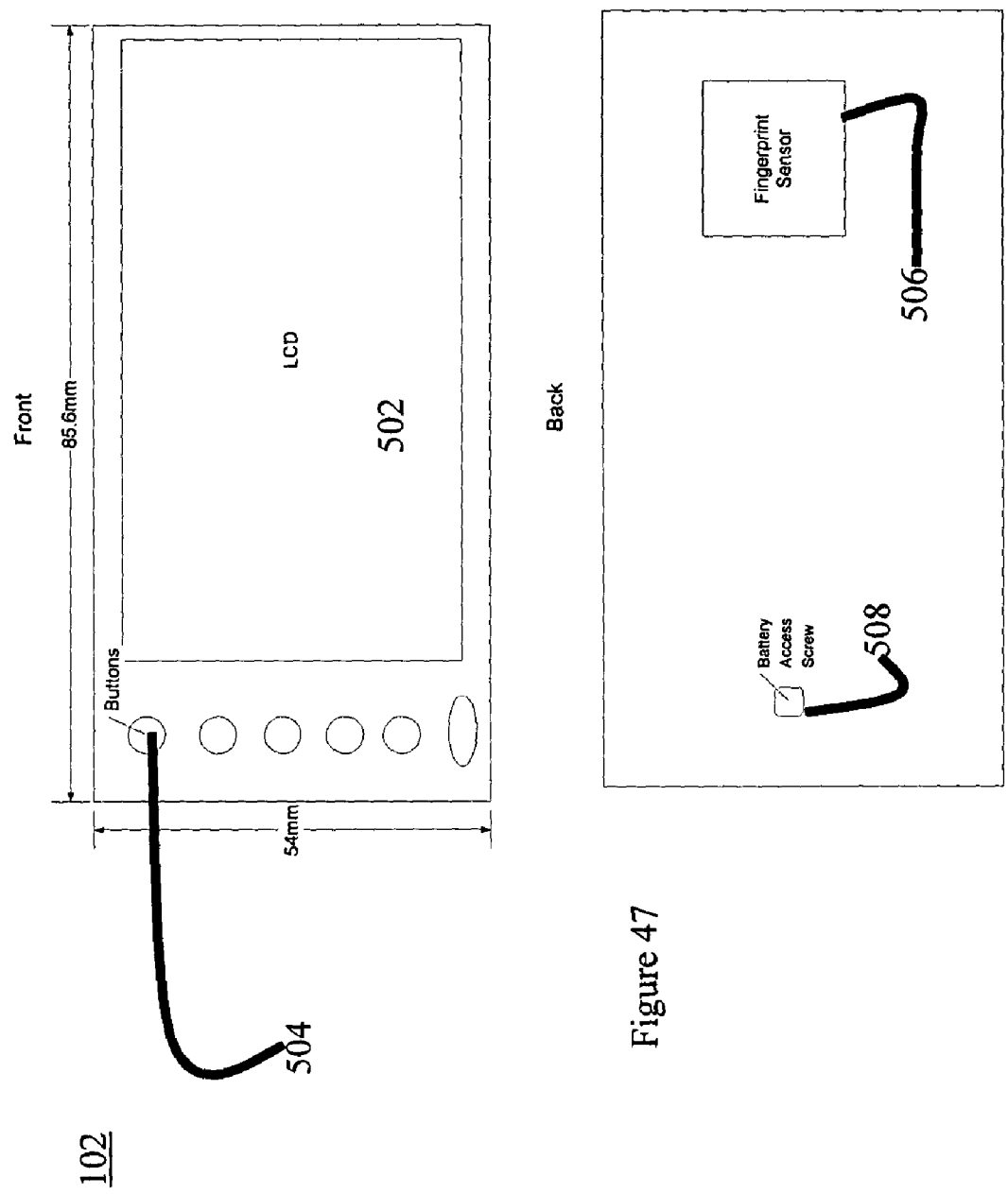
FIGS. 47 to 50 are drawings of a special purpose device UPTD 102.

Referring now to FIG. 47, this UPTD 102 includes a liquid crystal display 502 and buttons 504 on the front side, and a fingerprint sensor 506 and a battery access screw 508 on the back side. The dimensions of the UPTD 102 are 54 mm by 85.6 mm.

Figure 48:
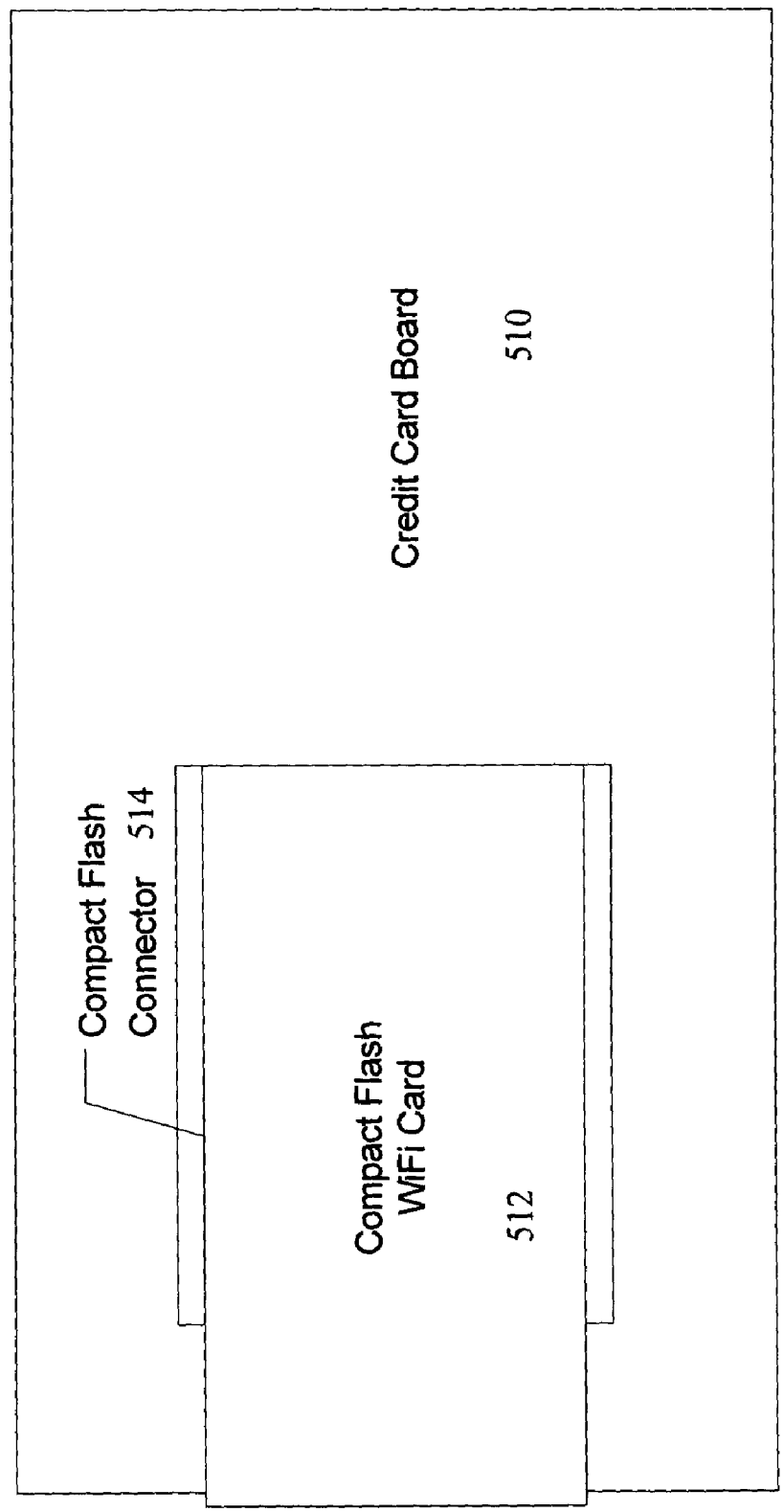

FIG. 48 shows a credit card-sized processor board 510, a compact flash WiFi card 512, and a compact flash connector 514 included on the UPTD 102. The compact flash 512 may be extended on a WLAN card beyond the credit card board 510 to accommodate an antenna.

Figure 49:
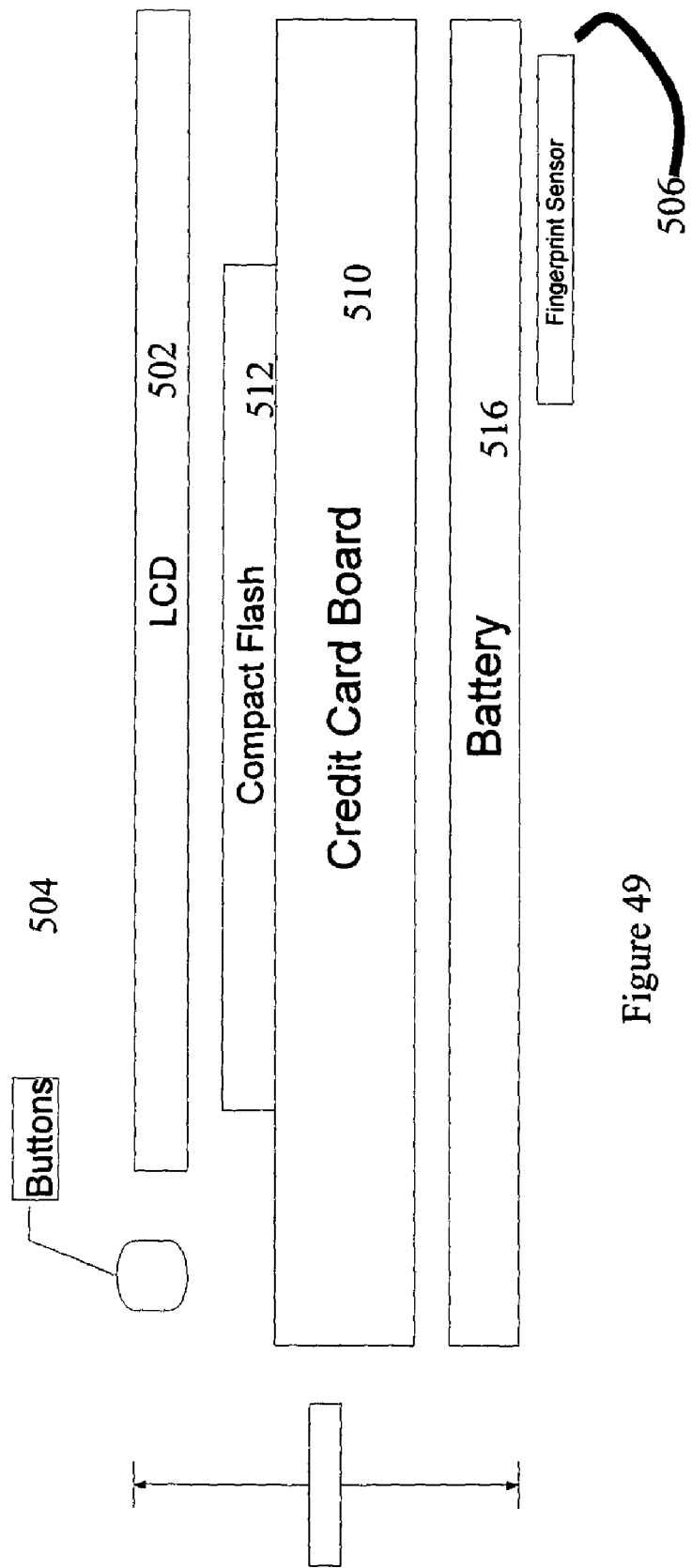

FIG. 49 shows a side view of the UPTD 102. The height of the UPTD 102 is approximately 20 mm. The side view of the UPTD 102 shows the relative positions of the buttons 504, the LCD 502, the compact flash 512, the credit card board 510, the fingerprint sensor 506 and the battery 516.

Figure 50:
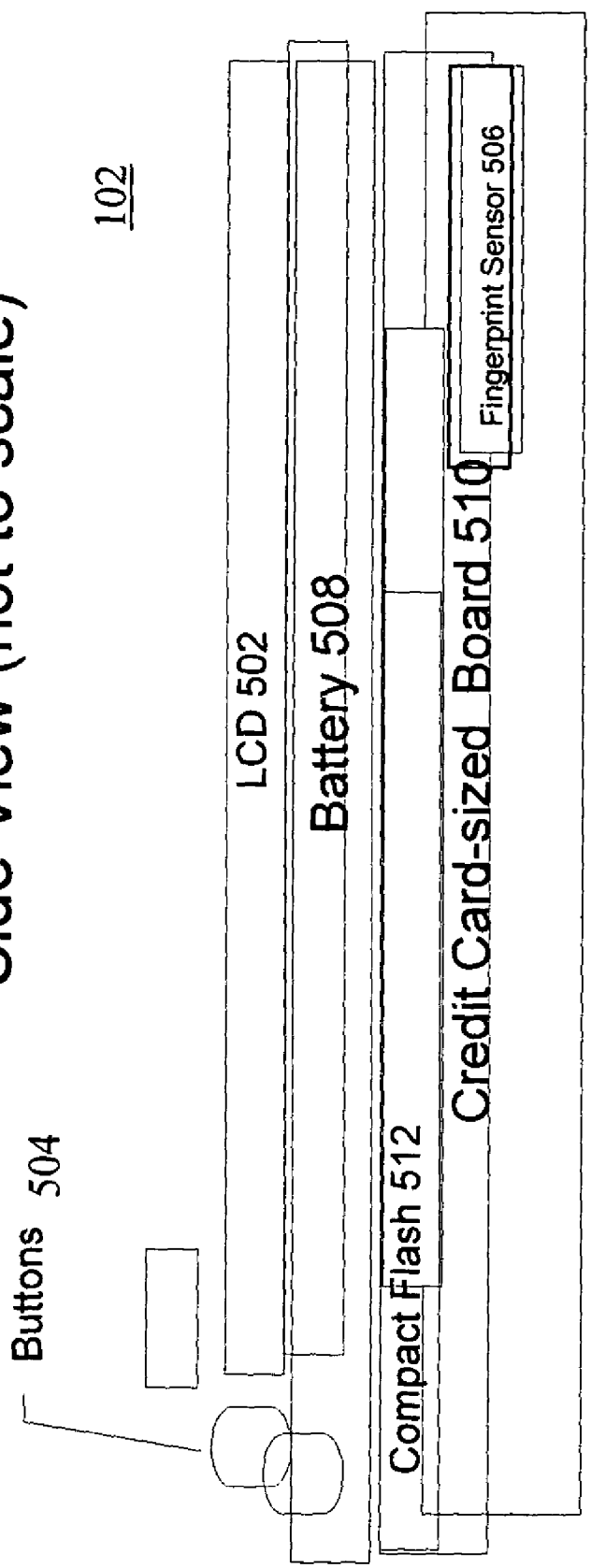

FIG. 50 shows an alternate side view of the UPTD 102. The height of the UPTF 102 is approximately 20 mm. The side view of the UPTD 102 shows the relative positions of the buttons 504, the LCD 502, the compact flash 512, the credit card board 510, the fingerprint sensor 506 and the battery 516.

The discussed UPTD 102 is one of the devices that are enabled by and can be deployed within the UPTF framework of the present invention.

The complete UPTD 102 includes a fingerprint sensor, WLAN (or other wireless communication), display, and other features as discussed herein above. The UPTD 102 is intended for both physical and virtual goods purchases. It relies on the SAS protocol for both types of transactions and the end-user handles the entire transaction cycle from the UPTD 102. This version of the UPTD 102 as a functional set could be embedded in a mobile phone device 102 that is equipped with a some local wireless communication link (e.g., WLAN or Bluetooth).

Other devices variants 102 which can be used as a UPTD 102 are now discussed.

One device 102 is a variation of the UPTD 102 without the display and the buttons. Such a device 102 can be made to be considerably smaller than a UPTD 102 because of the lesser power requirements due to the lack of a display (which would lower the battery size requirements) and the additional size of the display and the buttons. When the user is using this device 102 the user first authenticates herself to the device 102 using a biometric feature (e.g., using the fingerprint sensor) and upon successful user authentication, the device 102 executes the merchant authentication protocol. After the user of the device 102 has been authenticated and the device 102 has authenticated the validity of the merchant, the device 102 transmits its device 102 ID to the merchant. This transmission can be done using the two-way wireless capability of the device 102 or by activating a component that can transmit the device 102 ID (e.g., a RF ID tag, or a power-controlled barcode emitter). Instead of transmitting the device 102 ID, that biosensor activated component can transmit any other identifier that can be used to uniquely identify the user of the device 102, such as a (possibly encrypted) permutation of her social security number, or even some unique global identifier that the user herself does not know and need not remember. The transmitted device 102 ID (or other code) suffices for the merchant to query the transaction server for the records of the user of this device 102 ID, so that on a merchant device 104 mounted display (e.g. at the point of sale) the user can select which account to use for payment (as when the user uses the UPTD 102). The user authorizes payment using her PIN, as if using a UPTD 102. Since only aliases of the user's accounts are displayed and since the user's real identity need not be displayed on the (potentially) public display the user does not jeopardize her privacy in this mode. Moreover, since the user has authenticated herself to the device 102, the merchant is guaranteed that the registered and authorized owner/user of the device 102 (which is also the owner of the accounts displayed) is attempting to perform the transaction that is being displayed at the POS. Further, the increased level of security, thanks to the biosensor-based user authentication on the device 102, is achieved without the STS 106 or the merchant maintaining a global database of biometric identifiers which would be both implementationally expensive and challenging, but also potentially undesirable to consumers who would oppose such a centralized repository. In other words, no user data (e.g., fingerprint) is stored outside of the user's UPTD 102 and can be kept private. Since it is stored locally, it would be stored in a tamper-proof manner. Although such a device is described, it is possible that a UPTD 102 (which by its design incorporates all the elements and functions described here) could be operated in the manner described for this alternative device 102.

A second device 102 is like the previous device 102 but without the two way communication channel, which would result to even lesser size because of the smaller size and power consumption of the communication chip. In this case the user does not execute the merchant authentication protocol, thus this device 102 variation would be most adequate in situations where the user trusts the purported identity of the merchant. Except for the merchant authentication function the operation of the device 102 and the subsequent transactional functions are the same as described before.

A third device 102 is like the first described device 102 but with a less sophisticated biosensor. The biosensor need not compute the user verification locally (e.g., to match the known fingerprint of the registered user). In this case a secure communication is used to transfer the raw biosensor data (or some other representation of the raw data that is functionally equivalent to the raw data, for the purposes of the matching algorithm) to the merchant 104 and device 102 and eventually to the secure transaction server along with the device 102 ID or the user's globally unique identifier. The secure transaction server contains the stored bio-data (or their functional equivalent) for the individual associated with the device 102. The association code is used to limit the need for searching the entire database to produce a match. After the registered user of the device 102 (and device 102-associated account holder) has been matched successfully to the provider of the biosensor data, the operation and transaction of the device 102 proceeds as described for the first device 102.

The described devices 102 are progressively smaller in size and power requirements. As a result, except for the credit form factor, form factors such as a key ring are also possible and feasible.

As is the case with the UPTD 102, each of the described devices 102 and their function can be incorporated in a mobile phone. One particular example of a mobile phone used as a UPTD is a mobile phone that can display barcodes, or with a RF-ID attached to it, that does not include a local wireless link but delivers the functionality of a local wireless local link over the mobile carrier's network.

Finally, each of the described devices 102 can be thought of as modes of operation of the UPTD 102 that can be selected by the user, or automatically invoked with the aid of some automated or user-controlled identification of the scenario that each mode is best suited for.

FIGS. 51 to 56 show examples of a UPTD 102's display during pre-purchasing, physical goods purchase, and service purchase. When the display of the UPTD 102 displays "U P T D" on top of the display, this is meant to indicate that whatever is displayed is generated by the purchasing application running on the UPTD.

Figure 51:
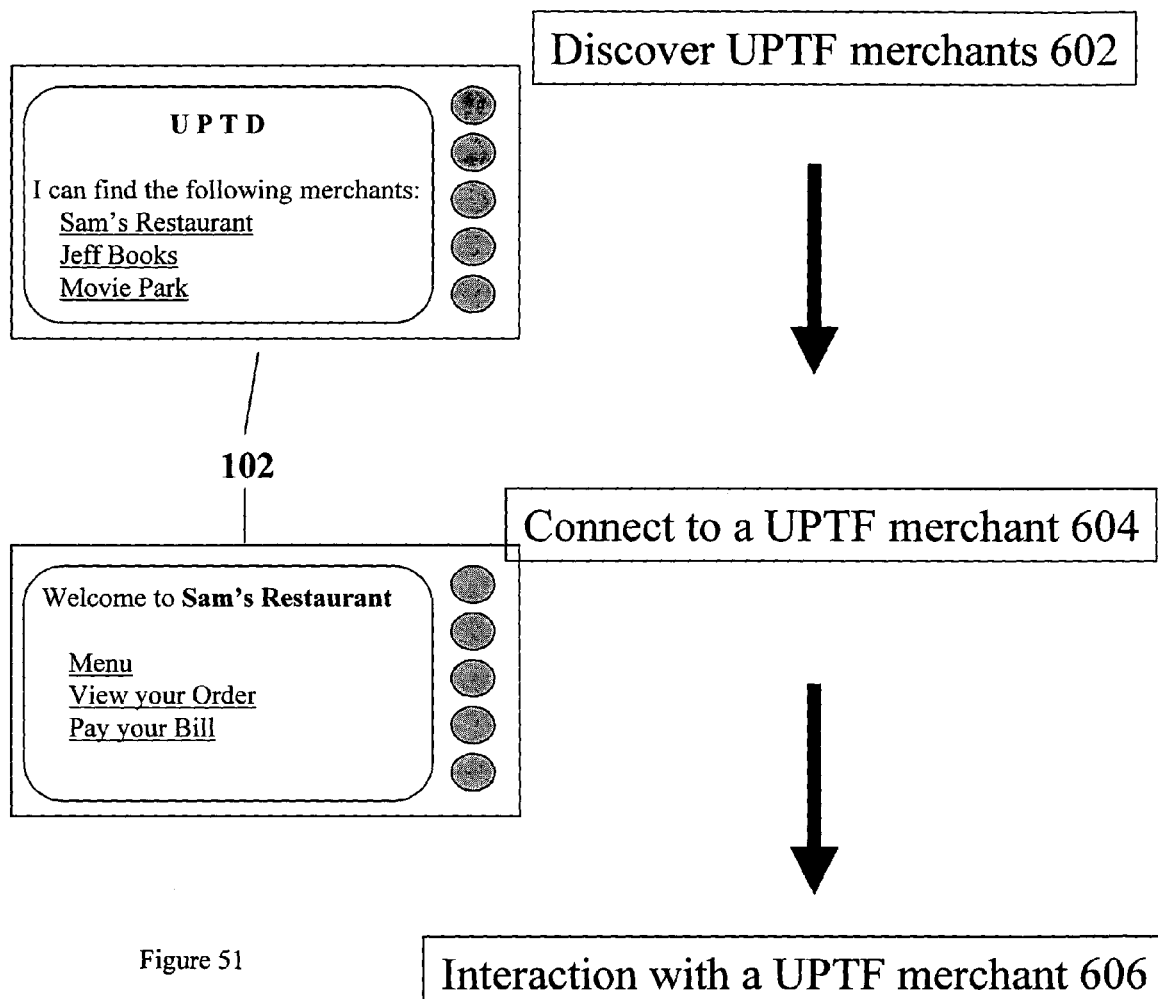
FIG. 51 shows samples UPTD 102 displays for merchant discovery and connecting to a merchant, prior to interacting with a merchant.

FIG. 51 shows example UPTD 102 displays for a pre-purchasing phase 600, including merchant discovery 602 and connecting 604 to a merchant 604, prior to interacting 606 with a merchant.

Figure 52:
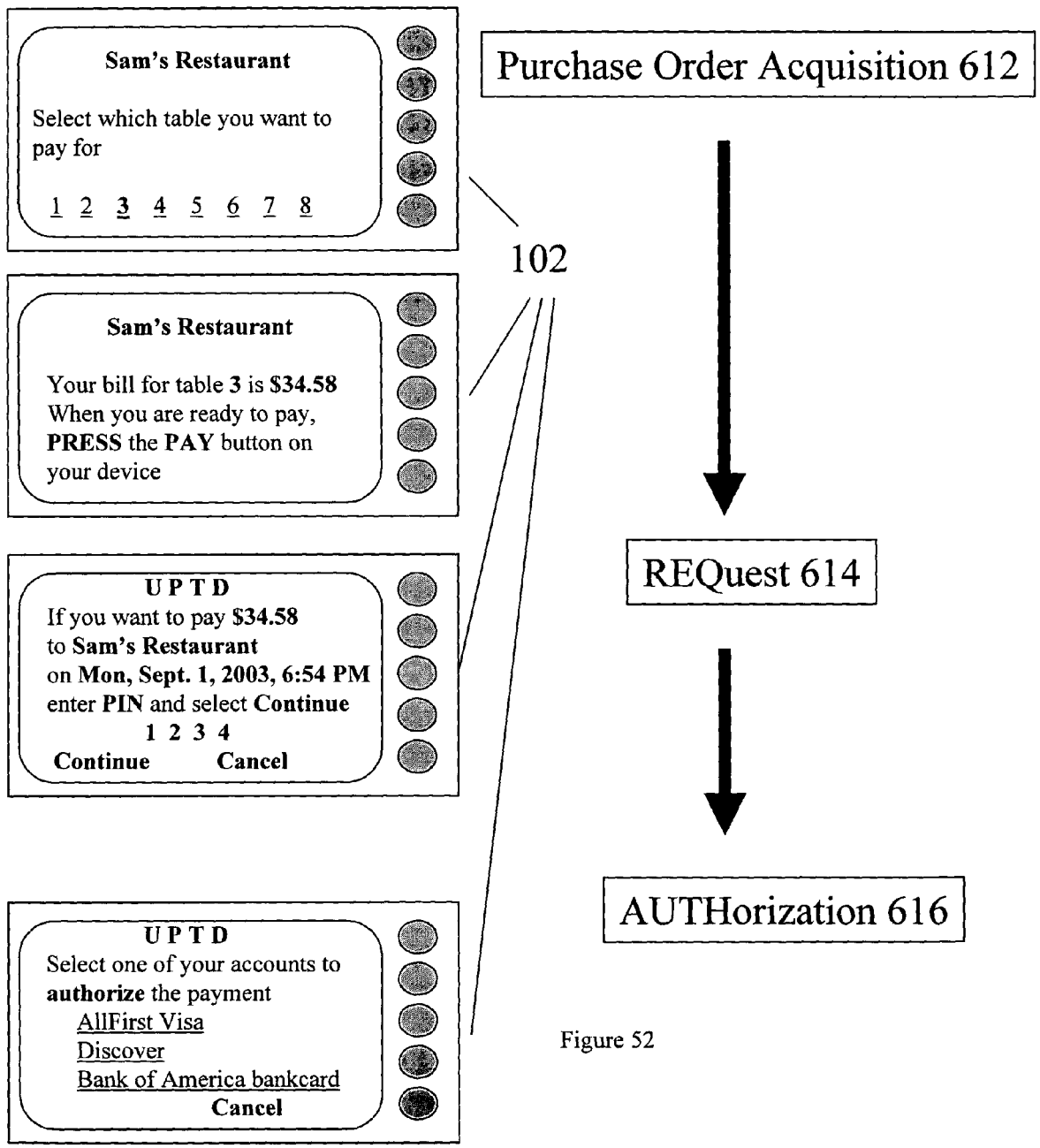
FIGS. 52, 53, 54 shows samples UPTD 102 displays for a physical goods purchase (as in FIG. 8).

FIG. 52 shows example UPTD 102 displays for a physical goods purchase 610 (as in FIG. 8). The purchasing scenario is one of paying for a previously placed (and presumably consumed) order at a restaurant, in which the UPTD 102 initiates 612 purchase order acquisition, prepares and forwards a REQuest 614, and prepares and forwards an AUTHorization 616.

Figure 53:
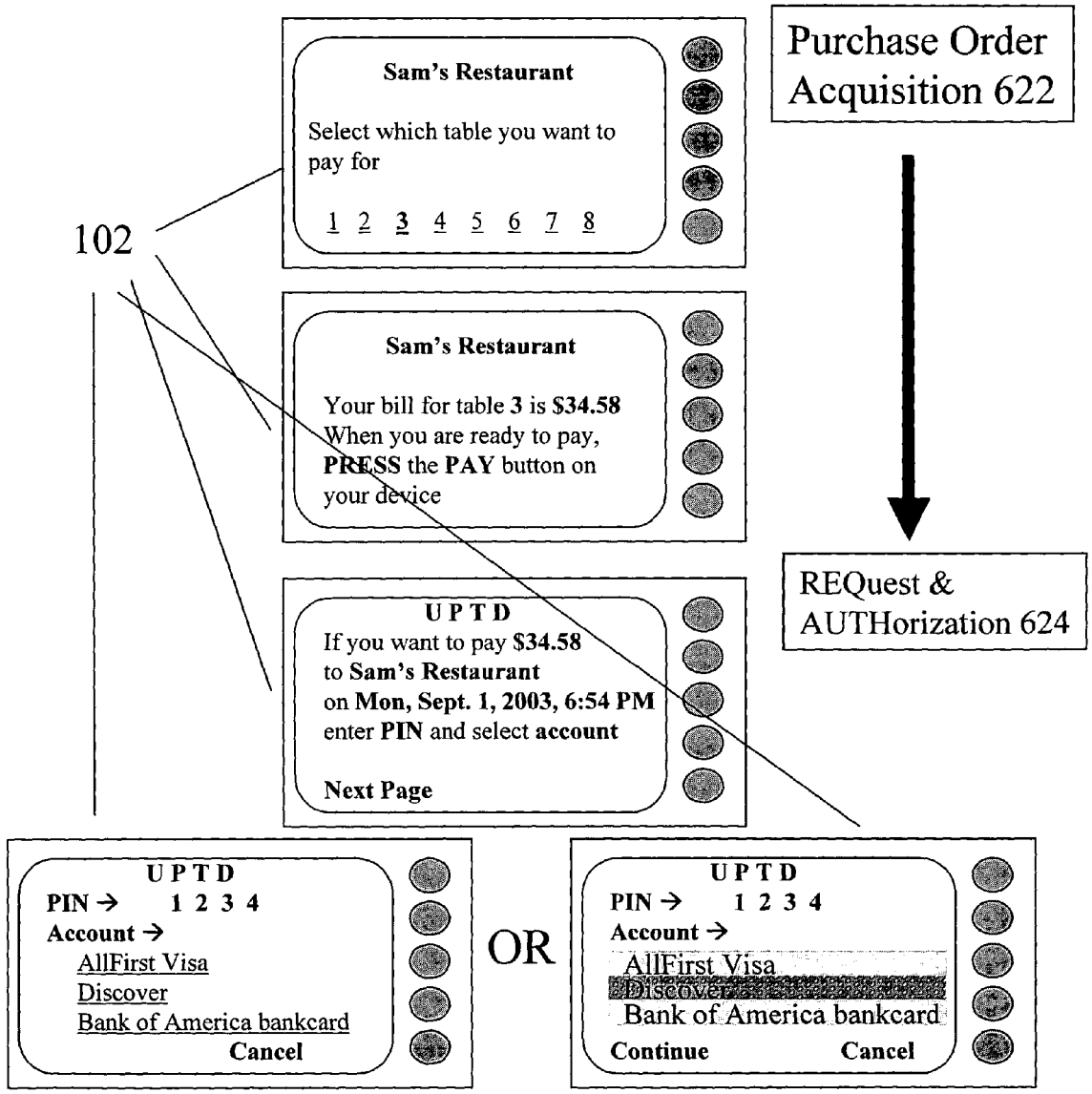

FIG. 53 shows example UPTD 102 displays for a physical goods purchase 620 (as in FIG. 8). The purchasing scenario is one of paying at the register of a convenience store, in which the UPTD 102 initiates 622 purchase order acquisition, prepares and forwards a REQuest and an AUTHorization 624.

Figure 54:
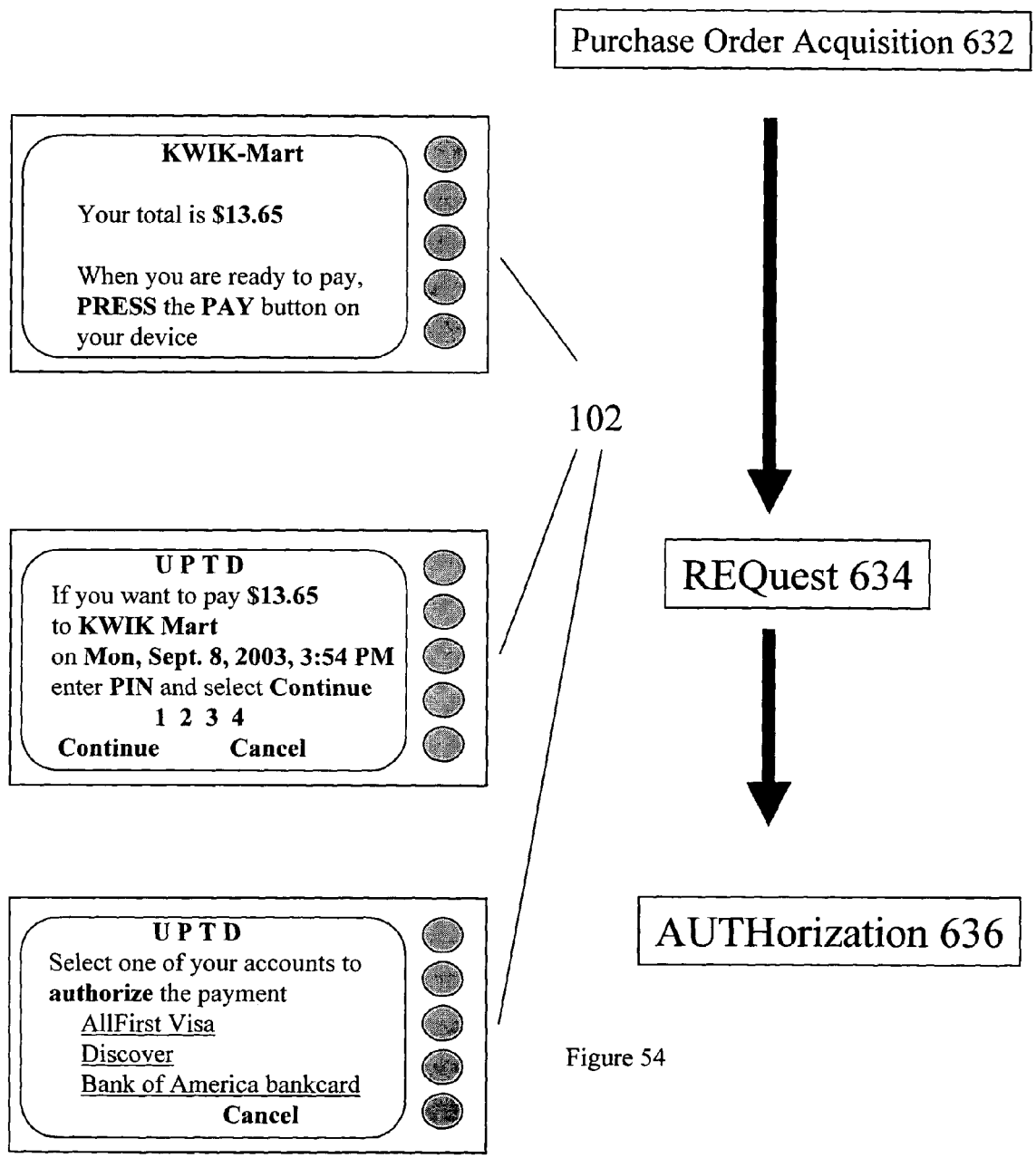

FIG. 54 shows example UPTD 102 displays for a physical goods purchase 630, in which the UPTD 102 initiates 632 purchase order acquisition, prepares and forwards a REQuest 634, and prepares and forwards an AUTHorization 636.

Figure 55:
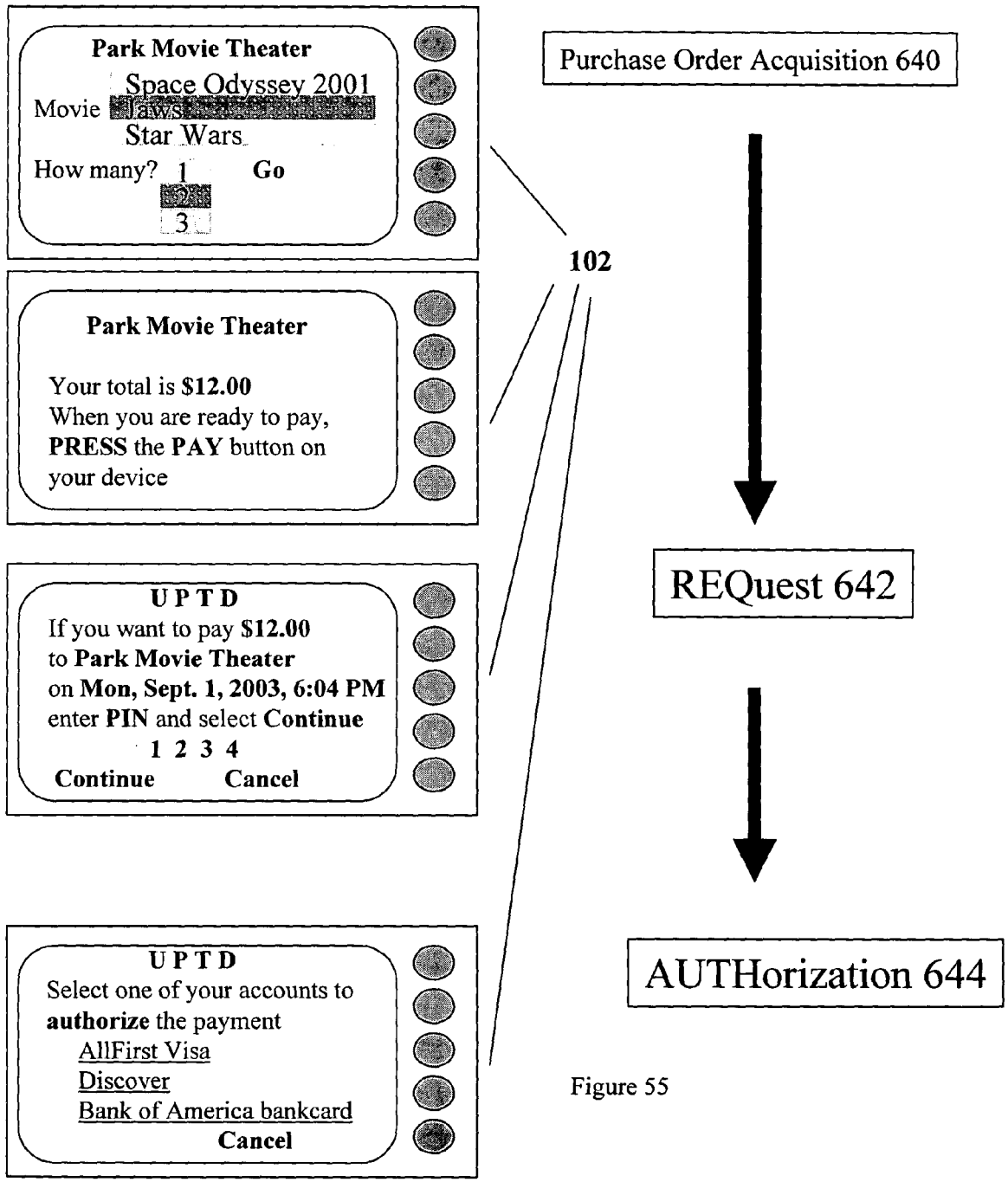
FIGS. 55 and 56 show samples UPTD 102 displays for a service purchase (as in FIG. 9).
Figure 56:
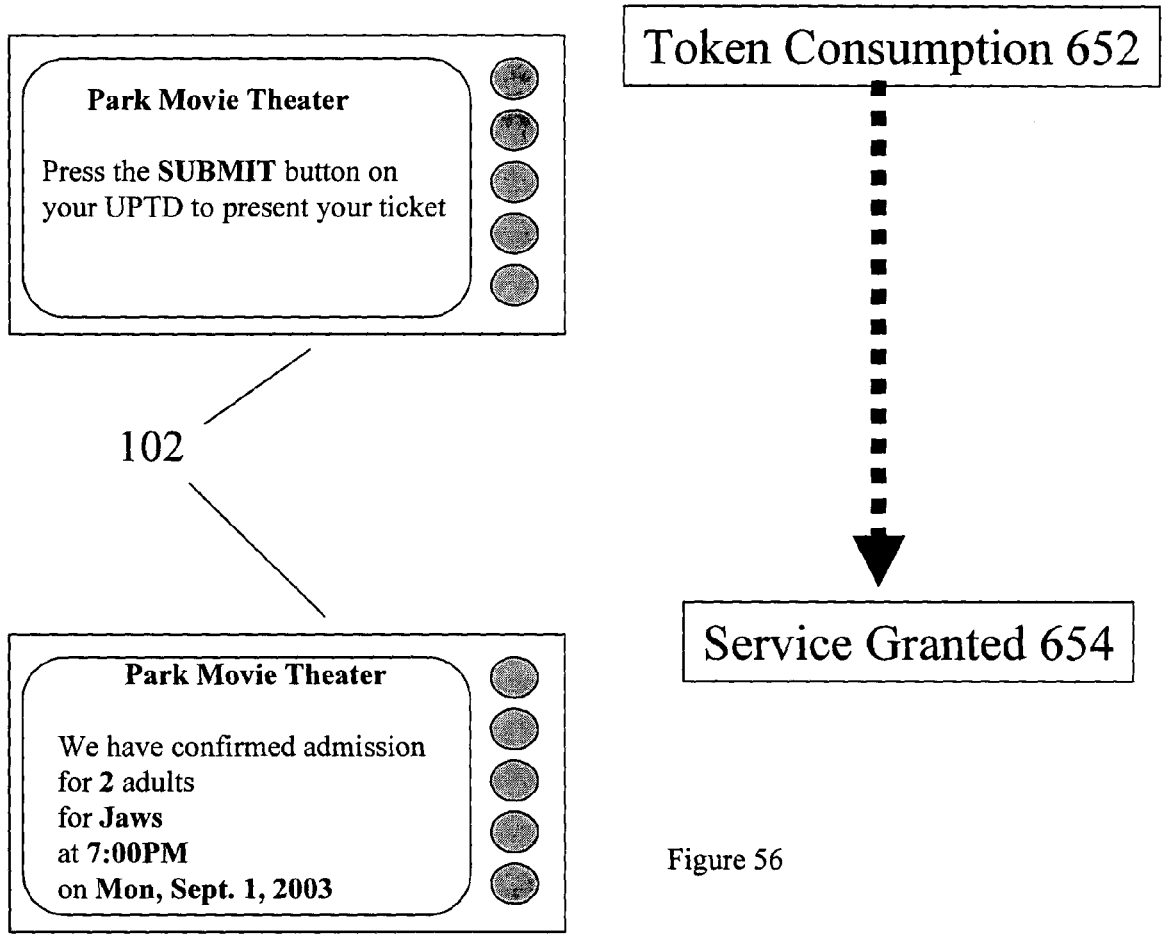

FIGS. 55 and 56 show example UPTD 102 displays for a service purchase 638, 650 (as in FIG. 9); token creation is not observable by the consumer. The purchasing scenario is one of buying tickets for a movie and using them to enter a movie theater.

Referring now to FIG. 55, the UPTD 102 executes purchase order acquisition 640, then a REQuest 643, and an AUTHorization 644.

Referring now to FIG. 56, which shows an example 650 of token verification and consumption in a service purchase, the UPTD 102 executes token consumption 652 and Service Granted 654.

Acquiring the Device 102

The user would acquire the special purpose device 102 in much the same way that a user currently obtains a credit card: it was offered to him/her by a merchant, a financial institution such as a bank, VISA, AMEX, etc. It is also possible that the user might purchase the device 102; in such a case, the device 102 cost will be heavily subsidized, as is the case with mobile phones, by parties who stand to benefit from the ubiquitous availability of the device 102.

If a PDA or a mobile phone is used as a UPTD 102, the consumer will either download and install the purchasing application or this application might be pre-installed prior to acquisition of the PDA or mobile phone.

The user will typically carry the device 102 in her person.

After acquiring the device, the consumer has to enable the device for purchases. For that purpose, three relations must be defined. These are:

Register device 102 with the Secure Transaction Server
Identify authorized user of the device 102
Identify credit cards and bank accounts that can be charged from the device 102
Issue PIN to the user For that purpose after downloading the software on the device (not necessary if the software is pre-installed) the owner of the device will have to register the device with the entity operating the STS. The software of the device will supply the user with the DID of the device. The user will (over the phone or through the web) supply the DID to the operator of the STS and register at least one financial account for making payments through the device, with the operator of the STS. Upon successful execution of these steps the device user will be issued a PIN (or receive the PIN by mail) to use for performing purchasing transaction with the device. At the beginning of this process the device is not associated with any financial accounts, so even if a party different that the owner of the device attempts to register the device and associated it with financial account they will only be able to do so in as much as they submit information about accounts that they own.

The process will be facilitated if the user has already established an online payment service account, such as a PAYPAL (paypal.com) account, C2IT (c2it.com, from Citibank), or another. Generally speaking, online payment services act as clearinghouses for moving payments between different accounts (bank accounts and credit cards). Usually the identifier of a real person is already in an electronic form, such as an e-mail address. A user of such a service sets up an account and associates credit cards and bank accounts with the e-mail address of the user. The user has to verify that she can access these accounts. Payments using a PAYPAL account can be charged against either a credit card or a bank account. Also, credit card or bank account payments can be received by the user and debits or credits can be withdrawn from or deposited to the user's chosen bank account. Additional credit cards and bank accounts can be added or deleted by the user through well established procedures of the online system.

The PIN need not be stored on the device 102 permanently. It suffices that the STS 106 knows it. The PIN will be used in order to authorize transactions from this device 102 (similar to a credit card PIN). In general, operating the device 102 requires authentication for two purposes: operating the device 102 (turning it on, viewing records, browsing service spots and services), and authorizing transactions. Each of these two types of authentication could be performed with either a PIN or some biometric method. Which method to be used for each authentication will be decided by individual UPTD 102 manufacturers. For the purposes of this document, one assumption is that a biometric method is used to authenticate the operator of the device 102 and that a PIN is used to authorize transactions from the device 102.

If the device 102 was issued by a bank, his association will not be necessary because the bank will have established it prior to device 102 issuance. The combination of DID, PIN or biometric (operator and operation authentication feature) and user account identity all need to be valid for a transaction to be successfully completed.

Resetting the device 102 should erase the association with operation authentication feature and the associated account identity along with all the stored (if any) usage data. Thus if the device 102 is to be reset, it would have to be re-initialized. Similarly, if the device 102 is lost or stolen, it cannot be used without the biometric security feature; even if the biometric feature is successfully circumvented, no transaction authorization will be possible without the proper PIN. The only option is to reset the device 102, which would require its re-initialization. Of course this does not prevent theft of the device 102 but in order for the device 102 to be used again a new real-world identity would have to be associated with it. Since the UDID remains the same, the future user of the device 102 could be easily identified. Of course, since the STS 106 expects the UDID of the device 102 to be associated with the rightful owner of the device 102, a reset device 102 can not be used without proper action by the STS 106.

Using the Device 102

After initialization, the device 102 is ready for use. It is expected that due to its form factor, the user keeps the credit card-sized device 102 in her wallet. As mentioned, one assumption is that of a single unique user per device 102. As the user approaches an "enabled" area, she might choose to turn the device 102 on. An "enabled area" is a specific location where a service is offered through wireless communication.

An "enabled area" is referred to as a "service spot". Examples of service spots include: movie theaters, parking lots, airport ticket counters, toll booths, mall stores, restaurants, etc. After turning the device 102 on, while within a service spot, a user sees a listing of available offered services. The user then selects a service to interact with. The typical service involves the purchase of goods and services, either of which is referred to as "virtual goods" (toll tokens, movie tickets, etc.), or physical goods, such as clothing, books, etc. The user's interaction with the service is expected to be similar to browsing. If at some point the user decides to make a purchase, for example to purchase a movie ticket, the user selects and confirms the transaction by selecting the purchase button and entering (to the device 102) her PIN (and/or biometric if available). Upon completion of the transaction, the user will receive a confirmation of the successful execution of the transaction on her device 102. Such confirmations may be stored locally on the device 102 for the user's convenience. No actual account numbers are stored on the device 102; only aliases for the accounts are stored on the device 102.

Access to such records will require user authentication by the device 102, as is the case for any usage of the device 102. As an additional security measure the device 102 will shut itself off after a set period of inactivity and user authentication will be required to re-activate it.

Typically the service spot has a live connection to the Internet and specifically to the Secure Transaction Server, or STS 106, in order to complete the transaction (user is notified accordingly if connectivity exists 106 or not). It is also possible for the merchant to choose to assume the risk of engaging in a transaction for which a confirmation is unavailable by maintaining an intermittent network connection (similar to what merchants often do with credit card processing). As an additional deterrent for use of the device 102 with insufficient funds, a typical online account includes credit cards that can be charged against transactions for which funds are not available in the user's primary online sub-account (typically a bank account). Finally, if the service spot has a live connection, the merchant may choose to offer an additional service, namely real-time access to a user's online account, so that the user can check balances and past transactions upon (or before) transaction confirmation (similar to checking the status of a PAYPAL account when connecting through a PC).

The user can disable the device from being used for purchasing following a process similar to registration. Upon supplying the DID, the issued PIN for the device and the account and password info for the Online Payment Service account associated with the device (or those of other financial accounts) they can choose to permanently or temporarily disable the device from being used for purchases using the associated financial accounts. Re-enabling the device will require a registration process.

Merchant Experience

For the merchant that is offering a service spot, the following dimensions of setting up and maintaining a service spot are examined. The merchant has to set up a service spot, which includes the following actions:

Set up wireless access points (APs) that provide coverage for the area where the service is offered. One assumption is that a service is offered at the service spot where the physical merchant is. In other words, if a movie theater is selling movie tickets, then the theater's service spot covers the area surrounding the movie theater. However, there is nothing preventing the proprietor (or an agent) of the movie theater to offer the service at another service spot, for example the enabled area of downtown Baltimore. There are many business reasons for doing this, for example cross-selling of goods and services (while in a parking garage in downtown Baltimore, reduced parking fee is offered if the driver purchases tickets to the nearby theater). Typically a merchant will pay a fee for such usage of another merchant's service spot (one analogy is to think of service spot hosting as web hosting, or similar to say YAHOO stores).

Provide internet connectivity for the service spot network (preferably continuous)

Become a UPTD 102-service merchant, which is a process similar to becoming a credit card approved merchant in order to accept and process credit card transactions.

Install and customize the service software on a Merchant Server (MS) that resides locally with the merchant. The MS can also be located on a remote server Establish an association and communication with the Secure Transaction Server (STS 106) and register and initialize the merchant services with the STS 106

Publish the services that will be available through the service spot (a process similar to setting up a virtual store on the web)

Optionally offer charging stations, so that if the user device 102 power is low a customer can use the station to conduct a transaction.

The entire process is similar to the process of becoming a credit card merchant and deploying a Point of Sale (POS). For merchants that already have a POS the primary issue is the integration of the service spot infrastructure with the existing POS infrastructure.

One expectation is that larger merchants will typically seek the services of integrators in a way similar to deploying a POS today; after all, the service spot is an additional component in today's often complex POS systems. Smaller merchants have the option of deploying a service spot which serves as the entire POS by outsourcing all the POS processing to an application that resides behind the STS 106. For merchants with simple enough needs and requirements, a "do it yourself model" may be implemented where merchants publish services to their service spots by accessing a web service that can upload updates to their terminal, or by publishing them locally through a scaled-down laptop-like device 102 that connects to the MS.

Given the non-negligible overhead, it is expected that the first wave of merchant users would be national chains with multiple retail outlets. As illustrated later, there are significant advantages to adoption for such merchants.

Applications and Application Categories

Examples of applications that are enabled by the ubiquitous availability of the described devices 102 and services of the UPTF of the present invention are now discussed.

Broadly speaking, the device 102 can be used to make purchases of goods and services, either "virtual" ones, such as a ticket or paying for tolls, or physical ones, such as clothing, magazines, meals, etc. The user experience for each case is now discussed.

Purchasing "Virtual" Goods

Consider the case of purchasing a movie ticket. An assumption is that the service is offered at the service spot where the good can be "consumed", which can be extrapolated to the more general case (that is, the good being offered at a location different than the location where the good is consumed).

A user approaches a virtual counter (service spot) of the movie theater, activates the device 102, browses through the available shows, selects a show and show time to purchase a ticket for and purchases the ticket. Upon confirmation of the transaction the user can continue as if physically receiving the ticket. When the user enters the movie theater turnstile (where usually the usher is picking up the tickets), the ticket is "delivered" from the user transaction device 102 to the "usher-replacement" merchant transaction server AP.

There are a variety of schemes that can be used to simulate the process of "receiving" and then "giving back" a ticket: the user transmits a transaction code that is matched by the merchant transaction server, or location determination technology is used to confirm that the user moved beyond a control point.

The same method can be used for buying tickets or checking in at airports. Due to identity authentication issues it is easier to imagine the process for already reserved tickets (similar to electronic check-in).

Another application is paying for sit-down restaurant meals. The diner can request the check, which is delivered to his/her transaction device 102. After inspection of the details, the user can add a tip and authorize the payment. Varying status information can be put on the merchant server to make it difficult for deadbeats to escape. The benefits include no waiting in lines to pay or for the waitress to bring the bill, then wander around with one's credit card, then return the check and credit card receipt, then have the user sign the receipt, then again wait for the waitress to return and tear off the receipt or leave the credit card information lying on the table until the waitress picks it up.

A variation of this application is that of paying for tolls. The user experience is essentially similar to using systems like EAZY-PASS today, with the additional advantage that it can be used nationwide, unlike today's systems that are not interoperable. The user is driving and while approaching a toll area he/she activates the device 102. The toll service appears on the device 102 and the user authorizes payment for the toll fee. The transaction is automatically completed when the driver drives through the toll and exits the toll area (from the other end). In such a case some form of customer location information identification is also necessary. This method enables toll services that are based on distance driven, using mere AP's as opposed to manned stations and controlled exits. Since it is unsafe and perhaps impractical for a driver to operate such a device 102 while driving, the driver might select to enable the device 102 to automatically accept and complete toll transactions. This is called a continuous (or process) transaction in that authorization persists through multiple, possibly dependent transactions and involves some additional security constraints to be determined.

Purchasing Physical Goods

A consumer can use the card to buy "physical goods", such as a book or clothing from a "brick or mortar" establishment. The consumer can go through the process of either a self-checkout or a checkout similar to a credit card checkout but without requiring the user to give the credit card for swiping and then sign. The user experience will be similar to what was previously described. A device 102 for reading bar codes or entering prices is still also required. The system needs to be able to manage multiple users' shopping carts and associate each one of them with the appropriate device 102. In the case of physical goods, the user device 102 needs to be physically associated with the checkout of the goods "belonging" to the operator of the device 102. This can be done with a separate barcode or RF ID on the UPTD 102, or in some cases using location determination technology.

The following is a variation of physical goods purchase where users can order items for pick-up that are then provided by employees, as in a carry-out restaurant. In any store where users queue for service, such as a coffee shop or fast food restaurant, a method for users to place their orders and payments without a cashiers assistance is enabled with the UPTD 102. A user enters the establishment and immediately uses the UPTD 102 to place the order through a menu service, for example a large cappuccino, providing the user's preferred name (symbolic ID). The order transaction is accepted by the coffee shop service and indicates acceptance to the user and possibly the estimated wait time. The user authorizes payment and the coffee is given to the user when ready. Combining the above with location determination, will ensure that the order is delivered to the right table. This eliminates the necessity of the user waiting in line just to place the order. It also saves labor for an employee to take the order and accept payment, plus allows customer orders to be taken concurrently. Similar advantages occur at fast food restaurants.

Payment of Bills or Fines

A variation of the "virtual goods" and "physical goods" purchasing modes applies to cases where a user's identity is required for the payment amount to be decided. Such is the case, for example, of paying a fine at an MVA location. In order for the user to be presented (on her device 102) with the correct amount for her fine(s), the overall system needs to identify the identity of the user operating a particular device 102, associate that identity with the system-stored identity and then present to that user's device 102 (and only to that device 102) the relevant charges. The identifier used (e.g., SSN, or driver's license number) might vary from service spot to service spot, but the general method would operate as follows: since a user's identity information is not stored on the device 102 but only a proxy for that identity (in the form of the e-mail account or username required to access the online payment service), the device 102 would transmit that proxy identity to the service spot which in turn would query STS 106 (perhaps for a fee) for the necessary identifier (e.g., driver's license). One assumption is that this kind of information would be stored at the STS 106, as an element of the consumer's profile.

Other Example Applications

Applications include all the services of purchasing goods as described in the previous two sections. Some specific cases and variations of particular interest are discussed.

The UPTF framework makes it possible to offer merchant-sponsored real-time auctions for purchasing of goods and services.

Another application is that of offering hosted POS (point-of-sale) for merchants. Such a service could be deployed in order to jumpstart the usage of devices 102 by outsourcing the processing of such transactions for the merchants, in parallel with other paying mechanisms. A merchant could have only the wireless AP terminal/register, an Internet connection and no other in-store infrastructure and be able to accept payments from UPTD 102s. The software package could include accounting, inventory, and other business applications.

Stores can offer the user transaction device 102 to customers, for them to use during their shopping experience. Such devices 102 could be used by anyone, but would need to be initialized (PIN and/or biometric and online payment account). Of course, it will be more suited for customers that already have an online payment account or even a device 102 that they happen to have left some place else. This would introduce the device 102 to new consumers ("take it home for a drive").

The device 102 can also be used as an intermediary for different online payment systems. Similarly, an alternative business model would be to bypass the online payment system, so that the UPTF becomes its "own" online payment system and clearinghouse for executing the transactions within the banking system network.

Another application is that of UPS or FEDEX drop-off boxes that can accept payments from the device 102, as opposed to the current mechanism of either maintaining an account or using a credit card and filling up the necessary information on the packing slip. The drop-off box could include a screen for user entry of the destination zip code so that the exact charge can be decided (otherwise the user consents to the appropriate charge to be charged to her account whenever this charge is assessed, which is the currently used scheme). Also the zip codes and priorities of deposited packages can be conveyed in real-time to the carrier's system in order to optimize pick-up routes or to incorporate the information in the planning system.

Also, another variation of the carry-out service would be to use the device 102 as a "take a ticket" service for service where customers keep track of their place in a line (queue) using "first come, first serve" tickets. This could be coupled with a notification service that informs users of estimated waiting time and a notice when their time for service is up. Such a system could be used in theme parks to avoid waiting in lines and even coupled with a location-aware service that estimates travel time to the location that the service is offered.

Additional services can be offered on-the-fly in existing service spots, for example, a fund-raising effort in a crowded space, such as seeking donations to charity in a public area or a crowded movie theater prior to beginning of the feature film.

The device 102 can be used as a secure e-commerce terminal by simply connecting it to a computer (USB, PCMCIA, etc.) or simply to a gateway which will also provide the network connectivity. The device 102 can then either be used as in the wireless case, or as an identification card. In either case, it provides a viable solution to the huge problem of credit card fraud on the internet which primarily victimizes the merchants (who have to absorb the cost of fraud). In that case the business model is transaction based, as the merchant receives the benefit of a much reduced risk of a fraudulent transaction. Merchants who do business on the internet are currently charged significantly more per transaction due to the much higher fraud risk.

User Benefits

Benefits for end users are now discussed. A purpose and benefit of carrying and using the device 102 is that it facilitates conducting financial transactions. This benefit is more evident when purchasing goods or services where no exchange of physical goods is necessary (such as a toll token, or ticket). Combining location-specific identification of the device 102, the user can achieve a faster transaction cycle and automated checkout. It is easy to select between accounts and balances/status are instantly available at any time. Additionally, the device 102 is non-intrusive for the user, since the user can choose when to use it. The system permits a true paperless transaction. Another benefit of the device 102 is that it can be used for small transactions where typically a credit card transaction would be infeasible. Overall the user could use the card as a replacement for the need to carry cash or any other card and eventually the wallet.

Merchant Benefits

A benefit for the merchant is that the entire transaction cycle is much faster and thus a cheaper alternative to current means, because fewer people are needed to satisfy the transaction processing needs of the merchant. An added benefit for the merchant is that this way they can reach more users especially during busy times through concurrent automated processing of sales transactions. It is no longer a one-to-one relationship between cashier and customer. The load of a typical store is pretty irregular, with higher volumes occurring on weekends and at the end of the workday. Crowded checkouts deter potential buyers especially since more affluent buyers (higher spend per person) are more sensitive to time and are discouraged by longer waiting lines. The system permits a true paperless transaction. In some case the merchant will be able to maintain a cashier-less store, or to incorporate self-checkout capabilities thus further reducing the load during busy times. Certain other merchants will also benefit from the ability to conduct quick small cash transactions.

Another class of beneficiaries includes financial institutions (for example, credit cards like MasterCard and VISA. For them, an advantage of such a device 102 is that it is more secure than current credit cards. Credit card fraud plus the cost of lost credit cards (the consumer typically does not pay for transactions occurring after the loss of a credit card) is a huge amount for these institutions and in fact they have been experimenting with smart cards as a replacement for existing credit cards. The UPTD 102 significantly improves the secure use of credit cards and will result in lower credit fraud costs.

Fraud accounts for 0.08 to 0.09% of all credit card transactions in the offline world (fraud accounts for 0.25% of credit card transactions over the internet. Given the total value of credit card transactions (close to $3T), fraudulent transactions amount to $2.4B annually.

The UPTD 102 can reduce fraudulent use of a card when in proximity to the store or if it is used when attached to a computer accessing the network, for typical e-commerce transactions.

The UPTD 102 device 102 and associated methods and infrastructure of the present invention provide a device 102 that can be used by, and carried by, everyone, does not require familiarity with computers and their workings and processwise it is a portable identity medium that can be used to authorize and execute transactions. In fact, financial, or financial task-related transactions are the only "universe" that the user is exposed to. Ease-of-use, ubiquitous presence and speed are the main features of the type of e-commerce provided by the UPTF of the present invention—that is, pervasive commerce.

Features of the present invention include:

The device 102 introduces convenience for both consumers and participating merchants. Consumers need only carry a single device 102 and be able to use any account for a purchase, all while they can check-out faster, often without the need of interacting with a person, or, in some cases, check-out without cashier assistance. Merchant benefits include achieving faster transaction cycles, reducing the cost of running check-out stations and lowering the risk of credit fraud, whose cost they are eventually accountable for.

The discussed business models associated with the commercialization of the device 102 focus on collecting fees per transaction, while acting as an intermediary to the transaction cycle. The justification of the fee is the tangible benefit for the participants to the transaction: convenience and efficiency for consumers and savings and efficiency for merchants. Another class of revenue streams is associated with hosted value-add services, such as real-time offers and incentives to customers that are about to make payments and cashier-less stores for merchants.

Summary

In summary, the present invention enables consumer to purchase (order and pay), wirelessly, and from a distance, at physical Points of Sale (physical stores), for goods and services, using any of their financial accounts and it enables them to do so securely, quickly, using a PDA, a mobile phone or a custom device with limited hardware, all while the device stores no user and account information. Security relies only on a 4 digit PIN that is not stored on the device. The device can be disabled from purchasing very easily by the user himself. The process of enabling a device for such purchasing and further managing the device for such purchases poses minimal management requirements to the user.

The Secure Pervasive Transaction Protocol

The Secure Pervasive Transaction Protocol is disclosed in SECURITY FRAMEWORK AND PROTOCOL FOR UNIVERSAL PERVASIVE TRANSACTIONS, U.S. Ser. No. 10/458,205, by Yannis Labrou, Lusheng Ji, and Jonathan Agre, filed Jun. 11, 2003 in the U.S. Patent and Trademark Office, the contents of which are incorporated herein by reference. A description of the Secure Pervasive Transaction Protocol is now presented, after a brief description of other security algorithms.

Symmetric cryptographic schemes (or algorithms), in which encryption and decryption use the same key, are well known in the art and have several desirable characteristics such as ease of key management and lower computational requirements as compared to asymmetric cryptographic schemes.

Many current security mechanisms employ asymmetric cryptographic schemes, such as the public key systems with their associated Public Key Infrastructure (PKI) systems and are known in the art. However, the PKI (Public Key Infrastructure) system of the related art includes specific costs associated with creating and maintaining this infrastructure. Examples of these costs include key distribution, management and storage.

The asymmetric encryption/decryption algorithms used by the PKI systems involve relatively complex and time-consuming computations. Hence they are not well suited for economical and compact mobile computing devices on which only limited computing resources and battery power are available.

Symmetric algorithms consume substantially less computing power than asymmetric encryptions and decryptions. Communicating parties in symmetric cryptographic systems typically share the same key, which is then used by them as a parameter to encrypt and decrypt the message data.

The part of the Secure (or Security) Agreement Submission (SAS) protocol (also referred to as the Secure Pervasive Transaction Protocol (STP) relating to the present invention discussed herein above is now discussed with reference to FIGS. 57-63.

The SAS protocol relates to a method of a third party (verification party) verifying an agreement between two distrusting parties (agreement parties) in an insecure communication environment. The SAS protocol extends to a multi-party agreement method, where a verification party verifying an agreement among multiple (more than two) distrusting agreement parties in an insecure communication environment.

The SAS protocol is a computationally lightweight protocol carrying agreement data and other sensitive messages between distrusting agreement parties and a verification party in an insecure communication environment so that the agreement data is protected during the transmission and the agreement data can be shown to be consistent. The protocol of the present invention satisfies security properties such as privacy, authentication, user anonymity, non-replayability and non-repudiation.

The Secure Agreement Submission (SAS) protocol that is designed for use in unreliable communication environments, such as wireless networks. The SAS enables multiple parties to an agreement to submit the agreement information to an independent verification party in a secure fashion over these unreliable communication channels. In addition, the SAS provides a mechanism and procedures comparing and verifying the agreement information and notifying the participants of the results, also in a secure fashion. As is disclosed herein below, the SAS protocol is ideally suited for many types of transactions such as purchasing goods, wireless voting, virtual token collection and many others.

The SAS includes a cryptographic scheme based on a family of symmetric cryptography algorithms, in which encryption and decryption use the same shared key. The SAS includes a novel key derivation and generation scheme that can be used with many symmetric cryptographic schemes and results in several new, desirable properties for the protocol, such as a high degree of security in a non-secure communication environment (such as a wireless channel), low computational complexity and no need for a user to store or transmit keys, or other personal identification data pertaining to the attempted agreement, such as username, account data, etc.

The key generation scheme of the SAS uses a mobile computing device capable of communication. The mobile computing device executes the protocol and accepts input from a user. Such devices can be special purpose devices or readily available computing platforms such as Personal Digital Assistants or programmable cellular or mobile telephones.

The key derivation algorithm combines information about the mobile computing device with information about the user of the device. The algorithm also combines information that is stored digitally by the device and the shared secret information that is input by the user. Such a combination ensures with high likelihood that only the intended parties are able to decrypt and thus access the communicated data. If a device is lost or stolen, it can not be used without the specific user input information, which itself is not stored on the device. The deterministic key derivation algorithm may be generally known. The set of stored parameters is preferably known only to the device and the verification party, but if generally known are not sufficient to determine the key, without knowledge of the shared secret value. The secret value, or the stored parameters, or the key are never transmitted in a message. What is transmitted is a message parts of which are encrypted with a key that is derived from the stored parameters and the shared secret information that is input by the user.

An agreement, with respect to an application, is a general statement between parties for which a verification procedure can be executed to provide confirmation that the parties have a common understanding of the statement, within the context of that application. For example, a financial transaction agreement could be that "Party A will pay Party B $X for item Y." An agreement statement is represented by agreement data, the contents of which are not defined by the invention but by the needs of the application.

The protocol is referred to as the Security Agreement Submission (SAS) protocol, to accomplish the agreement verification. An aspect is an SAS encryption (SASE) mechanism that provides many security properties in an insecure communication environment. The SASE is used to encrypt and decrypt all messages that are part of the SAS. The SASE mechanism is implemented by each of the agreement parties and the verification party.

The SAS achieves the following desirable security properties:

Authentication of agreement parties: The identities of the involved agreement parties can be determined to be who they claim they are, to a high degree of likelihood by the verification party, based on the fact that a SASE coded message sent by an agreement party can be decrypted and understood by the verification party, using a decryption method with a key that is specific to the sender and only known to the verification party and the specific agreement party.

Authentication of verification party: The identity of the verification party can be determined to be who it claims it is, to a high degree of likelihood by each individual agreement party, based on the fact that a SASE coded message sent by the verification party for a particular agreement party can be decrypted and understood only by that agreement party using a decryption method with a key specific to the agreement party and only known to the agreement party and the verification party;

Anonymity: The agreement parties may remain anonymous to each other, if desired in an application through the use of the SASE method.

Privacy of Agreement: The agreement data sent between the agreement parties and the verification party is protected by SASE so that, if intercepted, no party other than the intended receiver is able to decrypt and read the data. Similarly, response messages from the verification party to the agreement parties are protected.

Tamper-resistance: The agreement data sent between the agreement parties and the verification party is protected through the use of an encryption signature so that no party can alter the data sent by other parties without a high degree of detection.

Non-replayable: Agreement data sent between the agreement parties and the verification party (if intercepted) is protected by an encryption mechanism that incorporates the value of the time when the agreement transaction occurs, and such a timestamp is also included in each message and recorded by the verification party. Thus, no party can replay the agreement data to forge a new agreement because each key is associated with a specific timestamp which is recorded by the verification party in a message log.

Non-repudiation: An agreement party can not later claim that they did not generate an agreement message that has been verified by the verification party except under certain specific conditions that are highly unlikely. These security breeches include the case, where all the secret parameters (the device-specific stored parameters and the shared secret which is input by the user of the device) have been divulged or discovered and the mobile-computing device has been used without the consent of that agreement party. It is also possible for the verification party to generate a false agreement, but it would involve the collusion of the verification party and the other parties to the agreement, which is also highly unlikely. In addition, the verification party will keep records that record the sequence of SAS message exchanges involved in each transaction.

Agreement Group Authentication: The SAS ensures the integrity of the agreement party group (the group consisting of and only of the parties among which the agreement is conducted) so that no other party can pretend to be an agreement party or an agreement party can pretend not to be an agreement party. This is accomplished explicitly by a membership list and identity cross-referencing. It is also assumed that all participants in the agreement are a priori known to the verification party and able to be individually authenticated.

Agreement Verification: The agreement is verified to be consistent among the authenticated agreement parties through the use of redundant and cross-referencing information contained in the agreement data and the use of a verification procedure consisting of basic matching rules and specific matching rules that may depend on the application.

Computational Efficiency: The security mechanism of the SAS is based on private key (symmetric) cryptography that is more efficient than alternative methods.

Physical Security: The security mechanism can be implemented so that it is not necessary to store all of the necessary encryption information on the client mobile computing devices, thus making it easier to protect the secret information if the device is compromised. Specifically, the shared secret input by the user is not stored on the device. Also, when the device is used in a particular application context, user-identifying information is not stored on the device. For example, when the device is used for purchasing goods and service in physical retail stores, the name of the consumer, or the user's account information is not stored on the device.

Intrusion Detection: The security mechanism is centralized through the use of an independent verification party so that attempts to use the system by unauthorized users that rely on multiple access attempts are easily detected and handled accordingly.

With the above-mentioned aspects, the SAS is ideal for being used as a vessel to carry financial transaction data between distrusting parties in an insecure communication environment. It is also well-suited for a system using low-cost user devices, which have limited computing resources.

The SAS is now explained with reference to FIGS. 57-63.

Architecture

Figure 57:
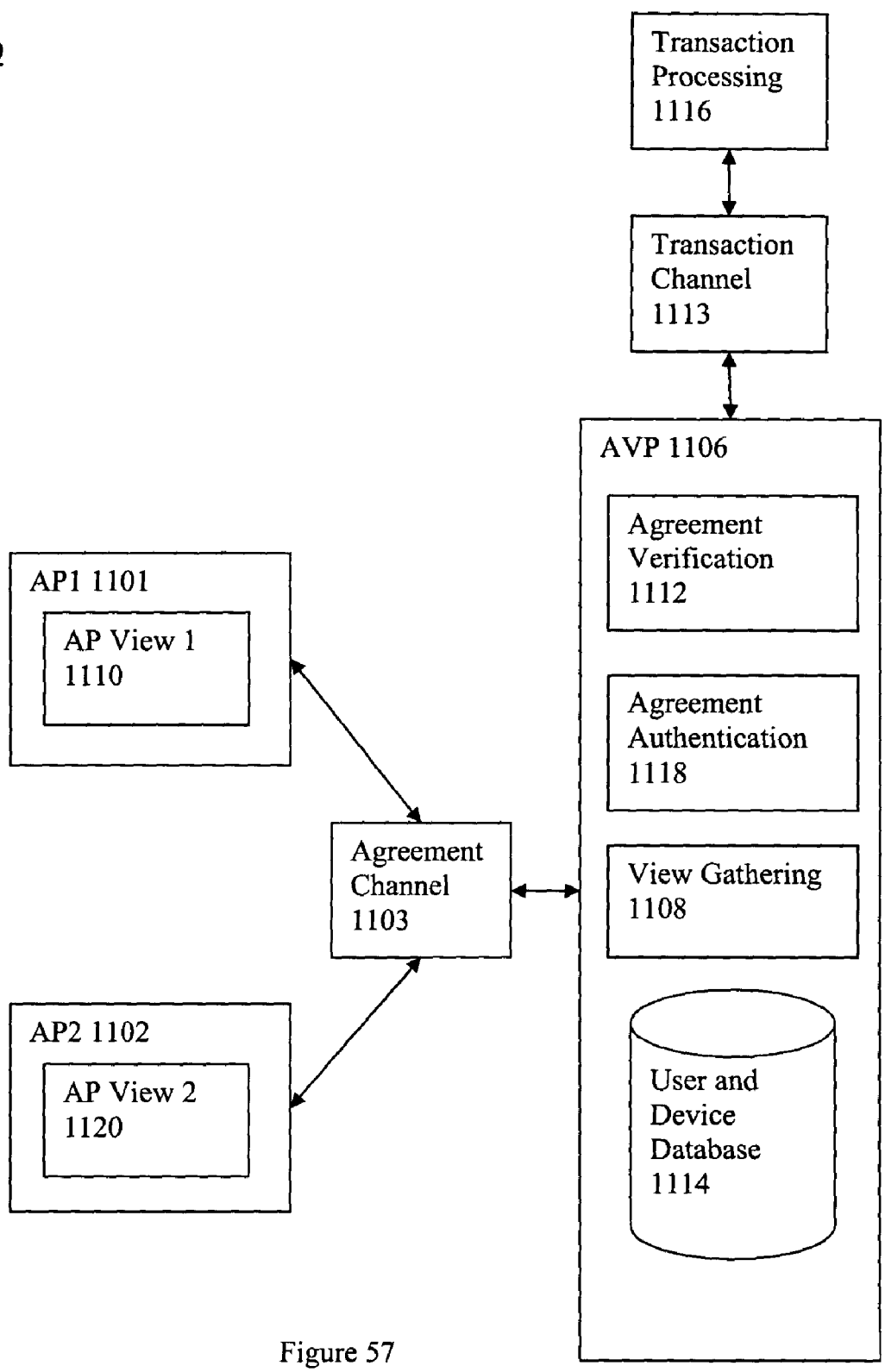
FIG. 57 is an example of a computer system in which the security agreement submission protocol (SAS) view is implemented.

The overall architecture of a system 1100 for agreement verification between two parties using the SAS is shown in FIG. 57. The system 1100 comprises two Agreement Parties, AP1 (1101) and AP2 (1102), an Agreement Communication Channel (1103), the Authentication and Verification Party AVP (1106), a Transaction Communication Channel (1113) and Transaction Processing Component (1116). The AVP 1106 itself comprises four components, the View Gathering Module (1108), the Agreement Authentication Module (1118), the Agreement Verification Module (1112), and the User and Device Database (1114).

Referring now to FIG. 57, AP1 1101 generates agreement information in the form of AP View 1 (1110) and AP2 1102 generates agreement information in the form of AP View 2 (1120). The Transaction Processing Component 1116 and its associated communication channel are included to further illustrate the application environment for the SAS. It is assumed that the Transaction Communication Channel 1113 is a reliable and secure channel.

The SAS assumes that the Agreement Channel 1103 is a reliable, although insecure, communication channel between the APs 1101, 1102 and the AVP 1106. All messages that are part of the SAS protocol are encrypted/decrypted using the SASE. In addition, the AVP 1106 is considered to be located in a secure facility, so that the sensitive information in the User and Device Database 1114 is sufficiently protected.

The SAS agreement verification process is described as the following six functions. More details of each function are provided in the later sections:

Function 1: Each Agreement Party (AP) 1101 or 1102 creates the AP View 1110 or 1120 including agreement data and additional parameters. Sensitive portions of the view 1110 or 1120 are encrypted using the SASE. The AP View 1110 or 1120 is digitally signed by the AP 1101 or 1102, respectively. An Agreement Message is created from the view 1110 or 1120 and then transmitted to the Authentication and Verification Party (AVP) 1106 using the Agreement Communication Channel 1103.

Function 2: The AVP 1106 receives the agreement messages from the APs 1101 or 1102 and delivers them to the View (or Agreement) Gathering Module 1108. The View Gathering Module 1108 determines that this is a two-party agreement and when it has received two agreement messages (one from each party) for this particular agreement. The messages are then passed to the Authentication Module 1118.

Function 3: The Authentication Module 1118 authenticates the agreement parties by using the SASE to decrypt the agreement messages, and determines that the signed agreement copies are indeed signed by the involved APs 1101 or 1102. This is done through the properties of the SASE scheme and using the information stored in the User and Device Database 114. If authenticated, then the decrypted messages are passed to the Agreement Verification Module 1112. If the authentication fails, then the results are sent to the Agreement Parties 1101 or 1102 as indicated in Function 6.

Function 4: The Agreement Verification Module 1112 executes a set of matching rules that check to determine whether the agreement data in each of the agreement messages 1110 and 1120 is consistent with each other. There are several matching rules that are always applied as well as an interface for application-specific rules. Together these matching rules are checked to verify that the agreement data included in all received copies of the agreement is consistent. Typically, in each agreement message there is reference to the other parties of the agreement and possibly a reference to a user identity that is not public information (for multiple users per device case). In addition, each application can provide a plug-in function to verify that the application specific contents of the agreement received from the agreement parties agree with each other. For example, in a financial transaction, there is an agreed upon amount that can be matched among the parties. If there is no associated transaction processing, then the system proceeds to Function 6. Otherwise, Function 5 is then executed.

Function 5: In many applications, once the agreement details have been verified, it is desirable to perform some services based on the contents of the agreement. In this case, the decrypted agreement data is passed to the Transaction Processing Component 1116 to execute these services using the Transaction Communications Channel 1113. The Transaction Processing Component 1116 will typically create response messages for each agreement party following the processing of the transaction. The response messages are communicated back to the Agreement Verification Module 1112 through the same channel.

Function 6: The Agreement Verification Module 1112 creates a Response Message for the Agreement Parties 1101 or 1102 that includes the results of the verification. If there is a response from a Transaction Processing Component 1116, then this is also incorporated into Response Messages. The Agreement Verification Module 1112 passes the response messages to the Agreement Authorization Module 1118 that uses the SASE to encrypt response messages for the Agreement Parties 1101 or 1102 and transmit the response messages to the agreement party 1101 or 1102 over the Agreement Communication Channel 1103.

The agreement method is summarized herein above. However, in order to operate such a system 1100 implementing the agreement method, there are several additional functions that occur. Prior to joining an agreement, any AP 1101, 1102 who wishes to use the verification service must be registered with the Authentication and Verification Party (AVP) 1106. The registration process results in a user account being created for the AP 1101 or 1102 at the AVP 1106 and necessary information stored in the User and Device Database 1114. A registered AP is hence known as an AP User of the system.

Registered APs 1101, 1102 are assumed to employ devices, called AP Devices or Client Devices. Each device is capable of carrying out the computations necessary for the verification procedure (including the encryption of outgoing messages and decryption of incoming messages intended for this particular device) and of reliably communicating with the AVP 1106 over the Agreement Communication Channel 1103. Each device is also registered at the AVP 1106, together with the key derivation parameters stored in the device (e.g., pseudorandom number generator and its seed, etc). In addition, the association between the AP users and their devices is also stored in the User and Device Database 1114 at the AVP 1106.

It is possible to allow the cases where each device may have multiple AP users associated with the device or each AP may be associated with multiple devices. Depending on the requirements the application, the multiple users per device may or may not be permitted. For instance, if a particular application issues one and only one device for each registered AP user, it is no longer be necessary for the AVP 1106 to distinguish the user from the device and the data items for each user may be stored together with the data items for the device issued to the user. During normal operations, the system 1100 may use the identifier of either as a reference to locate these data items. This results in more efficient processing than in the multiple user case.

The User and Device Database 1114 is also used to log and store the records of each agreement session by recording the SAS messages to and from the agreement parties 1101, 1102 and the AVP 1106. Each such agreement transcript can be accessed by the user, device or transaction IDs. This can be used to prevent replay of transactions by reusing a timestamp and to resolve potential claims regarding the verification procedure and the parties involved.

Security Protocol

The security protocol, termed the Secure Agreement Submission Protocol (SAS), is explained in more detail in this section. As part of the description the terms used in the protocol are defined.

Device ID (DID): A unique identifier for each AP (client) Device involved in the agreement generation, transmission, authentication, and verification. This ID is public in the sense that it may be included in messages as plain text, i.e., in non-encrypted form and that it is placed in the non-encrypted part of the message. It can also be used as the address of the device during communication. For instance, the physical address of the network interface (MAC address) of the device can be used for this purpose.

User ID (UID): A unique identifier for each registered AP entity involved in the agreement. That is, the human or entity using an issued AP client device involved in the agreement generation, transmission, authentication, and verification. This UID is used to identify the current user of an AP client device and there is a one-to-one mapping between the UID and an account opened at the AVP 1106. This piece of information is private in the sense that the UID must not be transmitted in plaintext during the protocol execution. Examples of a UID include a name, an e-mail address, a driver's license number, or some account id. The UID is only needed in case the client device has multiple users and is needed to identify the specific user (of many) of the device that is attempting the transaction. The UID may or may not be stored on the device depending on the security needs. If the device has only one registered user, the UID is unnecessary, thus allowing to not store any user-identifying information of the device at all.

Private Identification Entry (PIE): The shared secret input by the user. It is entered by the user whenever the user attempts a transaction. Preferably it is issued to the user following the registration of the user for the application that the client device is used for. It can also be selected by the user at such time. The PIE is an alphanumeric string. In order to speed up the user entry to make it easier for the user to remember it, the PIE can be a number such as 4-digit or 5-digit PIN. It is a piece of highly secure information in the sense that it is never transmitted during the protocol execution, it is only known to the user and the AVP 1106, and its secrecy should be well protected. It is assumed that the PIE can be input by the user on an AP device in a secure fashion or it may be deterministically generated using a biometric device such as a fingerprint sensor. For example, a computation applied on the fingerprint data received from the fingerprint sensor can be used to generate a PIE that is initially communicated to the AVP by the user. Whenever the user attempts a transaction, the user applies her finger to the fingerprint sensor, thus generating the PIE. The PIE is not kept in permanent storage on the AP device, but is used as an intermediate parameter required for the generation of the encryption key for a transaction and it should not be retained by the device for a period longer than the transaction execution time. If a particular implementation uses a form of PIE that is not convenient for a user to input for each agreement transaction and the device needs to store its user's PIN, the storage must be secure and tamper-resistant. The user's PIE is also stored in the User and Device Database at the AVP, which is considered to be a secure facility.

Device User ID (DUID): An identifier for each device to locally identify its users, if the application assigns multiple users to a single AP device. The mapping between the DUIDs of a particular device and the assigned users' UIDs is stored in the record of that device the User and Device Database at the AVP, as well as at the device itself. At the same time as a user inputs her PIE at an AP device, she shall also supply her DUID. The DUID is public in the sense that it may be transmitted as plaintext in messages. The DUID of the current user may be stored at the AP device during the execution of a transaction.

Digital Signature (DS): A digital signature associated with a message can be used to verify that a document has not been tampered with and that it was generated by the signer. For a given block of data, a message digest (MD) can be computed using a digest algorithm such as a Hash function. The resulting digest is then encrypted using the encryption key of the signer and the resulting encrypted block of bits is the signature. In order to verify a signature, the recipient decrypts the signature using the key of the sender. If the receiver generates a digest value from the received message which matches with the digest decrypted from the received signature, then the signature is accepted as valid and the received message is considered to be the original unaltered message.

Random Sequence Number (RSN): The RSN is a pseudo-random number that is generated from a locally stored pseudorandom sequence number function R (a pseudorandom number generator). Such RSN functions are well known in the art. Typically the generation of a pseudorandom number also involves another parameter, a seed S. The seed is used as the initial input parameter for the generator R to generate its first pseudorandom number output. From then on, the generator uses the output from the previous iteration as the input for generating the new pseudorandom number. In the SAS, the RSN number may be generated either by an AP device or the AVP. Each AP device has its own R and S, which are securely stored on the device and at the AVP. On the AVP, given the DID of an AP device by which a RSN is generated, a program can deterministically locate the same pseudorandom number generator function R and the corresponding pseudorandom number generation seed S for that device from the User and Device Database containing information about all issued devices.

Timestamp (TS): The time associated with a transaction. It can be generated from a reading from a per-device local clock or delivered to the device on a per transaction basis. For example, if the device is used in a purchasing application, the TS can be the TS of the purchase order that the merchant and the consumer will agree on. The TS should be an element of an increasing sequence of values with a known and generally long period between repetitions of values. It is used for two purposes: as an indicator of a device's local time and as a parameter to control the pseudorandom sequence number generator of the same device. In the former case, the TS is used to prevent message replay, as no two messages from a given source should have the same TS. In the later case, the TS is used to control the number of iterations of the generator R before the final output is used as the next pseudorandom number by the SASE.

Transaction: The complete execution of one agreement transmission, authentication, and verification. On an AP Device, a transaction begins when the device generates its view of the agreement and ends when a receipt from the AVP is received and understood. A specific application might include multiple such transactions in order to accomplish the goal of the application. For example, if the application is that of a consumer purchasing goods or services from a merchant, a first transaction might be that of acknowledging and pre-authorizing the purchase and a second transaction might be that of confirming and authorizing the purchase after the completion of the first transaction (when an adequate response is received from the AVP)

Transaction ID (TID): A unique identification number assigned to an agreement. The method of generating the TID is generally application specific and it can be generated by one of the agreement parties or a component of the AVP, such as the View Gathering Module. The Gathering Module will use the TID and an additional parameter, Number in Transaction (NIT), that specifies the number of parties in the agreement, to identify when it has received a complete set of views for an agreement. In a two-party agreement, the TID and NIT may not be required.

View: The processed agreement data by an AP device. A view of an agreement consists of an encrypted portion and an unencrypted portion. The encrypted portion includes reference information (the other party's Device ID, and optionally the User ID, a message digest MD, which can also be digitally signed) and the specific agreement data. The unencrypted or plaintext portion consists of reference information including Transaction ID, Number in Transaction, Time Stamp, Device ID and Device User ID.

Figure 58:
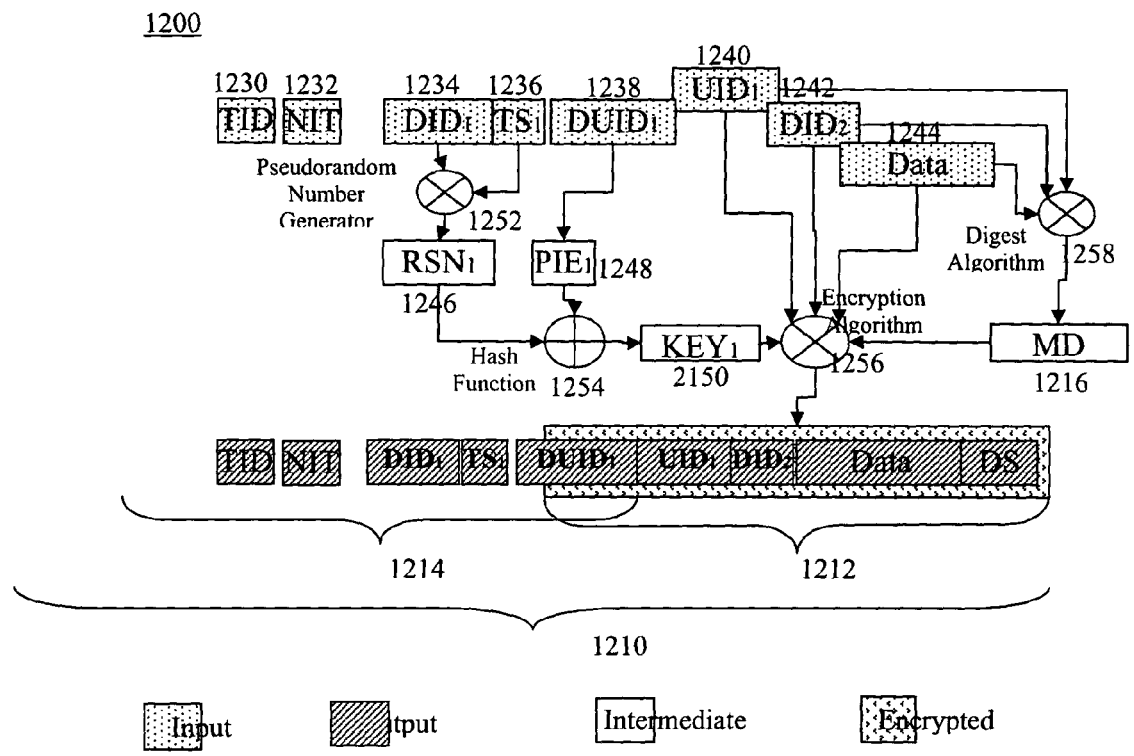
FIG. 58 shows a method of encrypting a security agreement submission protocol (SAS) view.

Agreement Data: The agreement data conveys the specific details that are agreed upon by the involved parties. For example, the amount that one party agrees to pay a second party is a agreement data. Agreement data may also contain information that is relevant to the agreement, but needs to be shielded from the other agreement parties. For example, the financial account with which one party agrees to pay the second party may be included in the agreement data, but this is not protected from the second party through encryption. The agreement verification module will be configured to determine that both parties agree on the amount and the participants, while protecting and delivering the other agreement data, such as the account information for the appropriate additional processing, such as by a Transaction Processing Component 116. The primary purpose of the SAS and the cryptographic algorithm is to protect the agreement data during transmission and to shield the other information from the other agreement parties, while providing the security properties of privacy, authentication, user anonymity, non-replayability and non-repudiation The method 1200 of encrypting an SAS view, referred to as the SASE, is illustrated in FIG. 58. The SAS view 1210 illustrated in FIG. 58 corresponds to an AP View 110, 1120 of FIG. 57. As shown in FIG. 58, an AP view 1210 includes a cipher text part (or encrypted part) 1212 and a plaintext part 1214. The plaintext part 1214 includes the TID, the NIT, the DID of the AP device generating the view, the local TS of that AP device, the DUID of the current user of the device, the TID and the number of parties in the agreement. The encrypted part 1212 includes four fields: the digital signature DS 1216, the agreement, the UID of the AP, and the DID of the other AP involved in the agreement. The DID of the other AP involved in the agreement is the minimum necessary reference field in order to provide the desired properties of the SAS protocol. The DS further increases the strength of the security by ensuring that no other party has tampered with or modified the contents of the view in any way. The TID and NIT are not necessary in a two-party agreement. The purpose of the TID and NIT is to associate views (messages) and responses to these messages and, alternatively, information that relates messages and responses to these messages can be provided as part of the agreement data itself in a way that depends on the particular application.

In the case that the AVP only allows one user to be associated with each device, the UID field may be omitted because the AVP can derive such a UID based on the DID. The UID of the other party involved in the agreement is not included in any view, so that the other AP involved in the agreement may remain anonymous. The DUID field is also not necessary in this case.

At first, the DID 1234 of the view generating device and the TS 1236 obtained from the device's local clock or provided as a part of the agreement data, are input to the device's pseudorandom number generator 1252 to generate a RSN 1246. In the SASE, the TS 1236 is used to control the number of iterations of the pseudorandom number generator 1252. Only the final result after these iterations is used as the output RSN 1246 for the SASE.

There are several variations in how the TS is employed to generate the RSN. One method of using the TS to control the number of inductions is to use the difference between the TS value (in number of minutes or seconds) and another mutually agreed base time value as the number of inductions. The generation of RSN is denoted as: $RSN=R(S, TS, T_0)$ where $T_0$ is the base time. The base value $T_0$ is stored both at the AP and the AVP which will store the base value in the User and Device Database in the record for the AP device and is specific to each AP device. The mutually agreed base time is advanced on both the AP device and the AVP in order to reduce the number of inductions to produce a SASE RSN, as long as the advancement of the base time on AP and AVP can be synchronized. If desired, as the base time advances, the seed may also be updated. For example, the new seed S' may be the $S'=R(S, T_0', T_0)$ where S is the original seed, $T_0$ is the original base time, and $T_0'$ is the new base time. The property of the SASE that needs to be maintained is that given a particular sender's pseudorandom sequence number generator R, its seed S, and the same TS value as used by the sender, the receiver can deterministically reproduce the same RSN as was generated by the sender A hash function H 1254 is then applied to the output of two-argument function F that when applied to the locally generated RSN 1246 and the PIE 1248 input by the AP user outputs a single argument (typically a string), in order to create the encryption key K 1250:

$K=H(F((PIE,RSN))$ or further expanded to: $K= H(F(PIE,R(S,TS,T_0)))$.

Such Hash functions are difficult to invert and are well known in the art. The function can by any known function, such as a function that appends the PIE string to the RSN string, or XOR's the PIE and the RSN, etc.

A message digest function 1258 is applied to the data, the UID of the AP user, and the DID of the other AP involved in the agreement to generate a message digest (MD) 1216 of the view. The message digest function 1258 can be a hash function that takes as input the plaintext of these three data items and produces a single number. Such hash functions for use in producing message digests are also well known in the prior art. For example, the hash function SH1 is often used for this purpose.

The encryption algorithm with the encryption key K 1250 is then applied to the message digest 1216, the agreement data 1244, the UID of the AP user 1240, and the DID of the other AP involved in the agreement 1242 to generate the cipher text part 1212 of the view. The DID 1234 and TS 1236 which were used to generate the encryption key are also included in the view as plaintext. The TID 1230 and NIT 1232 are also included in the plaintext part 1214 of the view. Thus, the agreement view 1110 from the first AP device is the following:

AP View 1={TID, NIT, $DID_1$, $TS_1$, $DUID_1$, Encryption [$K_1$: ($UID_1$, $DID_2$, data, $MD_1$)]}

The specific encryption algorithm employed by the system 1100 can be any of the known symmetric key-based encryption algorithms chosen to provide sufficient protection. However, the SAS includes the key generation process to be used with the chosen encryption algorithm.

As one embodiment of the SASE, the encryption algorithm 1256 is TripleDES, the Random Number Generator 1252 is a Mersenne Twister, the seed is a 32-bit number, the timestamp is a 64-bit number representing seconds, the PIE is four digits, and the Hash function 1254 is SHA1 and the function F that generates the input to the Hash function, is a function that appends the PIN to the RSN.

For further protection, the SAS protocol uses message padding in order to further prevent "known-text" attacks. In "known-text" attacks, an attacker who knows the plaintext of the agreement will attempt to reverse engineer the encryption key and eventually, with enough successful attacks, the other parameters used by the key derivation process. If successful, the attacker becomes capable of reproducing the encryption key for that particular view. Since the key changes over time (each timestamp is associated with a new key), this attack would reproduce the key for that particular timestamp only. Further transactions using the same timestamp are denied through comparison with the previous transaction timestamps stored at the AVP.

Figure 59:
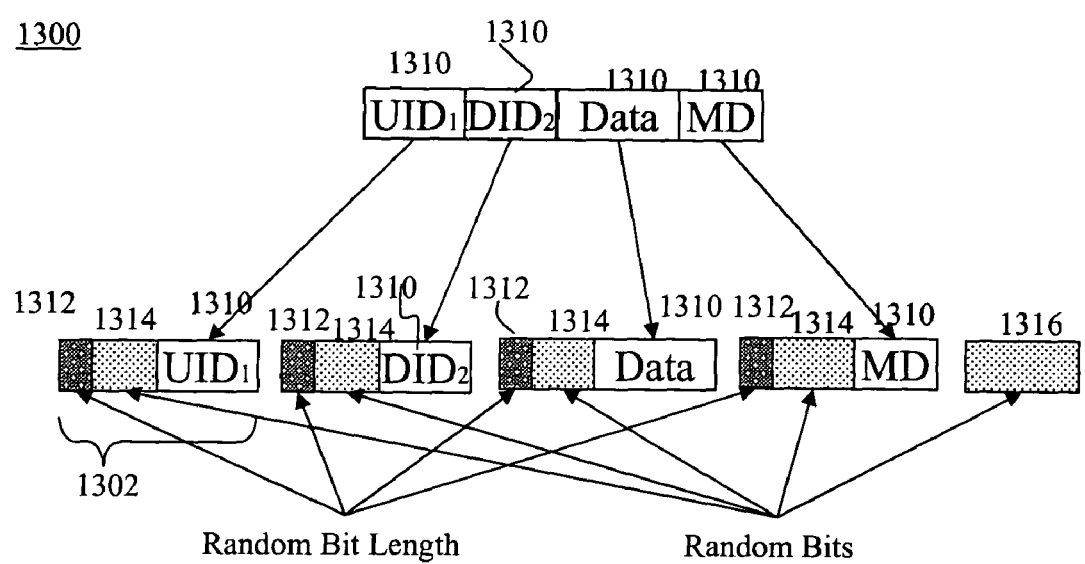
FIG. 59 shows a method of decrypting a security agreement submission protocol (SAS) view and how the cross reference fields are matched.

The padding scheme will insert random bits before and after the real fields so that an observer cannot determine where the real data begins, increasing the difficulty of "known text" attacks. The amount of padding is determined by the lengths of the overall message and the included data. In one embodiment of padding 1300, as illustrated in FIG. 59, a padded field 1302 starts with a field of fixed length 1312, which describes the number of random bits inserted before the actual encrypted fields. This field 1312 is followed by a string of random bits 1314 of the length specified by this field 1312, and then the real data field 1310. Random tailing bits 1316 are also appended after the end of all encrypted fields to further increase the difficulty for an attacker to extract the real cipher text part of a view. Since the total length of each field is known, it is not necessary to specify the length and offset of the tailing random bits 1316. If the length of each field is not known, field 1312 will be followed by an additional field that specifies the offset of the tailing random bits 1316. In another embodiment, random bits are inserted only before and after all fields. In this case although the difficulty for an attacker to determine the location of each data field is reduced the processing of each SASE message is also reduced. Padding is applied before encryption is applied during view construction.

This completes the description of the SASE mechanism for generation of a secure message by an AP. A similar procedure is defined in a later section for decryption of the message at the AVP.

View Gathering

At the AVP 1106, the Views 1110, 1120 belonging to the same agreement transaction but generated by different AP devices will first be gathered together by the View Gathering Module 1108 before any further authentication and verification processing. When all the views of an agreement are collected, they are given to the Agreement Authentication Module 1118.

The SAS permits agreement parties to be involved in multiple, simultaneous transactions with differing parties. In addition, multiple transactions from differing parties can also be simultaneously active at the AVP 1106. In general, the view gathering function decides which views belong to the same agreement transaction and at what point the gathering is completed so that all views belonging to the same agreement transaction can be forwarded to the authentication module 1118. A TID must be used to tag each view of an agreement so that the gatherer can match the views belonging to the same agreement and process them together.

The View Gathering Module 1108 uses the TID in each message to match the views. When the View Gathering Module 1108 has collected the proper number of distinct views, given by NIT, the View Gathering Module 1108 will forward the set of views to the Authentication Module 1118. The parameters TID and NIT are sent in plain text so that the View Gathering Module 1108 can operate on the views prior to authentication and decryption. This permits greater flexibility in that the View Gathering Module 1108 can be physically separated from the AVP 1106. In order to insure the integrity of the TID and NIT, the TID and NIT are repeated in the agreement data. For this purpose, the TID and a list of DIDs of the AP devices involved in the agreement are included in the encrypted portion.

In alternative implementations, the TID and NIT are only included in the encrypted portion of the message and must be decrypted and authenticated (by the Agreement Authentication Module) prior to handling by the View Gathering Module. In this case, the View Gathering Module holds the decrypted views until a complete set is obtained.

The View Gathering Module 1108 holds unmatched views of a Transaction for a maximum period of time, called the Transaction Time-out period. After this time has elapsed without collecting a complete set of views, the views are discarded and, optionally, the agreement parties are notified.

Decryption

The views 1110, 1120 are decrypted at the AVP 1106 by the Agreement Authentication Module (AAM) 1118.

Figure 60:
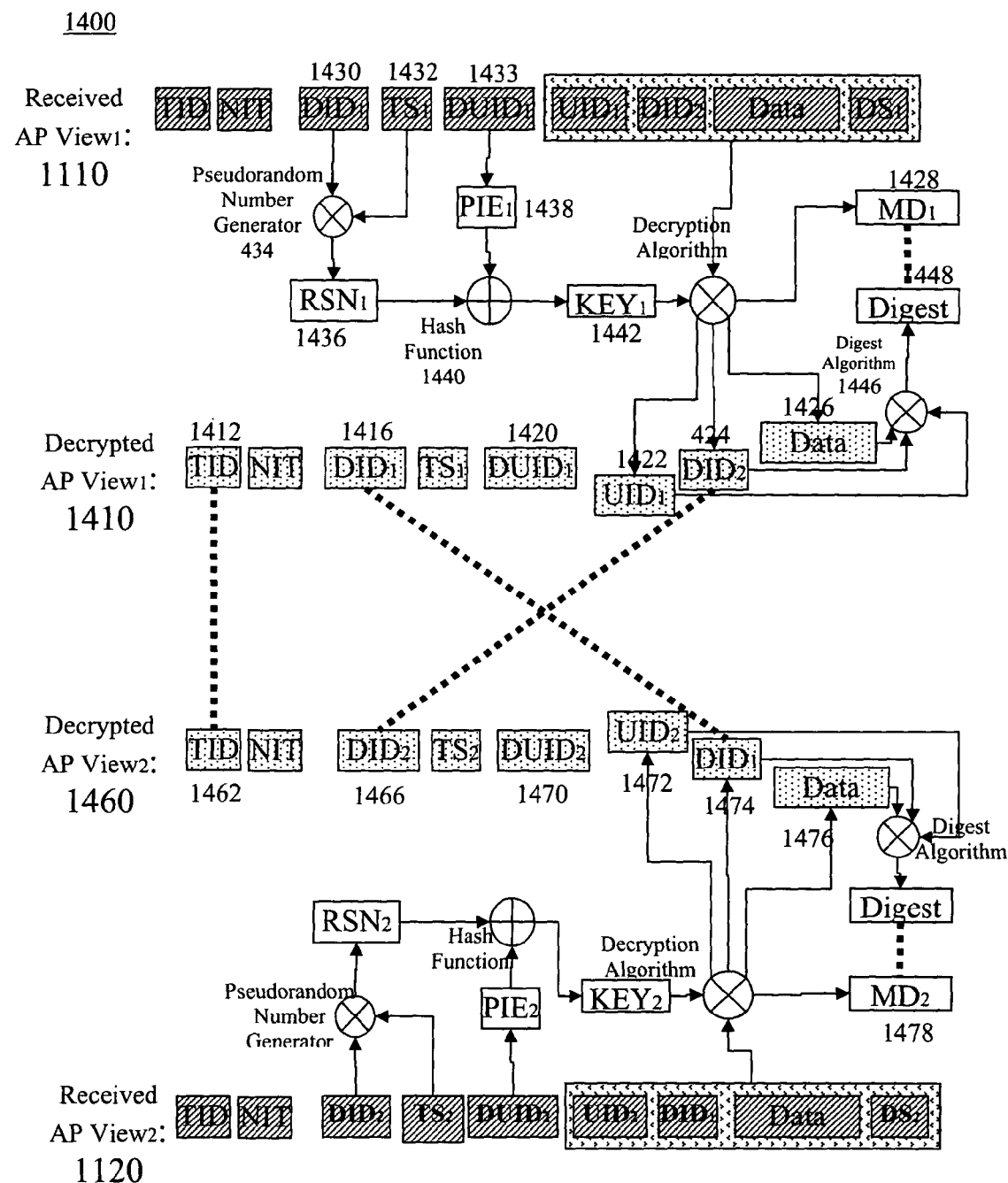
FIG. 60 is another example of a computer system in which the security agreement submission protocol (SAS) view is implemented.

FIG. 60 shows a detailed explanation of the procedure followed by the AAM 1118 and the Agreement Verification Module (AVM) 1112. More particularly, FIG. 60 shows a method 1400 of decryption of the above-mentioned AP View 1 1110 and AP View 2 1120, into decrypted AP View1 1410, which includes in plaintext TID, NIT, TS1, DID1, DUID1, and decrypted AP View2 1460, respectively which includes in plaintext TID, NIT, TS2, DID2, DUID2.

Initially, when the views 1110 or 1120 are received, it is useful for the AAM 1118 to check the validity of the TS of the views. This operation may prevent attacks conducted by changing an AP device clock or replaying an intercepted view. For this purpose, the AVP 1106 stores a clock offset value for each AP device 1101, 1102 in its User and Device Database 1114. This offset describes the difference between the device 1101, 1102's local clock and the system clock of the AVP 1106. With the offset and the TS, the AVP 1106 can verify if the message generated by such a device 1102, 1104 occurs within a reasonable time-window before the message arrives at the AVP 1106. Only messages generated during this period are accepted. Otherwise an "Expired Transaction" error message is generated and sent back to the APs using a method described later in this section. The size of this time window, and the accuracy of the clocks would depend on the requirements set by the application.

Referring now to FIG. 60, when the AAM 1118 is decrypting a transaction view message 1110 from a client 1101, based on the plaintext DID field 1430 of the view 1110 the AAM locates the corresponding pseudorandom sequence number generator R 1434 and seed S for the device 1101 which generated the received view 1110 using the User and Device Database 1114. Then using the TS 1432 also contained in the AP View 1110 as plaintext, the AAM can inductively reproduce the RSN 1436 which is identical to the RSN 1246 (of FIG. 58) used during the derivation of the encryption key. Because the TS value which is required for the AAM to determine the RSN of the view generating AP device 1101, 1102 is enclosed in each message, it is not necessary for the AAM 1118 and the AP devices 1101, 1102 to have synchronized clocks for RSN derivation purposes.

The AAM 1118 then locates the current user of the AP device 1101 in its User and Device Database 1114 using the DUID field 1433 of the view. By looking into the record for the AP's current user, the AAM 1118 finds the corresponding PIE 1438 of the user. Then the AAM 1118 reconstructs the encryption key 1442 (1250 of FIG. 58) used for generating the view 1110 by using the same Hash function 1440 (1245 of FIG. 58) used by the AP. With the encryption key known, the AAM can decrypt the full view message contained in the view 1110. After the decryption, if random bit padding was applied during the construction of the view, the padding bits are removed to reveal the true data fields. After the encrypted fields are decrypted, the UID 1422, the DID of the other party 1424, and Data 1426 are fed into a digest algorithm 1446, which is identical to the digest algorithm 1258 used by AP device, to produce a digest 1448. This digest 1448 is then compared with the MD 1428 resulted from decrypting the digital signature contained in the received view. Only if both digests are the same, the digital signature is considered correct. Otherwise, the view is considered altered from the original. The same procedure takes place for the received AP view 1120 in order to ensure that MD2 1478 corresponds to data 1476.

If the AAM 1118 is not able to successfully decrypt the message or the digital signature is not correct, then the authentication is deemed to have failed. The AP's will be notified through an "Authentication Failed" response message.

The above described SASE encryption scheme and key generation method is also used by the AVP 1106 to encrypt response messages such as errors or, acknowledgements or receipts that are sent back to APs 1101, 1102. In general, the response can also contain arbitrary application specific data. For example, it can be used to transmit special tokens generated by the Transaction Processing Component 1116 for AP users for later use.

Specifically, using the same basic SASE encryption method, to send a response message to $AP_i$, the AVP will use the destination AP parameter $DID_i$ to determine the random number generator $R_i$, the $Seed_i$ and a TS determined by the AVP to generate the RSN. Next, the destination APs current user's $PIE_i$, RSN and Hash function are used to generate the encryption key K. A Response Message to $AP_i$ has the following fields and is formatted as:

ResponseMessage$_i$={TID, DID$_i$, TS, DUID$_i$, Encryption [K: (MD, data)]}.

ResponseMessage$_1$ is then transmitted to APi. When received, APi is able to use the plaintext parameters in the message and its internal parameters to derive the decryption key and decrypt the message. During this process, the AP device may use the included DUID to prompt its user for a PIE if the PIE is not cached at the device.

In certain situations, because we are using a symmetric cryptography algorithm, in which the same key K derivation procedure can be carried out by either side, the above described AVP response message can be generalized for carrying arbitrary application data in messages.

When used for sending error messages and receipts back to the APs, the return messages are sent in a reversed path along the Agreement Channels to the APs. If the views are sent separately from each APs (via gathering function) to the AVP, the return messages are also sent independently to the destination APs. Such reverse communication does not need to go through the view gathering module. However, each return message does need to include sufficient information, such as the agreement TID in the message, so that the receiving AP device can identify to which agreement transaction the return message belongs.

Agreement Verification

After both views 1110, 1120 are successfully decrypted, the AVP 1106 verifies the agreement using the Agreement Verification Module 1112 that executes a procedure consisting of a list of matching rules to be applied to the agreement views. A series of basic matching operations between the fields in the views 1110, 1120 are carried out and then optionally, application specific matching rules can be applied. The basic matching operations are illustrated in FIG. 60 and include:

The DID included in each view's plain text part matches with the DID of the other party included in the other view's encrypted part. That is, 1416 matches with 1474 and 1466 matches with 1424.

The UID included in each view's cipher text party matches with the current user of the view generating device as determined by the view generating device's device ID and the current user's DUID. That is, the user ID derived from DID$_1$ 1416 and DUID$_1$ 1420 should matches with UID$_1$ 1422 included in the encrypted part of the view. The same matching rule applies to DID$_2$ 1466, DUID$_2$ 1470 and UID$_2$ 1472.

The Transaction ID, TID 1412 (or 1462), of each view is matched with the TID 1462 (or 1412) of the other party. In addition, the plaintext NITs are verified by counting the listed DIDs in each view.

If one of the matching rules is fails during the examination, the verification process is stopped and "Verification Failed" error messages are sent back to both APs using the return message method described earlier. For example, error messages are generated as the following with error1 and error2 being an error code or a descriptive message which both the APs and AVP can understand:

ErrorMessage1={TID, DID$_1$, TS$_1$, DUID$_1$, Encryption [K: (MD, error1)]}

ErrorMessage2={TID, DID$_2$, TS$_2$, DUID$_2$, Encryption [K: (MD, error2)]}

The next step is for the AVP to verify that the agreement data included in each view's cipher text part matches with each other according to the needs of the application. The SAS is a submission vessel protocol for agreements. Thus it does not define the format and specification of the agreements it carries. Therefore, to accommodate the application in determining whether two agreements really semantically agree with each other, an interface is provided by the AVP so that each application may provide its own additional agreement verification rules for verifying that the agreements included in the views are consistent with each other.

For example, a simple application independent plug-in procedure that can be used is a bit-matching function. If two agreements are exactly the same, bit by bit, the matching test is passed. More complex plug-ins may involve application specific cryptographic operations and semantic correspondence.

The Agreement Verification Module 112 may be physically implemented on the AVP, together with the authentication processing implementations. Alternatively, the verification process can be implemented on a different device but able to communicate with the other modules in the AVP through a reliable and secure communication channel.

At the completion of the verification process, the AVP may forward the agreement data decrypted from received views to a Transaction Processing Component 1116. However, in this case the communication between the AVP 1106 and the Transaction Processing Component carrying out the verification processing must be secure, if not co-located. From the SAS perspective, the agreement data extracted from each received view is already verified by the AVP.

Because of the additional communication, a timeout mechanism may be included so that if no reply is received from the Transaction Processing Component 1116 process within a certain time, the AVP 1106 sends error messages back to the APs 1101 1102

When in an application the Transaction Processing Component 1116 is physically located on a different device than the AVP 1106, the application may employ additional cryptography techniques to offer additional privacy features. For example, each AP may apply additional encryption to the agreement data before it applies SAS encryption. This pre-encryption can only be decrypted by the Transaction Processing Component 1116 process, which is not co-located with the AVP. Thus, even the AVP will not be able to discover the contents of the agreement beyond the information needed for basic matching.

At the end of the verification process, application specific receipts may be generated for the AP's 1101, 1102 describing the result of the verification.

ReceiptMessage$_1$={TID, DID$_1$, TS$_1$, DUID$_1$, Encryption [K$_1$:(MD, receipt$_1$)]}

ReceiptMessage$_2$={TID, DID$_2$, TS$_2$, DUID$_2$, Encryption [K$_2$:(MD, receipt$_2$)]}

The receipts are sent back to the APs using the method for the AVP to send messages back to APs, as describe earlier. It is important to point out that the contents of the receipts do not need to be understandable by the components of the AVP. This is different from the error messages generated by the authentication process of the AAM. The reason for this distinction is to separate the results from authentication processing from the results from the agreement verification processing. This separation gives the applications more capability to include additional features. For example, when there is an additional Transaction Processing Component 1116 that is physically separated from the AVP, the agreement verification process may include confidential information in its receipts. It is not necessary to allow the AVP to understand the contents of the receipts.

The departure from the AVP of the receipt or error message for the last AP involved in the agreement marks the end of an agreement authentication and verification transaction at the AVP 1106. The arrival of a receipt at an AP 1101 1102 marks the end of an agreement authentication and verification transaction at the AP.

AP View 1 1110, AP View 2 1120, and Agreement Verification 1106 are implemented in respective software programs which, when executed by a computer, cause the computer to execute the respective functions described herein above. Each of the programs can be stored on a computer-readable medium.

Extensions of the SAS Protocol

The above SAS protocol description is presented for agreements between two parties. However, the SAS protocol can be extended for agreements involving more than two parties. In this case, for a transaction involving n parties, the transaction view message from the i-th participant is:

ViewMsg$_i$={TID, NIT, DID$_i$, TS$_i$, DUID$_i$, Enc [K$_i$:(MD$_i$, TID, UID$_i$, DID$_0$, . . . , DID$_{i-1}$, DID$_{i+1}$, . . . , DID$_{n-1}$, agreement)]}

Correspondingly, the verification and authentication rules are:

ViewMsg$_0$.DID$_i$== . . . ==ViewMsg$_j$.DID$_i$== . . . ==ViewMsg$_{n-1}$.DID$_i$, where i=0 . . . n−1

For all i's (i∈[0, n−1]), using ViewMsg$_i$.UID$_i$ and DUID$_i$ to search the User and Device Database for the reference UID. This UID should be the same as UID$_i$ included in the encrypted part of the ViewMsg$_i$.

ViewMsg$_0$.TID== . . . ==ViewMsg$_j$.TID== . . . ==ViewMsg$_{n-1}$.TID, where i=0 . . . n−1

ViewMsg$_0$.NIT== . . . ==ViewMsg$_j$.NIT== . . . ==ViewMsg$_{n-1}$.NIT, where i=0 . . . n−1, and NIT is equal to n, the number of parties listed in the agreement.

The submission methods of the views in a two AP system are extended to agreement transactions involving more than two APs. If the view gathering and generation processes are separated, exactly the same methods used by a two AP system can be used for a system with more than 2 APs. The View Gathering module collect views from all parties in the agreement using the TID and NIT included in the message.

When the view gathering function is implemented separately from the view generation function, the view gathering function can be physically implemented at an external device (in which case the APs send their views to this view gathering device then the view gathering device forwards all views together to the AVP.

Alternative View Gathering Methods

In an alternate version of the invention, called integrated view gathering, the view gathering mechanism is distributed to the APs so that the views are collected sequentially by successive agreement parties as they are transferred to the AVP. If the view gathering and generation are integrated in this manner, a submission chain needs to be set up beforehand among all APs. After the first AP on this chain generates its view, the view is sent to the second AP in this chain. Upon receiving a view from the first AP, the second AP is triggered to generate its own view. Then both views are forwarded to the third AP in this chain, and so on. This process is executed in turn by each AP on this submission chain and finally all views are sent by the last AP on the submission chain to the AVP. In that case, the TID and NIT can be omitted also.

Figure 61:
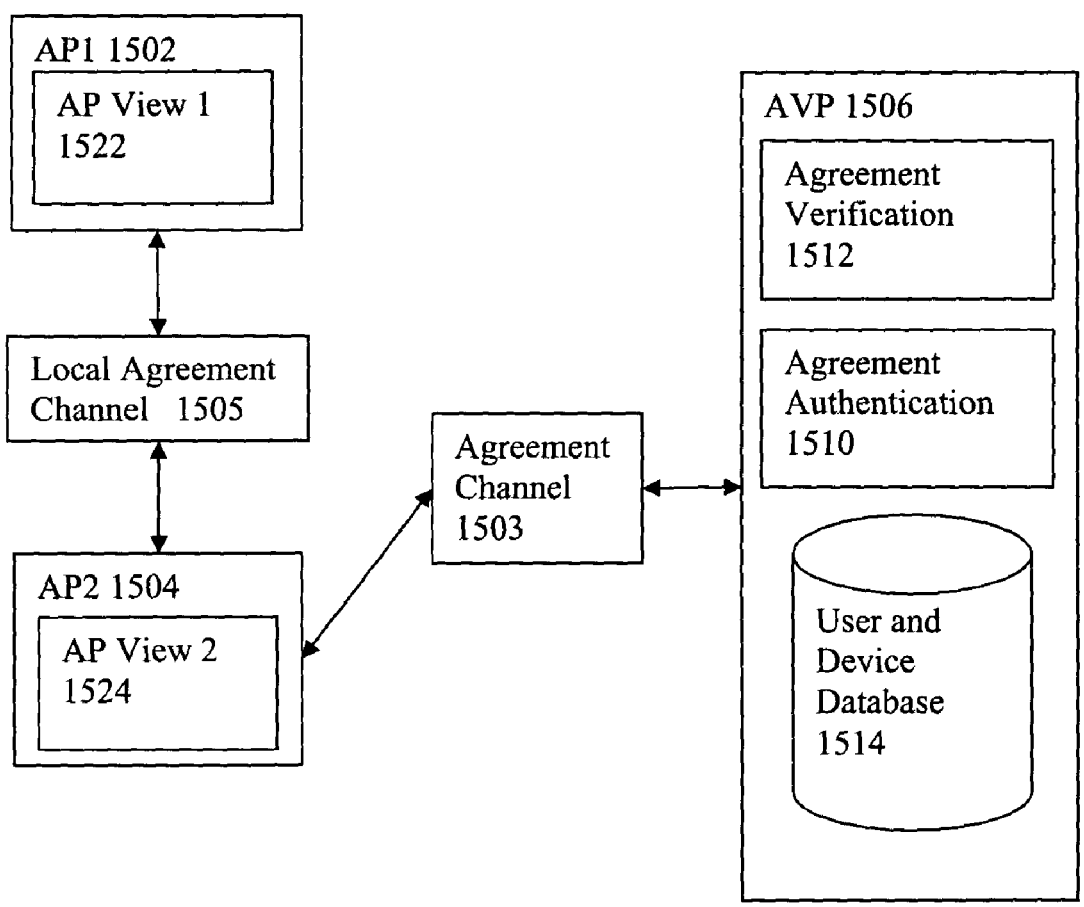
FIG. 61 illustrates how random bit padding is applied to encrypted data fields.

An example of such an integrated view gathering and generation system is shown in the computer system 1500 of FIG. 61. As shown in FIG. 61, the first AP device 1502 comprising a local Agreement Channel 1505 generates its view 1522 of the agreement. The view 1522 is sent to the second AP device 1504 via the local agreement channel 1505. Upon receiving the view 1522 from the first AP device 1502, the second AP device generates its view 1524 of the agreement. Then both views 1522 1524 of the agreement are sent to the AVP 1506 via an agreement channel 1503. In some implementations, the views may even be concatenated together and sent as one message. In this variation, because the views are gathered as they are generated, it is no longer necessary for the system 1500 to include a View Gathering component. The AVP 1506 itself comprises three components the Agreement Authentication Module 1510, which is identical to the Agreement Authentication Module 1118, the Agreement Verification Module 1512 which is identical to the Agreement Verification Module 1112, and the User and Device Database 1514, which is identical to the User and Device Database 1114.

Another variation of the invention permits the assembly of a multi-layered agreement view as a result of an integrated view gathering architecture. In this system, each successive AP may perform an operation on the agreement data received from APs earlier in the chain. The initial agreement data is included in the view of the first AP. The second AP uses the view received from the first AP as part of its own agreement data and produces its own view, based on a function of the received view. Finally, what the AVP receives is a single, multi-layered view. Combined with the physical separation of AVP modules, such as the AAM and AVM and appropriate encryption/decryption algorithms, applications of this variation can support new capabilities in supporting privacy.

Examples of Applications of SAS

Figure 62:
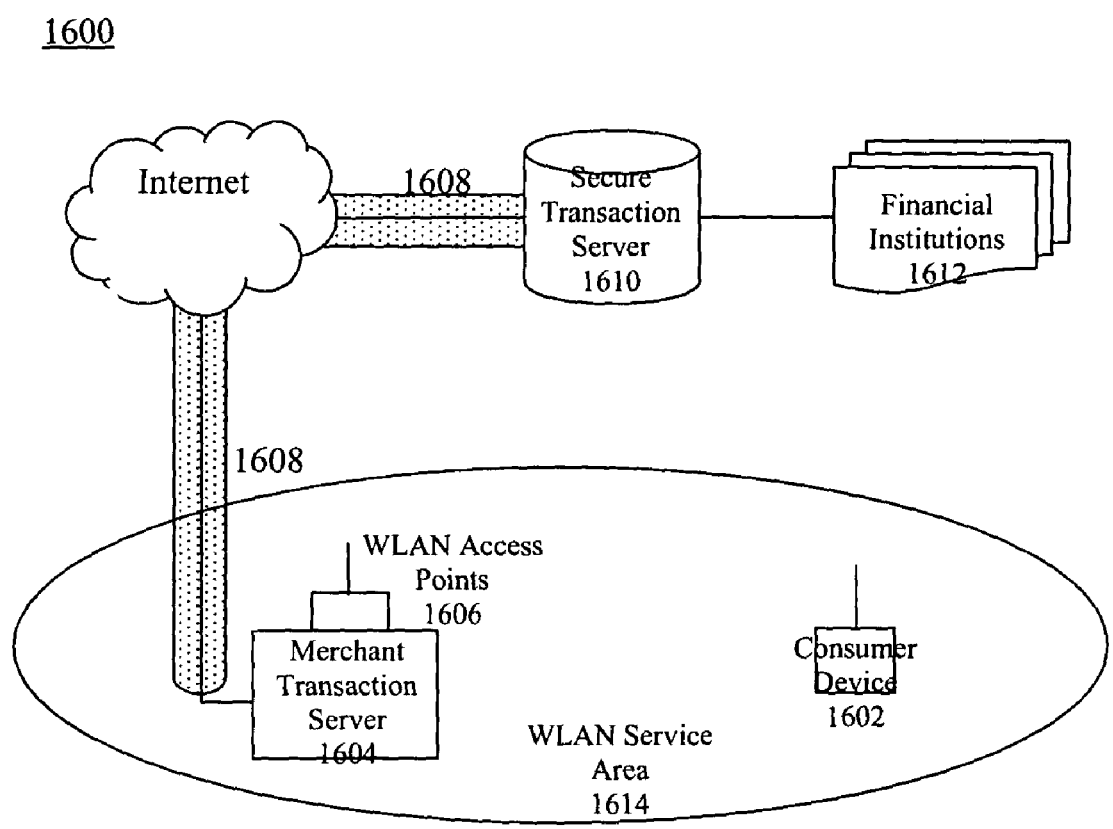
FIG. 62 shows an example application in purchasing of goods and services.

The first application example is shown in FIG. 62. It is a wireless payment system 1600 for payments by consumers in physical retail stores. The architecture is similar to that shown in the chained integrated view gathering variation shown in FIG. 61. In this example, the backend server called Secure Transaction Sever (STS) 1610 is the AVP. The STS 1610 is further connected to a Transaction Processing Component that is a Financial Institution payment service 1612 to carry out the actual processing of the financial transactions. The APs are the consumers and the merchants and they have their own AP devices 1602 and 1604. For consumers, the AP device 1602 can be any mobile device with wireless capability, such as Personal Digital Assistant, a mobile phone or a credit card sized mini-computing device which are capable of wireless communication and carrying out SAS computations. For merchants, the AP device can be a computer 1604 comprising a wireless LAN access points 1606 providing service to a WLAN service area 1614 and a connection to the backend STS 1610 via the Internet (called an Agreement Channel 1608).

The agreement is the data requesting a payment transaction between the consumer and the merchant for purchase of physical or virtual goods. After the consumer finalizes her purchase, her AP device 1602 generates her view of the transaction. The view is sent to the merchant device 1604 using a wireless LAN access service, which in turn triggers the merchant device 1604 to generate the merchant's view. Then the merchant device sends both views together to the STS 1610 over the Agreement Channel implemented as a secure Internet connection. After the STS 1610 authenticates the identities of both the merchant and the consumer through decryption, it extracts the monetary transaction request data from the views and performs the basic verification procedures. If successful, the STS forwards the requests to a financial institute 1612 for further transaction processing and eventual monetary exchange. Results from the financial institute 1612 are returned to the STS 1610 and encrypted as receipts to both the merchant and consumer. Both receipts are sent to the merchant device 1604 over the Agreement Channel and the merchant device 1604 forwards the consumer receipt to the consumer device 1602 over the wireless LAN. In a variation, the purchase occurs in two stages, the first stage being a transaction during which the merchant and the consumer request a purchase and the second stage being a transaction during which the consumer and the merchant authorize the purchase, with the consumer also selecting which financial account to use for the transaction.

In this example, the wireless payment application uses an integrated view gathering approach due to the fact that the consumer AP device 1602 does not have a direct communication link to the AVP 1610 and the merchant device 1604 concatenates its view after it receives a view from client device 1602. At the AVP end, the authentication processing and verification processing are co-located on the STS 1610. In addition to the components, the application also has the additional Transaction Processing Component of a financial institution payment service 1612 to carry out additional application specific processing.

Tokens

Another application of the SAS is to provide a method of securely distributing special messages called "tokens" that can be thought of as tickets. Such tokens are generated by the AVP as the result of an agreement and sent to one or more members of the agreement. They can be used by members of a previously authenticated agreement to authenticate the other members of the agreement directly without contacting the AVP at the time of authentication. A second use is to authenticate the presentation of the result of a previously authenticated agreement by a third party (who may or may not be a party to the original agreement) without directly contacting the AVP at the time of authentication. The tokens can be used as tickets where in the former case, the identity of the ticket holder and the ticket are important (as in airline tickets), and in the later case, the identity of the ticket holder is not important, just the validity of the ticket. The token should only be used once, as there is not strong security between the two parties.

Let AP1 and AP2 be two parties of an agreement that has been verified by the AVP. At some time in the future, AP2 would like the ability to verify the identity of AP1 without consulting the AVP again. The token is a type of AVP response message in which the agreement data portion of the response message contains special token identifying information.

Figure 63:
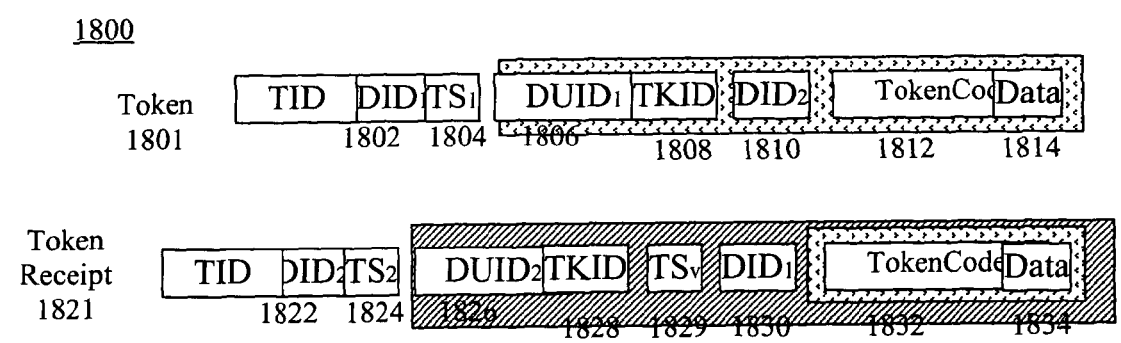
FIG. 63 illustrates how the present invention can be used to generate 3rd-party verifiable tokens.

FIG. 63 illustrates a method 1800 of using the SAS to generate 3rd-party verifiable tokens.

As shown in FIG. 63, tokens are generated by the AVP in pairs, with one called token 1801 and the other called token receipt 1821. The token 1801 is sent to AP1, the party to be authenticated, while the token receipt 1821 is sent to AP2, the party that wants the authentication service.

The formats of the token and token receipt are shown in FIG. 63. Both are formatted in the same fashion as other AVP response messages. The plaintext part of both token and token receipt contains the same fields as other AVP response messages as described before. Specifically, the plaintext part of token 1801 includes DID1 1802, TS1 1804, DUID1 1806 and the plaintext part of token receipt 1821 includes DID2 1822, TS2 1824 and DUID2 1826. The cipher text part of a token 1801 contains a token identifier TKID 1808 that is used to uniquely identify a token pair, the DID 1810 of AP2, a token code 1812, and other data 1814 associated with the token. The cipher text part of a token 1801 is encrypted by the AVP using a key generated using standard SASE for the current user of AP1. A token receipt 1821 is formatted almost the same as a token except for two differences. The first difference is that the token code 1832 included in the token receipt 1821 is firstly encrypted using SASE with AP1's parameters except for the timestamp. The timestamp could be any future time value TSv chosen by the AVP. Such a TSv 1829 is also included in the cipher text part of the token receipt 1821, which is the second difference between a token and a token receipt.

Upon receiving a token, AP1, the party whose identity is to be verified, will decrypt the token and store the TKID 1808, DID2 1810, Token Code 1812, and token data 1814 for future use. AP2, the verifying party, stores the TKID 1828, TSv 1829, DID1 1830, token code 1832, and token data 1834. The token code 1832 stored by AP2 is still encrypted by SASE using the parameters for AP1 and TSv. On the other hand, the token code 1812 stored by AP1 is in plaintext form.

At the time of token verification, AP2 requests that AP1 deliver the token to AP2 by sending a Token Request message containing the TKID 1828 and the TSv 1829 of the token. AP1 receives the request, encrypts the token code 1812 with its own SASE parameters and TSv as timestamp value. Then AP1 transmits the encrypted token code to AP2. At AP2, if the received encrypted token code is found to be the same bit by bit as the locally stored token code 1832, the token is verified and thus the user is authenticated as being a member of the agreement.

For the second case, where the identity of the token holder is not important, the original token holder can pass the encrypted token to a third party. Let AP1 be the original token holder and AP2 be the verifier. The third party, P, must store the encrypted token and the necessary parameters, such as TKID, TSv, DID2. P presents the token to AP2, by sending an unencrypted message to AP2 containing the TKID, TSv and the token (encrypted by AP1).

The tokens are useful to verify that a party has a valid result of an agreement. For example, a party has used a mobile computing device to wirelessly purchase movie tickets and has wireless transmitted one ticket to a companion. When the tickets were purchased, a user receives on her device an encrypted token for each ticket and some additional data such as total number of tickets, time, place, etc. The movie theatre also receives the token information. At entry time, each user wirelessly presents one or more tokens and is granted entry.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer system for conducting an agreement between two parties relying on a Secure Transaction Server (STS) as a trusted third party comprising:
   a first party consumer mobile device for a consumer and comprising a computer processor that by execution of instructions:
      generates, independent of the second and third parties, a first mobile device parameter derived from a stored mobile device parameter
      generates a first view of the agreement pertaining to ordering and/or purchasing goods and/or services,
      secures the first view of the agreement based upon a key derived from both the generated first mobile device parameter and input personal identifying information of the first party as a second input mobile device parameter input to the consumer mobile device, and
      transmits the first view of the agreement to the second party, the first view of the agreement not including the first and second mobile device parameters; and
   a second party merchant device for a merchant and comprising a computer processor that by execution of instructions:
      generates, independently of the first and third party, a second view of the agreement secured based upon a merchant device parameter as merchant identifying information, and
      transmits the second secured view of the agreement to the third party, wherein the first party consumer mobile device and the second party merchant device are communicably connectable over an open and non-secure wireless network for connecting the first party and the second party and to transmit the first view of the agreement from the first party to the second party,
   wherein the second party merchant device is in communicably connectable with the trusted third party server over a wired or wireless network for connecting the second party to the third party and to transmit the first and second views of the agreement to the trusted third party server,
   wherein the STS comprises a computer processor that by execution of instructions:
      verifies conditions of the agreement including identities of the first and second parties in the independent secured first and second views of the agreement, based upon a symmetric agreement verification protocol deriving the key based upon the first and second mobile device parameters for the secured first view and using the merchant device parameter for the secured second view, and takes action to execute the agreement according to the verification of the conditions of the agreement, and
   exclusively stores the personal identifying information of the first party as the second input mobile device parameter.

2. The system according to claim 1, wherein the open and non-secure wireless network is a wireless local area network.

3. The system as in 1 wherein:
   the merchant device prompts for input of or stores the merchant device parameter as the merchant identifying information, and
   the transaction STS stores the merchant identifying information.

4. The system as in claim 1, further comprising one or more payment servers comprising a computer processor that provide a payment service upon direction of the STS, and
   wherein the STS is in secure communication with the one or more payment servers including online payment services, financial institutions, and credit card agencies, using a wired or wireless network and the STS directs that payment be made by the payment services upon verification of the purchase transaction by the STS.

5. The system as in claim 4, wherein the STS supplies a token as confirmation of the payment.

6. The system as in claim 5, wherein the merchant device processes the token presented by the consumer to consume the good and/or service.

7. The system as in claim 4, wherein the STS registers financial account information of the consumer for the payment services, and the consumer mobile device presents selectable financial account information of the consumer from the consumer financial account information registered by the STS.

8. The system as in claim 4, wherein the STS registers the consumer and the merchant by registering financial account information of the consumer and the merchant, providing the consumer and merchant identifying information, and providing to the consumer mobile device and the merchant device software executing the symmetric agreement verification protocol.

9. The system as in claim 8 wherein:
   the consumer mobile device discovers the merchant device;
   the consumer mobile device receives consumer selectable goods and/or services for conducting the purchase from the merchant device;
   the consumer mobile device obtains from the merchant device, a purchase order;
   the consumer mobile device receives payment authorization from the consumer for the purchase order, as the first view of the agreement;
   the merchant device receives authorization for acceptance of the consumer payment from the merchant, as the second view of the agreement;
   the STS verifies the conditions of the agreement;
   the STS as the action executing the agreement causes payment from the consumer to the merchant through one of the payment services; and
   the STS issues receipts to the consumer device and to the merchant device indicating success or failure of the transaction.

10. The system of claim 9, wherein the STS collects a fee for processing the purchase from one or more of the consumer, merchant, or payment services based on a fee for each purchase or on a percentage of purchase amount.

11. The system as in claim 9, wherein the wired or wireless network connecting the merchant device with the STS is a secure network and wherein the open and non-secure wireless network is a wireless local area network operated by the merchant device.

12. The system as in claim 11 wherein the wireless local area network includes a hotspot accessible by a plurality of merchant devices and consumer mobile devices and the consumer mobile device provides selectable merchants based upon the merchant devices through the wireless local area network.

13. The system as in claim 11, wherein the wireless local area network includes a hotspot accessible by a plurality of merchant devices and consumer mobile devices, and the consumer mobile device provides selectable merchants based upon the merchant devices through the wireless local area network, and the merchant devices, the consumer devices, and the STS are in communication with each other via the hotspot.

14. The system as in claim 11, wherein the merchant device executing a retail application and a secure transaction purchasing application, can execute the secure transaction application on a local device at the merchant location connected to the wireless local area network and a remote device connected via another network to the wireless local area network and the consumer device.

15. The system as in any one of claims 10, 11, 12, 13, and 14, wherein the merchant device is connected to the STS via Internet using security including a secure socket layer (SSL) or a Virtual Private Network.

16. The system as in any one of claims 10, 11, 12, 13, and 14, wherein the STS is connected to one or more of the payment servers through a secure network or through Internet using security including secure socket layer (SSL) or a Virtual Private Network.

17. The system as in claim 9 wherein the consumer mobile devices requests the STS to disable the consumer mobile device for a purchase using a current consumer identifying information.

18. The system as in claim 9 where the STS detects and disables a consumer account if there are multiple attempts to authorize a payment with incorrect consumer identifying information.

19. The system as in claim 9,
wherein one of the services for the purchase is a movie ticket, from the merchant device and wherein the receipt is an electronic token as proof of the payment, and
wherein the consumer mobile device provides the token to obtain the service, including a paperless e-ticket.

20. The system as in claim 9 where the purchase is a return of goods and/or services from the consumer to the merchant and the STS causes payment from the merchant to the consumer.

21. The system as in claim 9 in which the STS provides ancillary information from the payment services, including advertisements, special interest rate for a particular purchase if a specific credit account is chosen for an attempted purchase, to the consumer mobile device in response messages prior to the consumer payment authorization.

22. The system as in claim 1, wherein only the STS, and neither the merchant device nor the consumer mobile device are able to observe details of other's transaction including the identifying information of the consumer and the merchant.

23. The system as in claim 1, wherein the personal identifying information comprises one or more of a personal identification number (PIN), password, biometric information, a fingerprint or a voiceprint.

24. The system as in claim 23, wherein the consumer mobile device prompts the consumer for authorizing payment through an explicit command to the consumer mobile device by requesting input of the consumer identifying information.

* * * * *

UNITED STATES PATENT AND TRADEMARK OFFICE
CERTIFICATE OF CORRECTION

PATENT NO. : 7,801,826 B2
APPLICATION NO. : 10/628583
DATED : September 21, 2010
INVENTOR(S) : Yannis Labrou et al.

It is certified that error appears in the above-identified patent and that said Letters Patent is hereby corrected as shown below:

Column 63, Line 50 (Approx.) after "is" delete "in".

Column 64, Line 10 before "STS" delete "transaction".

Signed and Sealed this

Fifteenth Day of February, 2011

David J. Kappos
*Director of the United States Patent and Trademark Office*